US008165585B2

(12) United States Patent
Gallagher et al.

(10) Patent No.: US 8,165,585 B2
(45) Date of Patent: *Apr. 24, 2012

(54) HANDOVER MESSAGING IN AN UNLICENSED MOBILE ACCESS TELECOMMUNICATIONS SYSTEM

(75) Inventors: Michael D. Gallagher, San Jose, CA (US); Rajeev Gupta, Sunnyvale, CA (US); Milan Markovic, Pleasanton, CA (US); Jianxiong (Jason) Shi, Pleasanton, CA (US); Joseph G. Baranowski, Morgan Hill, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/476,251

(22) Filed: Jun. 1, 2009

(65) Prior Publication Data
US 2010/0003983 A1 Jan. 7, 2010

Related U.S. Application Data

(63) Continuation of application No. 11/129,424, filed on May 12, 2005, now Pat. No. 7,565,145, and a continuation-in-part of application No. 11/097,866, filed on Mar. 31, 2005, now Pat. No. 7,873,015, and a continuation-in-part of application No. 11/013,883, filed on Dec. 15, 2004, now Pat. No. 7,640,008, and a continuation-in-part of application No. 10/688,470, filed on Oct. 17, 2003, now Pat. No. 7,127,250.

(60) Provisional application No. 60/571,421, filed on May 14, 2004, provisional application No. 60/564,696, filed on Apr. 22, 2004, provisional application No. 60/530,141, filed on Dec. 16, 2003, provisional application No. 60/552,455, filed on Mar. 12, 2004, provisional application No. 60/419,785, filed on Oct. 18, 2002.

(51) Int. Cl.
*H04W 36/00* (2009.01)

(52) U.S. Cl. ......... 455/436; 455/437; 455/438; 455/439

(58) Field of Classification Search .................. 455/436
See application file for complete search history.

(56) References Cited

U.S. PATENT DOCUMENTS 5,101,501 A 3/1992 Gilhousen et al.
(Continued)

FOREIGN PATENT DOCUMENTS
EP 2282735 4/1995
(Continued)

OTHER PUBLICATIONS

International Search Report and Written Opinion for PCT/US2010/026883, May 4, 2010, Kineto Wireless, Inc.

(Continued)

*Primary Examiner* — Melur Ramakrishnaiah
(74) *Attorney, Agent, or Firm* — Adeli & Tollen LLP

(57) ABSTRACT

Methods and messages for performing handovers between an unlicensed mobile access network (UMAN) comprising a first radio access network and a second radio access network. URR (UMA radio resource) handover messages are exchanged between a mobile station (MS) and a UMA network controller (UNC) operating in the UMAN. The MS may access the UMAN via a wireless access point (AP) that is communicatively coupled to the UNC via an IP network. The URR handover messages are sent between the MS and the UNC using an Up interface comprising a set of layered protocols over an underlying IP transport. The handover methods include both handover from a UMAN to the second radio access network, and handover from the second radio access network to the UMAN.

27 Claims, 42 Drawing Sheets

U.S. PATENT DOCUMENTS

| | | |
|---|---|---|
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellinger et al. |
| 5,267,261 A | 11/1993 | Blakeney, II et al. |
| 5,327,578 A | 7/1994 | Breeden et al. |
| 5,333,175 A | 7/1994 | Ariyavisitakul et al. |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,475,677 A | 12/1995 | Arnold et al. |
| 5,488,649 A | 1/1996 | Schellinger |
| 5,507,035 A | 4/1996 | Bantz et al. |
| 5,509,052 A | 4/1996 | Chia et al. |
| 5,515,420 A | 5/1996 | Urasaka et al. |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |
| 5,640,414 A | 6/1997 | Blakeney, II et al. |
| 5,659,598 A | 8/1997 | Byrne |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,812,511 A | 9/1998 | Kawamura et al. |
| 5,812,522 A | 9/1998 | Lee et al. |
| 5,815,525 A | 9/1998 | Smith |
| 5,818,820 A | 10/1998 | Anderson et al. |
| 5,822,681 A | 10/1998 | Chang et al. |
| 5,822,767 A | 10/1998 | MacWilliams |
| 5,825,759 A | 10/1998 | Liu |
| 5,852,767 A | 12/1998 | Sugita |
| 5,862,345 A | 1/1999 | Okanoue et al. |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,960,361 A | 9/1999 | Chen |
| 5,960,364 A | 9/1999 | Dent |
| 5,987,010 A | 11/1999 | Schnizlein |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo |
| 6,112,080 A | 8/2000 | Anderson et al. |
| 6,112,088 A | 8/2000 | Haartsen |
| 6,115,608 A | 9/2000 | Duran et al. |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,167,279 A | 12/2000 | Chang et al. |
| 6,226,515 B1 | 5/2001 | Pauli |
| 6,229,792 B1 | 5/2001 | Anderson et al. |
| 6,236,852 B1 | 5/2001 | Veerasamy et al. |
| 6,243,581 B1 | 6/2001 | Jawanda |
| 6,256,511 B1 | 7/2001 | Brown |
| 6,263,211 B1 | 7/2001 | Brunner |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,415,158 B1 | 7/2002 | King et al. |
| 6,426,819 B1 | 7/2002 | Crimmins et al. |
| 6,430,395 B2 | 8/2002 | Arazi et al. |
| 6,434,389 B1 | 8/2002 | Meskanen et al. |
| 6,438,117 B1 | 8/2002 | Grilli et al. |
| 6,445,921 B1 | 9/2002 | Bell |
| 6,463,307 B1 | 10/2002 | Larsson et al. |
| 6,498,934 B1 | 12/2002 | Muller |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo et al. |
| 6,600,925 B1 | 7/2003 | Rams |
| 6,633,614 B1 | 10/2003 | Barton et al. |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen |
| 6,788,656 B1 | 9/2004 | Smolentzov et al. |
| 6,801,519 B1 | 10/2004 | Mangel |
| 6,801,772 B1 | 10/2004 | Townend et al. |
| 6,801,777 B2 | 10/2004 | Rusch |
| 6,807,417 B2 | 10/2004 | Sallinen |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,845,095 B2 | 1/2005 | Krishnarajah et al. |
| 6,850,503 B2 | 2/2005 | Dorenbosch et al. |
| 6,853,851 B1 | 2/2005 | Rautiola et al. |
| 6,879,600 B1 | 4/2005 | Jones et al. |
| 6,895,255 B1 | 5/2005 | Bridgelall |
| 6,909,705 B1 | 6/2005 | Lee et al. |
| 6,925,074 B1 * | 8/2005 | Vikberg et al. ............... 370/338 |
| 6,937,862 B2 | 8/2005 | Back et al. |
| 6,957,249 B2 | 10/2005 | Salo |
| 6,961,573 B1 | 11/2005 | Moon et al. |
| 6,970,719 B1 | 11/2005 | McConnell et al. |
| 6,993,359 B1 | 1/2006 | Nelakanti et al. |
| 7,009,952 B1 | 3/2006 | Razavilar et al. |
| 7,035,932 B1 | 4/2006 | Dowling |
| 7,039,027 B2 | 5/2006 | Bridgelall |
| 7,043,235 B2 | 5/2006 | Meyer et al. |
| 7,054,290 B1 | 5/2006 | Djuphammar |
| 7,065,353 B1 | 6/2006 | Bolinth et al. |
| 7,127,250 B2 | 10/2006 | Gallagher et al. |
| 7,149,521 B2 | 12/2006 | Sundar et al. |
| 7,245,916 B2 | 7/2007 | Gallagher et al. |
| 7,251,227 B2 | 7/2007 | De Jong et al. |
| 7,283,821 B2 | 10/2007 | Gallagher et al. |
| 7,283,823 B2 | 10/2007 | Pearce et al. |
| 7,308,263 B2 | 12/2007 | Gallagher et al. |
| 7,349,698 B2 | 3/2008 | Gallagher et al. |
| 7,369,854 B2 | 5/2008 | Gallagher et al. |
| 7,440,472 B2 | 10/2008 | Delaney et al. |
| 7,471,655 B2 | 12/2008 | Gallagher et al. |
| 7,565,145 B2 | 7/2009 | Gallagher et al. |
| 7,574,213 B2 | 8/2009 | Gallagher et al. |
| 7,606,190 B2 | 10/2009 | Markovic et al. |
| 7,634,269 B2 | 12/2009 | Gallagher |
| 2001/0029186 A1 | 10/2001 | Canyon et al. |

| | | |
|---|---|---|
| 2001/0031645 A1 | 10/2001 | Jarrett |
| 2001/0046214 A1 | 11/2001 | Kang |
| 2001/0046860 A1 | 11/2001 | Lee |
| 2001/0049790 A1 | 12/2001 | Faccin et al. |
| 2002/0032030 A1 | 3/2002 | Berglund et al. |
| 2002/0045459 A1 | 4/2002 | Morikawa |
| 2002/0051431 A1 | 5/2002 | Choi et al. |
| 2002/0059516 A1 | 5/2002 | Turtiainen et al. |
| 2002/0065099 A1 | 5/2002 | Bjorndahl |
| 2002/0066036 A1 | 5/2002 | Makineni |
| 2002/0075844 A1 | 6/2002 | Hagen |
| 2002/0082015 A1 | 6/2002 | Wu |
| 2002/0085516 A1 | 7/2002 | Bridgelall |
| 2002/0102974 A1 | 8/2002 | Raith |
| 2002/0118674 A1 | 8/2002 | Faccin et al. |
| 2002/0131387 A1 | 9/2002 | Pitcher et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0155829 A1 | 10/2002 | Proctor, Jr. et al. |
| 2002/0160811 A1 | 10/2002 | Jannette et al. |
| 2002/0166068 A1 | 11/2002 | Kilgore |
| 2002/0168959 A1 | 11/2002 | Noguchi et al. |
| 2002/0186684 A1 | 12/2002 | Shaughnessy et al. |
| 2002/0191575 A1 | 12/2002 | Kalavade et al. |
| 2002/0196840 A1 | 12/2002 | Anderson et al. |
| 2002/0197984 A1 | 12/2002 | Monin et al. |
| 2003/0007475 A1 | 1/2003 | Tsuda et al. |
| 2003/0026269 A1 | 2/2003 | Paryani |
| 2003/0031151 A1 | 2/2003 | Sharma et al. |
| 2003/0043773 A1 | 3/2003 | Chang |
| 2003/0087653 A1 | 5/2003 | Leung |
| 2003/0092445 A1* | 5/2003 | Timonen et al. ............ 455/439 |
| 2003/0101356 A1 | 5/2003 | Miettinen et al. |
| 2003/0112789 A1 | 6/2003 | Heinonen |
| 2003/0119490 A1 | 6/2003 | Mohammed |
| 2003/0119527 A1 | 6/2003 | Labun |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil |
| 2003/0172264 A1 | 9/2003 | Dillon |
| 2003/0176181 A1 | 9/2003 | Boesjes |
| 2003/0176186 A1* | 9/2003 | Mohammed ............ 455/432.1 |
| 2003/0193952 A1 | 10/2003 | O'Neill |
| 2003/0202486 A1 | 10/2003 | Anton, Jr. et al. |
| 2003/0210199 A1 | 11/2003 | Sward et al. |
| 2003/0219022 A1 | 11/2003 | Dillon et al. |
| 2003/0219024 A1 | 11/2003 | Purnadi et al. |
| 2003/0226017 A1 | 12/2003 | Palekar et al. |
| 2004/0008649 A1 | 1/2004 | Wybenga |
| 2004/0009749 A1 | 1/2004 | Arazi et al. |
| 2004/0010620 A1 | 1/2004 | Salo et al. |
| 2004/0013099 A1 | 1/2004 | O'Neill |
| 2004/0025018 A1 | 2/2004 | Haas et al. |
| 2004/0037312 A1 | 2/2004 | Spear |
| 2004/0053623 A1 | 3/2004 | Hoff et al. |
| 2004/0068571 A1 | 4/2004 | Ahmavaara |
| 2004/0068653 A1 | 4/2004 | Fascenda |
| 2004/0072593 A1 | 4/2004 | Robbins et al. |
| 2004/0077335 A1 | 4/2004 | Lee et al. |
| 2004/0077346 A1 | 4/2004 | Krenik et al. |
| 2004/0077354 A1 | 4/2004 | Jason et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0147223 A1 | 7/2004 | Cho |
| 2004/0171378 A1 | 9/2004 | Rautila |
| 2004/0185853 A1* | 9/2004 | Kim et al. ................ 455/438 |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203788 A1 | 10/2004 | Fors et al. |
| 2004/0203800 A1 | 10/2004 | Myhre et al. |
| 2004/0203815 A1 | 10/2004 | Shoemake et al. |
| 2005/0003819 A1* | 1/2005 | Wu ............................ 455/436 |
| 2005/0041787 A1 | 2/2005 | Casey et al. |
| 2005/0064896 A1 | 3/2005 | Rautiola et al. |
| 2005/0070288 A1 | 3/2005 | Belkin et al. |
| 2005/0101245 A1 | 5/2005 | Ahmavaara |
| 2005/0111409 A1 | 5/2005 | Spear et al. |
| 2005/0130654 A1 | 6/2005 | Di Claudio et al. |
| 2005/0198199 A1 | 9/2005 | Dowling |
| 2005/0239441 A1 | 10/2005 | Eronen |
| 2005/0239453 A1 | 10/2005 | Vikberg et al. |
| 2005/0239468 A1 | 10/2005 | Segal |
| 2005/0272425 A1 | 12/2005 | Amerga et al. |
| 2005/0272449 A1 | 12/2005 | Gallagher et al. |
| 2006/0019667 A1 | 1/2006 | Hicks, III |
| 2006/0094431 A1 | 5/2006 | Saifullah et al. |
| 2006/0098598 A1 | 5/2006 | Gallagher |
| 2006/0146803 A1 | 7/2006 | Bae et al. |
| 2006/0148511 A1 | 7/2006 | Bender et al. |
| 2006/0183482 A1 | 8/2006 | Ueda |
| 2006/0189319 A1 | 8/2006 | Houldsworth et al. |
| 2006/0223532 A1 | 10/2006 | Liu et al. |
| 2006/0239277 A1 | 10/2006 | Gallagher |
| 2006/0268845 A1 | 11/2006 | He et al. |
| 2007/0183427 A1 | 8/2007 | Nylander et al. |
| 2007/0232312 A1 | 10/2007 | Gallagher et al. |
| 2007/0268855 A1 | 11/2007 | Grayson et al. |
| 2007/0287459 A1 | 12/2007 | Diachina et al. |
| 2007/0293222 A1 | 12/2007 | Vikberg et al. |
| 2008/0076420 A1 | 3/2008 | Khetawat et al. |
| 2008/0101301 A1 | 5/2008 | Thomas et al. |
| 2008/0123596 A1 | 5/2008 | Gallagher et al. |
| 2008/0125120 A1 | 5/2008 | Gallagher et al. |
| 2008/0130564 A1 | 6/2008 | Gallagher et al. |
| 2008/0130568 A1 | 6/2008 | Gallagher et al. |
| 2008/0132239 A1 | 6/2008 | Khetawat et al. |

FOREIGN PATENT DOCUMENTS

| | | |
|---|---|---|
| EP | 0936777 | 8/1999 |
| EP | 1207708 | 10/2004 |
| EP | 2060130 | 5/2009 |
| WO | WO 9204796 | 3/1992 |
| WO | WO 9724004 | 7/1997 |
| WO | WO 9948312 | 9/1999 |
| WO | WO 9948315 | 9/1999 |
| WO | WO 0028762 | 5/2000 |
| WO | WO 0051387 | 8/2000 |
| WO | WO 0245456 | 6/2002 |
| WO | WO 03039009 | 5/2003 |
| WO | WO 03/085992 | 10/2003 |
| WO | WO 03092312 | 11/2003 |
| WO | WO 04002051 | 12/2003 |
| WO | WO 2004034219 | 4/2004 |
| WO | WO 2004039111 | 5/2004 |
| WO | WO 2005006597 | 1/2005 |
| WO | WO 2005/057968 | 6/2005 |
| WO | WO 2005/120017 | 12/2005 |
| WO | WO 2006/053102 | 5/2006 |
| WO | WO 2008/055251 | 5/2008 |
| WO | PCT/US2009/054098 | 8/2009 |
| WO | PCT/US2010/026883 | 3/2010 |

OTHER PUBLICATIONS

U.S. Appl. No. 11/080,714, filed Mar. 14, 2005, Agrawal, Satish, et al.

U.S. Appl. No. 11/933,418, filed Oct. 31, 2007, Markovic, Milan, et al.

U.S. Appl. No. 12/542,680, filed Aug. 17, 2009, Gallagher, Michael, et al.

U.S. Appl. No. 12/542,689, filed Aug. 17, 2009, Gallagher, Michael, et al.

Portions of prosecution history of U.S. Appl. No. 10/116,311, Apr. 13, 2009, Mohammed, Jahangir.

Portions of prosecution history of U.S. Appl. No. 10/115,767, Feb. 9, 2009, Mohammed, Jahangir.

Portions of prosecution history of U.S. Appl. No. 10/116,186, Jan. 20, 2010, Mohammed, Jahangir.

Portions of prosecution history of U.S. Appl. No. 10/115,774, Aug. 19, 2003, Mohammed, Jahangir.

Portions of prosecution history of U.S. Appl. No. 10/251,901, Sep. 10, 2007, Gallagher, Michael, et al.

Portions of prosecution history of U.S. Appl. No. 11/004,439, Oct. 28, 2009, Gallagher, Michael.
Portions of prosecution history of U.S. Appl. No. 11/129,424, Jun. 16, 2009, Gallagher, Michael, et al.
Portions of prosecution history of U.S. Appl. No. 11/688,256, Dec. 15, 2009, Gallagher, Michael, et al.
Portions of prosecution history of U.S. Appl. No. 11/927,670, Feb. 24, 2009, Gallagher, Michael, et al.
Portions of prosecution history of U.S. Appl. No. 11/933,386, Jun. 26, 2009, Gallagher, Michael, et al.
International Search Report for PCT/US2003/004485, May 20, 2003, Kineto Wireless, Inc.
International Search Report and Written Opinion for PCT/US2004/015940, Mar. 4, 2005, Kineto Wireless, Inc.
International Preliminary Report on Patentability for PCT/US2004/015940, Nov. 21, 2006, Kineto Wireless, Inc.
International Search Report and Written Opinion for PCT/US2004/040858, Apr. 26, 2005, Kineto Wireless, Inc.
International Preliminary Report on Patentability for PCT/US2004/040858, Jun. 7, 2006, Kineto Wireless, Inc.
International Preliminary Report on Patentability for Written Opinion for PCT/US2005/040689, May 15, 2007, Kineto Wireless, Inc.
International Search Report and Written Opinion for PCT/US2007/083266, Apr. 2, 2008, Kineto Wireless, Inc.
International Preliminary Report on Patentability for Patentability for PCT/US2007/083266, May 5, 2009, Kineto Wireless, Inc.
International Search Report and Written Opinion for PCT/US2009/054098, Oct. 28, 2009, Kineto Wireless, Inc.
Erricson Press Release: "Ericsson presents the Mobile@Hometm concept," Mar. 21, 2001, http://www.ericsson.com/press/archive/2001Q1/20010321-0048.html, NPL Date Unknown, printed Jan. 6, 2004, pp. 1-2.
Claus Lindholt Hansen et al., "Mobile@Home—a New 1 Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, NPL Date Unknown, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C., et al., "Intelligent Handoff for Mobile Wireless Internet," *Mobile Networks and Applications*, Jan. 6, 2001 Kluwer Academic Publishers, Manufactured in the Netherlands (2001) pp. 67-79.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Mar. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, 13 pages.
"3$^{rd}$ Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhaned Cordless Telecommunications (DECT); DECT/UMTS Interworking Profile (IWP); Part 1: General Description and Overview*; ETSI TS 101 863-1 V1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 (Sep. 1, 2004) Technical Specification, 29 pages.
"Unlicensed Mobile Access (UMA); Architecture (Stage 2);" UMA Architecture (Stage 2) R1.0.0 (Sep. 1, 2004) Technical Specification, 78 pages.
"Unlicensed Mobile Access (UMA); Protocols (Stage 3);" UMA Protocols (Stage 3) R1.0.0 (Sep. 1, 2004) Technical Specification, 142 pages.
"Unlicensed Mobile Access (UMA); Architecture (Stage 2);" UMA Architecture (Stage 2) R1.0.1 (Oct. 8, 2004) Technical Specification, 80 pages.
"Unlicensed Mobile Access (UMA); Protocols (Stage 3);" UMA Protocols (Stage 3) R1.0.1 (Oct. 8, 2004) Technical Specification, 142 pages.
"Unlicensed Mobile Access (UMA); Architecture (Stage 2);" UMA Architecture (Stage 2) R1.0.2 (Nov. 3, 2004) Technical Specification, 79 pages.
"Unlicensed Mobile Access (UMA); Protocols (Stage 3);" UMA Protocols (Stage 3) R1.0.2 (Nov. 5, 2004) Technical Specification, 142 pages.
"Unlicensed Mobile Access (UMA); Architecture (Stage 2);" UMA Architecture (Stage 2) R1.0.3 (Feb. 28, 2005) Technical Specification, 85 pages.
"Unlicensed Mobile Access (UMA); Protocols (Stage 3);" UMA Protocols (Stage 3) R1.0.3 (Feb. 26, 2005) Technical Specification, 156 pages.
"Unlicensed Mobile Access (UMA); Architecture (Stage 2);" UMA Architecture (Stage 2) R1.0.4 (May 2, 2005) Technical Specification, 87 pages.
"Unlicensed Mobile Access (UMA); Protocols (Stage 3);" UMA Protocols (Stage 3) R1.0.4 (May 2, 2005) Technical Specification, 162 pages.
"3$^{rd}$ Generation Partnership Project; Technical Specification Group GSM/EDGE Radio Access Network; Generic Access to the A/Gb interface; Stage 2 (Release X);" 3GPP TS 43.318 V0.3.0 (Jan. 2005), 64 pages.
"Proposal for Stage 2 description for Generic Access to A/Gb interface", Tdoc GP-050403, Jan. 24-28, 2005, 1 page.
"3$^{rd}$ Generation Partnership Project; Technical Specification Group GSM/EDGE Radio Access Network; Generic Access to the A/Gb interface; Stage 2 (Release 6)" 3GPP TS 43.318 V0.4.0 (Jan. 2005), 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V2.0.0 (Jan. 2005), 66 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.0.0 (Jan. 2005), 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.1.0 (Jan. 2005), Apr. 2005, 68 pages.

"Proposal for Stage 3 description for Generic Access to A/Gb interface", Tdoc GP-050279, Jan. 18, 2005, 1 page.

"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0 (Jan. 2005), 133 pages.

"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0 (Apr. 2005), 161 pages.

"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0 (Apr. 2005), 160 pages.

"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0 (Apr. 2005), 152 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0 (Apr. 2005), 146 pages.

* cited by examiner

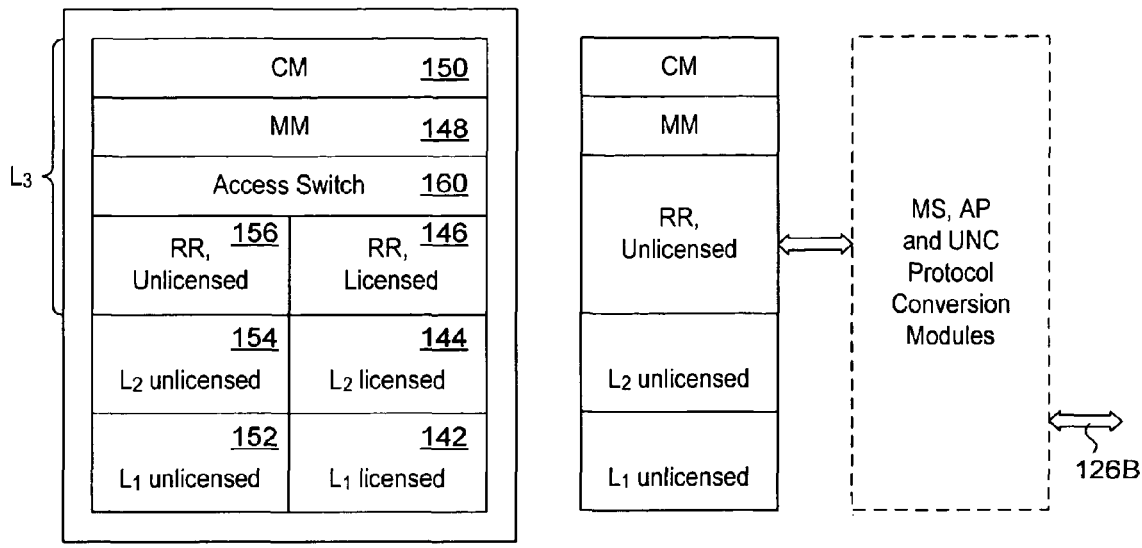
*Fig. 1B*  *Fig. 1C*
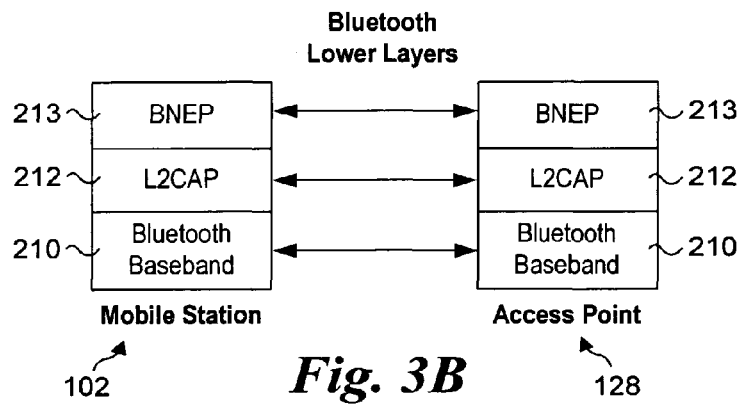
*Fig. 3B*
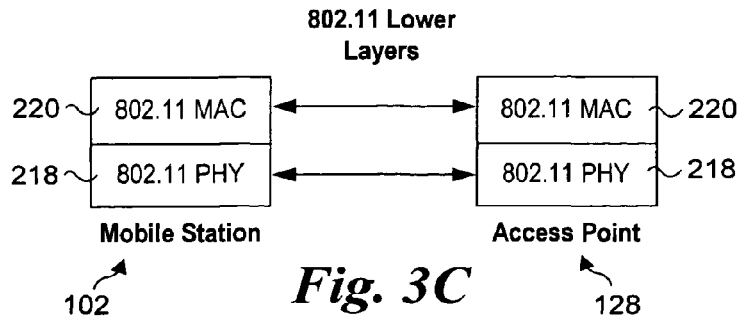
*Fig. 3C*

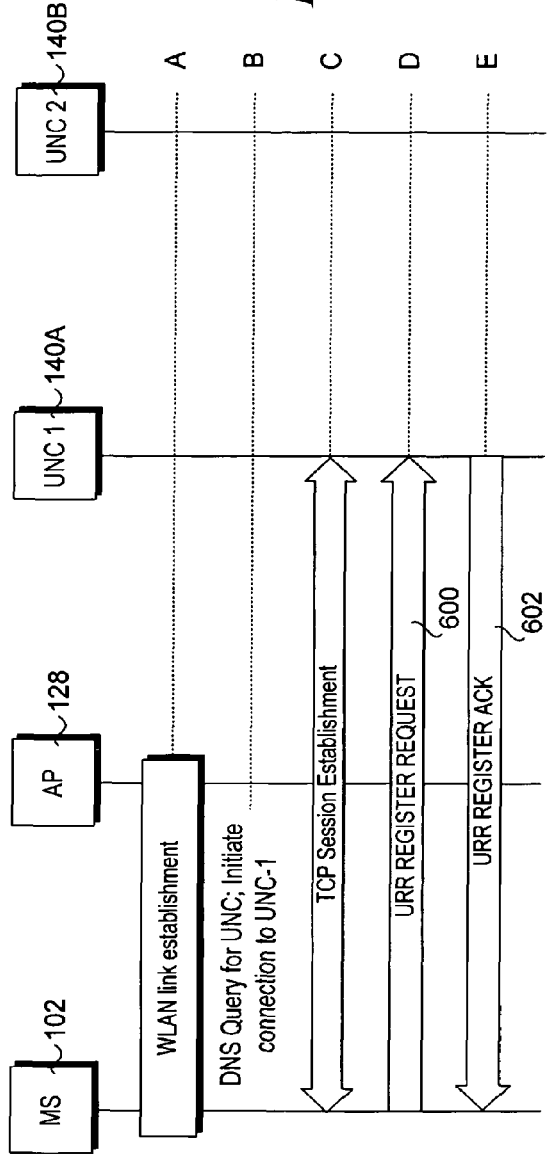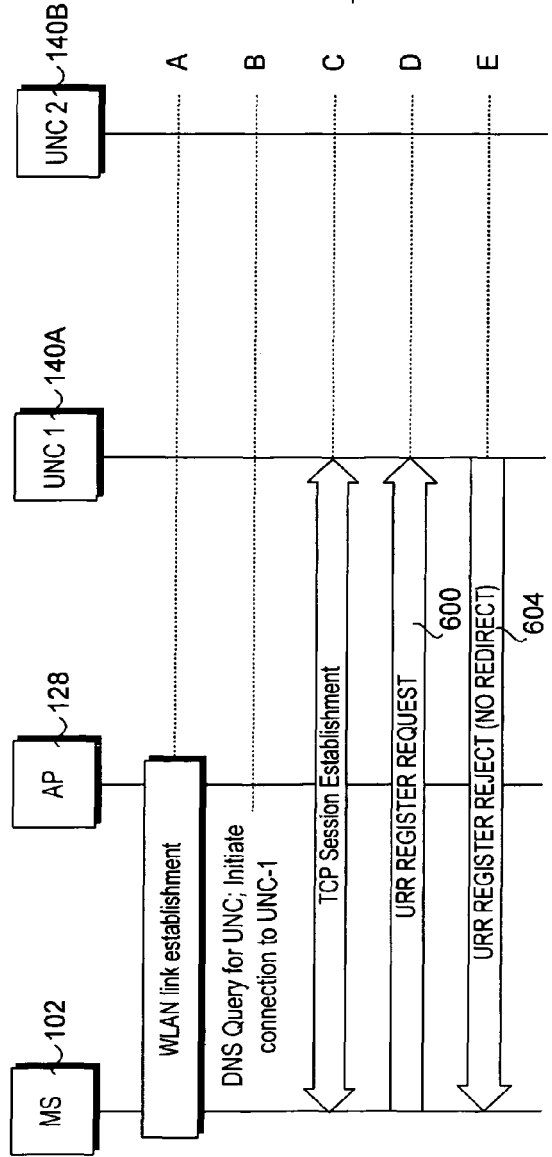

URR REGISTER REQUEST

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR REGISTER REQUEST Message Type | Message Type | M | V | 1 | 0011 0011 |
| UCI | UCI | M | V | 1 | 0, 1 or 9 |
| Mobile Identity | Mobile Identity | M | LV | 9 | 10.5.1.4/GSM04.08 |
| GSM RR state | GSM RR state | M | V | 1 | 0 – Idle<br>1 - Dedicated |
| GPRS Class Capability | GPRS Class | M | V | 1 | 0 – GSM only<br>1 – GPRS Class A<br>2 – GPRS Class B<br>3 – GPRS Class C |
| GPRS Downlink IP address | IP address | M | V | 4 | IP address |
| GPRS Downlink UDP port | Port | M | V | 2 | UDP port |
| Cell Identifier List (Preferred) | Cell Identifier List | O | TLV | 7n+3 (0<n<8) | 3.2.2.27/GSM08.08 |
| C1 List | C1 List | C | TLV | n+2 (0<n<8) | C1 Range: [0,63] |
| AP Identifier | MAC address | C | TLV | 6 | MAC id of AP |
| AP Location | Location | O | TLV | | Street address, lat, long |

600B

*Fig. 7A*

URR REGISTER REQUEST

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR REGISTER REQUEST Message Identity | Message Type | M | V | 1 | |
| Mobile Identity | Mobile Identity | M | LV | 10 | |
| UMA Release Indicator | UMA Release Indicator | M | V | 1 | |
| UMA Classmark | UMA Classmark | M | V | 4 | |
| AP Radio Identity | Radio Identity | C | TLV | 9 | |
| MS Radio Identity | Radio Identity | M | TLV | 9 | |
| GSM RR State | GSM RR State | M | TLV | 3 | |
| Coverage Indication | GSM Coverage Indication | M | TLV | 3 | |
| Cell Identity | Cell Identity | C | TLV | 3 | |
| Location Area Identification | Location Area Identification | C | TLV | 7 | |
| Routing Area Code | Routing Area Code | C | TLV | 3 | |
| Geographic Location | Geographic Location | O | TLV | 9-n | |
| AP Location | AP Location | O | TLV | 7 - n | |
| Register Reject Cause | Register Reject Cause | C | TLV | 3 | |
| Redirection Counter | Redirection Counter | C | TLV | 3 | |
| Last UNC SGW IP Address | IP Address | C | TLV | 7-19 | |
| Last UNC SGW FQDN | Fully Qualified Domain/Host Name | C | TLV | 5-258 | |
| Last UNC IP address | IP Address | C | TLV | 7-19 | |
| Last UNC FQDN | Fully Qualified Domain/Host Name | C | TLV | 5-258 | |
| AP Service Name | AP Service Name | C | TLV | 4-67 | |
| Registration Indicators | Registration Indicators | C | TLV | 3 | |
| UMA PLMN List | UMA PLMN List | C | TLV | n | |

Fig. 8A  URR REGISTER ACK  602A

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR REGISTER ACK Message Type | Message Type | M | V | 1 | 0011 0110 |
| UCI | UCI | M | V | 1 | 0, 1 or 9 |
| UMA System Information | UMA System Information | M | LV | 16 | |
| GPRS Uplink IP address | IP address | M | V | 4 | IP address |
| GPRS Uplink UDP port | Port | M | V | 2 | UDP port |
| Up Parameter Configuration | Up Parameter Configuration | O | TLV | | |
| Status | Status | O | TLV | 1 | |

Fig. 8B  UMA GSM SYSTEM INFORMATION

| 8 | 7 | 6 | 5 | 4 | 3 | 2 | 1 |
|---|---|---|---|---|---|---|---|
| colspan Length = 15 ||||||||
| UMA Cell Description encoded as V type IE as per §10.5.2.2 of GSM 04.08 ||||||||
| UMA Cell Description (continued) ||||||||
| UMA Location Area Identification encoded as V type IE as per §10.5.1.3 of GSM 04.08 ||||||||
| UMA Location Area Identification (continued) ||||||||
| UMA Location Area Identification (continued) ||||||||
| UMA Location Area Identification (continued) ||||||||
| UMA Location Area Identification (continued) ||||||||
| UMA Cell Identity encoded as V type IE as per §10.5.1.1 of GSM 04.08 ||||||||
| UMA Cell Identity (continued) ||||||||
| GLIR | ATT | TI 804 ||| UMA-CELL-RESELECT-HYSTERESIS |||
| T 3212 ||||||||
| AC C15 | AC C14 | AC C13 | AC C12 | AC C11 | EC C10 | AC C09 | AC C08 |
| AC C07 | AC C06 | AC C05 | AC C04 | AC C03 | EC C02 | AC C01 | AC C00 |
| TI 811 ||||||||
| TI 900 ||||||||
| Spare 0 | Spare 0 | Spare 0 | ECSM | UMA-BAND ||||
| GPRS Ind | Spare 0 | Spare 0 | UMA-GPRS-CELL-RESELECT-HYSTERESIS ||| NMO ||
| UMA-RAC ||||||||

URR REGISTER ACCEPT

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR REGISTER ACCEPT Message Identity | Message Type | M | V | 1 | |
| Cell Identity | Cell Identity | M | TLV | 4 | |
| Location Area Identification | Location Area Identification | M | TLV | 7 | |
| UNC Control Channel Description | UNC Control Channel Description | M | TLV | 8 | |
| TU3910 Timer | TU3910 Timer | M | TLV | 4 | |
| TU3906 Timer | TU3906 Timer | M | TLV | 4 | |
| UMA Band | UMA Band | M | TLV | 3 | |
| TU3920 Timer | TU3920 Timer | M | TLV | 4 | |
| UNC Cell Description | UMA Cell Description | O | TLV | 4 | |
| TU4001 Timer | TU4001 Timer | M | TLV | 4 | |
| TU4003 Timer | TU4003 Timer | C | TLV | 4 | |
| Location Status | Location Status | O | TLV | 3 | |
| UMA Service Zone Information | UMA Service Zone Information | O | TLV | 5-36 | |

URR REGISTER REJECT/REDIRECT

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR REGISTER REJ Message Type | Message Type | M | V | 1 | 0011 0111 |
| UCI | UCI | M | V | 1 | 0, 1 or 9 |
| UMA RR Cause | UMA RR Cause | M | V | 1 | |
| Redirected UNC Address | FQDN or IP address | O | LV | | |
| Redirected SGW Address | FQDN or IP address | O | LV | | |

*Fig. 9A*  604A

URR REGISTER REJECT

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR REGISTER REJECT Message Identity | Message Type | M | V | 1 | |
| Register Reject Cause | Register Reject Cause | M | TLV | 3 | |
| TU3907 Timer | TU3907 Timer | C | TLV | 4 | |
| Location Black List Indicator | Location Black List Indicator | C | TLV | 3 | |
| Location Area Identification | Location Area Identification | C | TLV | 7 | |

*Fig. 9B*  604B

URR REGISTER REDIRECT

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR REGISTER REDIRECT Message Identity | Message Type | M | V | 1 | |
| Serving UNC SGW IP Address | IP Address | C | TLV | 7-19 | |
| Serving UNC SGW FQDN | Fully Qualified Domain/Host Name | C | TLV | 5-258 | |
| Serving UNC IP address | IP Address | C | TLV | 7-19 | |
| Serving UNC FQDN | Fully Qualified Domain/Host Name | C | TLV | 5-258 | |
| Serving UNC Port Number | Communication Port | O | TLV | 4 | |
| Serving UNC Table Indicator | Serving UNC Table Indicator | M | TLV | 3 | |
| UMA PLMN List | UMA PLMN List | C | TLV | n | |

*Fig. 9C*   604C

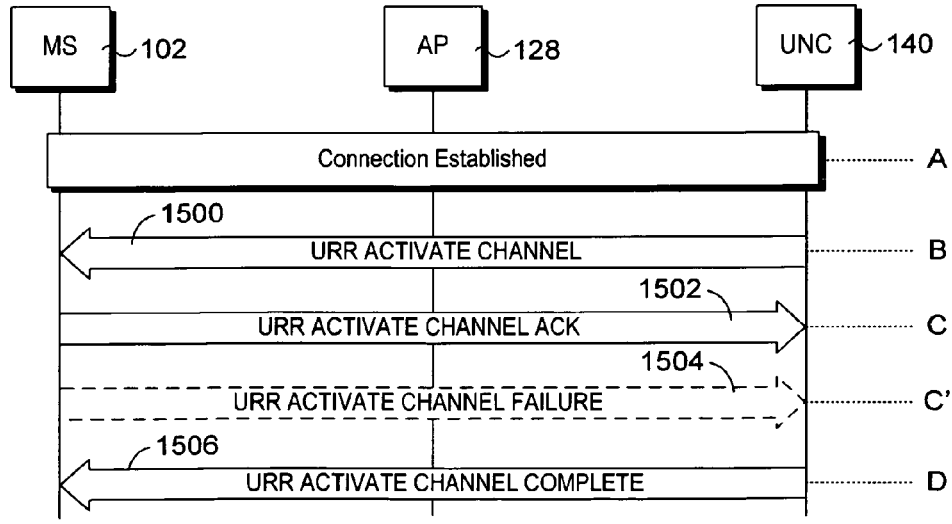

*Fig. 15*

URR REGISTER UPDATE UPLINK

| Information Element | Type/Reference | Presence | Format | Length | Value |
|---|---|---|---|---|---|
| UMA-RR Protocol Discriminator | Protocol Discriminator | M | V | ½ | 0110 |
| Skip Indicator | Skip Indicator | M | V | ½ | 0000 |
| URR REG UPDATE UPLINK Message Type | Message Type | M | V | 1 | 0011 1100 |
| UCI | UCI | M | V | 1 | 0, 1 or 9 |
| Reason | Reason | M | V | 1 | 0 Cell update 1 AP update |
| Cell Identifier List (Preferred) | Cell Identifier List | O | TLV | 7n+3 (0<n<8) | 3.2.2.27/GSM08.08 |
| C1 List | C1 List | C | TLV | n+2 (0<n<8) | C1 Range: [0,63] |
| AP Identifier | MAC address | C | TLV | 6 | MAC id of AP |
| AP Location | Location | O | TLV | | |

*Fig. 11A*  1000A

URR REGISTER UPDATE UPLINK

| Information Element | Type/Reference | Presence | Format | Length | Value |
|---|---|---|---|---|---|
| Length Indicator | Length Indicator | M | V | 2 | |
| UMA-RR Protocol Discriminator | Protocol Discriminator | M | V | ½ | 0001 |
| Skip Indicator | Skip Indicator | M | V | ½ | 0000 |
| URR REGISTER UPDATE UPLINK Message Identity | Message Type | M | V | 1 | |
| AP Radio Identity | Radio Identity | O | TLV | 9 | |
| Coverage Indication | Coverage Indication | O | TLV | 3 | |
| Cell Identity | Cell Identity | C | TLV | 4 | |
| Location Area Information | Location Area Information | C | TLV | 7 | |
| Routing Area Code | Routing Area Code | C | TLV | 3 | |
| Geographical Location | Geographical Location | O | TLV | 9-n | |
| AP Location | AP Location | O | TLV | | |

*Fig. 11B*  1000B

URR REGISTER UPDATE DOWNLINK

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR REG UPDATE DOWNLINK Message Type | Message Type | M | V | 1 | 0011 1101 |
| UCI | UCI | M | V | 1 | 0, 1 or 9 |
| Redirected UNC Address | FQDN or IP address | O | LV | | |
| Redirected SGW Address | FQDN or IP address | O | LV | | |
| Status | Status | O | TLV | | |

*Fig. 12A*      1002A

URR REGISTER UPDATE DOWNLINK

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR REGISTER UPDATE DOWNLINK Message Identity | Message Type | M | V | 1 | |
| Cell Identity | Cell Identity | M | TLV | 4 | |
| Location Area Identification | Location Area Identification | M | TLV | 7 | |
| UNC Control Channel Description | UNC Control Channel Description | M | TLV | 8 | |
| TU3910 Timer | TU3910 Timer | M | TLV | 4 | |
| TU3906 Timer | TU3906 Timer | M | TLV | 4 | |
| UMA Band | UMA Band | M | TLV | 3 | |
| TU3920 Timer | TU3920 Timer | M | TLV | 4 | |
| UNC Cell Description | UMA Cell Description | O | TLV | 4 | |
| TU4001 Timer | TU4001 Timer | M | TLV | 4 | |
| TU4003 Timer | TU4003 Timer | C | TLV | 4 | |
| Location Status | Location Status | O | TLV | 3 | |

*Fig. 12B*      1002B

URR DEREGISTER

| Information Element | Type/Reference | Presence | Format | Length | Value |
|---|---|---|---|---|---|
| UMA-RR Protocol Discriminator | Protocol Discriminator | M | V | ½ | 0110 |
| Skip Indicator | Skip Indicator | M | V | ½ | 0000 |
| URR DEREGISTER Message Type | Message type | M | V | 1 | 0011 1011 |
| URR Cause | URR Cause | M | V | 1 | |
| UCI | UCI | M | V | 1 | 0, 1 or 9 |

URR DEREGISTER

| Information Element | Type/Reference | Presence | Format | Length | Value |
|---|---|---|---|---|---|
| Length Indicator | Length Indicator | M | V | 2 | |
| UMA-RR Protocol Discriminator | Protocol Discriminator | M | V | ½ | 0001 |
| Skip Indicator | Skip Indicator | M | V | ½ | 0000 |
| URR DEREGISTER Message Identity | Message type | M | V | 1 | |
| Register Reject Cause | Register Reject Cause | M | TLV | 3 | |
| Location Black List Indicator | Location Black List Indicator | C | TLV | 3 | |
| Location Area Identification | Location Area Identification | C | TLV | 7 | |

URR CAUSE VALUES

| Bit | | | | | | | | Decimal | Description |
|---|---|---|---|---|---|---|---|---|---|
| 8 | 7 | 6 | 5 | 4 | 3 | 2 | 1 | | |
| 0 | 0 | 0 | 0 | 0 | 0 | 0 | 0 | 0 | Normal event |
| 0 | 0 | 0 | 0 | 0 | 0 | 0 | 1 | 1 | Abnormal release, unspecified |
| 0 | 0 | 0 | 0 | 0 | 0 | 1 | 0 | 2 | Abnormal release, channel unacceptable |
| 0 | 0 | 0 | 0 | 0 | 0 | 1 | 1 | 3 | Abnormal release, timer expired |
| 0 | 0 | 0 | 0 | 0 | 1 | 0 | 0 | 4 | Abnormal release, no activity on the radio path |
| 0 | 0 | 0 | 0 | 0 | 1 | 0 | 1 | 5 | Preemptive release |
| 0 | 0 | 0 | 0 | 1 | 0 | 0 | 0 | 8 | Handover impossible, timing advance out of range |
| 0 | 0 | 0 | 0 | 1 | 0 | 0 | 1 | 9 | Channel mode unacceptable |
| 0 | 0 | 0 | 0 | 1 | 0 | 1 | 0 | 10 | Frequency not-implemented |
| 0 | 1 | 0 | 0 | 0 | 0 | 0 | 1 | 65 | Call already cleared |
| 0 | 1 | 0 | 1 | 1 | 1 | 1 | 1 | 95 | Semantically incorrect message |
| 0 | 1 | 1 | 0 | 0 | 0 | 0 | 0 | 96 | Invalid mandatory information |
| 0 | 1 | 1 | 0 | 0 | 0 | 0 | 1 | 97 | Message type non-existent or not implemented |
| 0 | 1 | 1 | 0 | 0 | 0 | 1 | 0 | 98 | Message type not compatible with protocol state |
| 0 | 1 | 1 | 0 | 0 | 1 | 0 | 0 | 100 | Conditional IE error |
| 0 | 1 | 1 | 0 | 0 | 1 | 0 | 1 | 101 | No cell allocation available |
| 0 | 1 | 1 | 0 | 1 | 1 | 1 | 1 | 111 | Protocol error unspecified |
| 1 | 0 | 0 | 0 | 1 | 1 | 0 | 0 | 140 | Unauthorizeed subscriber |
| 1 | 0 | 0 | 0 | 1 | 1 | 0 | 1 | 141 | Radio channel bearer failure |
| 1 | 0 | 0 | 0 | 1 | 1 | 1 | 0 | 142 | GSM RR busy |
| 1 | 0 | 0 | 0 | 1 | 1 | 1 | 1 | 143 | TI811 timeout |
| 1 | 0 | 0 | 1 | 0 | 0 | 0 | 0 | 144 | Link detach |
| 1 | 0 | 0 | 1 | 0 | 0 | 0 | 1 | 145 | TI900 timeout |
| 1 | 0 | 0 | 1 | 0 | 0 | 1 | 0 | 146 | Signaling CHANNEL FAILURE |
| 1 | 0 | 0 | 1 | 0 | 0 | 1 | 1 | 147 | MS is not attached |
| 1 | 0 | 0 | 1 | 0 | 1 | 0 | 0 | 148 | Loss of radio connection |
| 1 | 0 | 0 | 1 | 0 | 1 | 0 | 1 | 149 | Radio channel assignment failure |
| 1 | 0 | 0 | 1 | 0 | 1 | 1 | 0 | 150 | VoIP channel establishment failure |

*Fig. 14*

URR ACTIVATE CHANNEL

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR ACTIVATE CHANNEL Message Type | Message type | M | V | 1 | 0010 1110 |
| UCI | UCI | M | V | 1 | 0, 1 or 9 |
| Channel Mode | Channel Mode | M | V | 1 | 10.5.2.6/GSM04.08 |
| UNC SDP | SDP | M | LV | | Per RFC 2327, RFC 3551 and RFC 3267 |
| CIPHER Mode Setting | CIPHER Mode Setting | O | TV | 1 | 10.5.2.9/GSM04.08 |

*Fig. 16A*  1500A

URR ACTIVATE CHANNEL

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR ACTIVATE CHANNEL Message Identity | Message type | M | V | 1 | |
| Channel Mode | Channel Mode | M | TLV | 3 | |
| Sample Size | Sample Size | M | TLV | 3 | CS payload sample size in ms |
| IP Address | IP Address | M | TLV | 7-19 | |
| RDP UDP Port | Communication Port | M | TLV | 4 | |
| Payload Type | Payload Type | O | TLV | 3 | |
| Multi-rate Configuration | Multi-rate Configuration | C | TLV | 3-n | |
| RTP Redundancy Configuration | RTP Redundancy Configuration | C | TLV | 3-6 | |
| RTCP UDP Port | Communication Port | O | TLV | 4 | |

*Fig. 16B*  1500B

URR ACTIVATE CHANNEL ACK

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR ACTIVATE CHANNEL Ack Message Type | Message type | M | V | 1 | 0010 1001 |
| UCI | UCI | M | V | 1 | 0, 1 or 9 |
| MS SDP | SDP | M | LV | | Per RFC 2327, RFC 3551 and RFC 3267 |
| Cell Identifier List (Preferred) | Cell Identifier List | O | TLV | 7n+3 (0<n<8) | 3.2.2.27/GSM08.08 |
| C1 List | C1 List | C | TLV | n+2 (0<n<8) | C1 Range: [0,63] |

*Fig. 17A*    1502A

URR ACTIVATE CHANNEL ACK

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR ACTIVATE CHANNEL Ack Message Identity | Message type | M | V | 1 | |
| RTP UDP Port | Communication Port | M | TLV | 4 | |
| Sample Size | Sample Size | M | TLV | 3 | CS payload sample size in ms |
| Payload Type | Payload Type | O | TLV | 3 | |
| RTCP UDP Port | Communication Port | O | TLV | 4 | |

*Fig. 17B*    1502B

URR ACTIVATE CHANNEL FAILURE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR ACTIVATE CHANNEL FAILURE Message Type | Message type | M | V | 1 | 0010 1111 |
| UCI | UCI | M | V | 1 | 0, 1 or 9 |
| UMA RR Cause | UMA RR Cause | M | V | 1 | |
| Cell Identifier List (Preferred) | Cell Identifier List | O | TLV | 7n+3 (0<n<8) | 3.2.2.27/GSM08.08 |
| C1 List | C1 List | C | TLV | n+2 (0<n<8) | C1 Range: [0,63] |

*Fig. 18A*    1504A

URR ACTIVATE CHANNEL FAILURE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR ACTIVATE CHANNEL FAILURE Message Identity | Message type | M | V | 1 | |
| UMA RR Cause | UMA RR Cause | M | TLV | 3 | |

*Fig. 18B*    1504B

URR ACTIVATE CHANNEL COMPLETE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR ACTIVATE CHANNEL COMPLETE Message Type | Message type | M | V | 1 | 0010 1010 |
| UCI | UCI | M | V | 1 | 0, 1 or 9 |

*Fig. 19A*      1506A

URR ACTIVATE CHANNEL COMPLETE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR ACTIVATE CHANNEL COMPLETE Message Identity | Message type | M | V | 1 | |

*Fig. 19B*      1506B

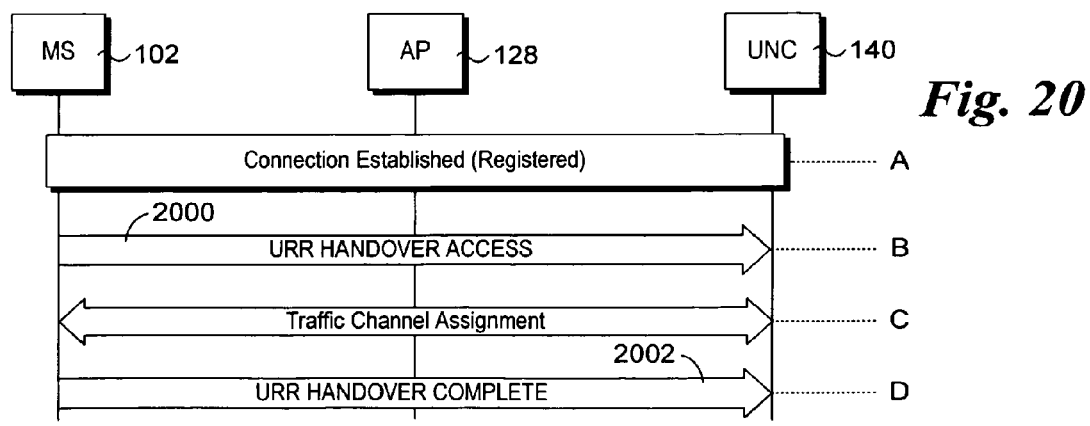

*Fig. 20*

URR HANDOVER ACCESS

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR HANDOVER ACCESS Message Type | Message type | M | V | 1 | 0010 1101 |
| UCI | UCI | M | V | ½ | 1 or 9 |
| HANDOVER COMMAND message | HANDOVER COMMAND layer 3 message | M | V | variable | 9.1.15/GSM04.08 |

*Fig. 21A*  2000A

URR HANDOVER ACCESS

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR HANDOVER ACCESS Message Identity | Message type | M | V | 1 | |
| Handover to UMAN Command | L3 Message | M | TLV | variable | |

*Fig. 21B*  2000B

URR HANDOVER COMPLETE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| UMA HANDOVER COMPLETE Message Type | Message type | M | V | 1 | 0010 1100 |
| UCI | UCI | M | V | 1 | 0, 1 or 9 |

*Fig. 22A*     2002A

URR HANDOVER COMPLETE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0110 |
| Skip Indicator | Skip Indicator | M | V | ½ | 0000 |
| UMA HANDOVER COMPLETE Message Identity | Message type | M | V | 1 | 0010 1100 |

*Fig. 22B*     2002B

URR UPLINK QUALITY INDICATION

| Information Element | Type/Reference | Presence | Format | Length | Value |
|---|---|---|---|---|---|
| Length Indication | Length Indication | M | V | 2 | |
| UMA RR Protocol Discriminator | Protocol Discriminator | M | V | ½ | 0001 |
| Skip Indicator | Skip Indicator | M | V | ½ | 0000 |
| URR UPLINK QUALITY IND Message Type | Message Type | M | V | 1 | |
| UL Quality Indication | UL Quality Indication | M | V | 3 | |

*Fig. 24*     2300

URR HANDOVER REQUIRED

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR HANDOVER REQUIRED Message Type | Message type | M | V | 1 | 0001 0001 |
| UCI | UCI | M | V | 1 | 0, 1 or 9 |
| Channel Mode | Channel Mode | M | V | 1 | 10.5.2.6/GSM04.08 |
| Cell Identifier List (Preferred) | Cell Identifier List | M | LV | 7n+2 (0<n<8) | 3.2.2.27/GSM08.08 |
| C1 List | C1 List | M | LV | n+1 (0<n<8) | C1 Range: [0,63] |

*Fig. 25A*    2302A

URR HANDOVER REQUIRED

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR HANDOVER REQUIRED Message Identity | Message type | M | V | 1 | |
| GERAN Cell Identifier List | Cell Identifier List | C | TLV | n | |
| GERAN Received Signal Lever List | Received Signal Level List | C | TLV | n | |
| UTRAN Cell Identifier List | UTRAN Cell Identifier List | C | TLV | n | |
| UTRAN Received Signal Level List | Received Signal Level List | C | TLV | n | |

*Fig. 25B*    2302B

URR HANDOVER COMMAND

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR HANDOVER COMMAND Message Type | Message type | M | V | 1 | 0010 1011 |
| UCI | UCI | M | V | 1 | 0, 1 or 9 |
| Cell Description | Cell Description | M | V | 2 | 10.5.2.2/GSM04.08 |
| Description of the first channel, after time | Channel Description 2 | M | V | 3 | 10.5.2.5a/GSM04.08 |
| Handover Reference | Handover Reference | M | V | 1 | 10.5.2.15/GSM04.08 |
| Power Command and Access type | Power command and access type | M | V | 1 | 10.5.2.28a/GSM04.08 |
| Synchronization indication | Synchronization indication | O | TV | 1 | 10.5.2.39/GSM04.08 |
| Frequency Short List, after time | Frequency Short List | C | TV | 10 | 10.5.2.14/GSM04.08 |
| Frequency List, after time | Frequency List | C | TLV | 4-131 | 10.5.2.13/GSM04.08 |
| Cell Channel Description | Cell Channel Description | C | TV | 17 | 10.5.2.1b/GSM04.08 |
| Mode of the First Channel | Channel Mode | O | TV | 2 | 10.5.2.6/GSM04.08 |
| Frequency Channel Sequence, after time | Frequency Channel Sequence | C | TV | 10 | 10.5.2.12/GSM04.08 |
| Mobile Allocation, after time | Mobile Allocation | C | TLV | 3-10 | 10.5.2.21/GSM04.08 |
| Starting Time | Starting Time | O | TV | 3 | 10.5.2.38/GSM04.08 |
| Timing Advance | Timing Advance | C | TV | 2 | 10.5.2.40/GSM04.08 |
| Frequency Short List, before time | Frequency Short List | C | TV | 10 | 10.5.2.14/GSM04.08 |
| Frequency List, before time | Frequency List | C | TLV | 4-131 | 10.5.2.13/GSM04.08 |
| Description of the first channel, before time | Channel Description 2 | O | TV | 4 | 10.5.2.5a/GSM04.08 |

URR HANDOVER COMMAND (Continued)

| Information Element | Type/Reference | Presence | Format | Length | Value |
|---|---|---|---|---|---|
| Frequency Channel Sequence, after time | Frequency Channel Sequence | C | TV | 10 | 10.5.2.12/GSM04.08 |
| Mobile Allocation, after time | Mobile Allocation | C | TLV | 3-10 | 10.5.2.21/GSM04.08 |
| Starting Time | Starting Time | O | TV | 3 | 10.5.2.38/GSM04.08 |
| Timing Advance | Timing Advance | C | TV | 2 | 10.5.2.40/GSM04.08 |
| Frequency Short List, before time | Frequency Short List | C | TV | 10 | 10.5.2.14/GSM04.08 |
| Frequency List, before time | Frequency List | C | TLV | 4-131 | 10.5.2.13/GSM04.08 |
| Description of the first channel, before time | Channel Description 2 | O | TV | 4 | 10.5.2.5a/GSM04.08 |
| Frequency Channel Sequence, before time | Frequency Channel Sequence | C | TV | 10 | 10.5.2.12/GSM04.08 |
| Mobile Allocation, before time | Mobile Allocation | C | TLV | 3-10 | 10.5.2.21/GSM04.08 |
| CIPHER Mode Setting | CIPHER Mode Setting | O | TV | 1 | 10.5.2.9/GSM04.08 |
| Multi-rate Configuration | Multi-rate Configuration | O | TLV | 4-8 | 10.5.2.21aa/GSM04.08 |

*Fig. 26B*      2304A

URR HANDOVER COMMAND

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR HANDOVER COMMAND Message Indicator | Message type | M | V | 1 | |
| Handover From UMAN Command | Handover From UMAN Command | M | TLV | n | |

*Fig. 26C*      2304B

URR HANDOVER FAILURE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR HANDOVER FAILURE Message Type | Message type | M | V | 1 | 0010 1000 |
| UCI | UCI | M | V | 1 | 0, 1 or 9 |
| UMA RR Cause | UMA RR Cause | M | V | 1 | |

*Fig. 27A*   2406A

URR HANDOVER FAILURE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR HANDOVER FAILURE Message Identity | Message type | M | V | 1 | |
| RR Cause | RR Cause | M | TLV | 3 | |

*Fig. 27B*   2406B

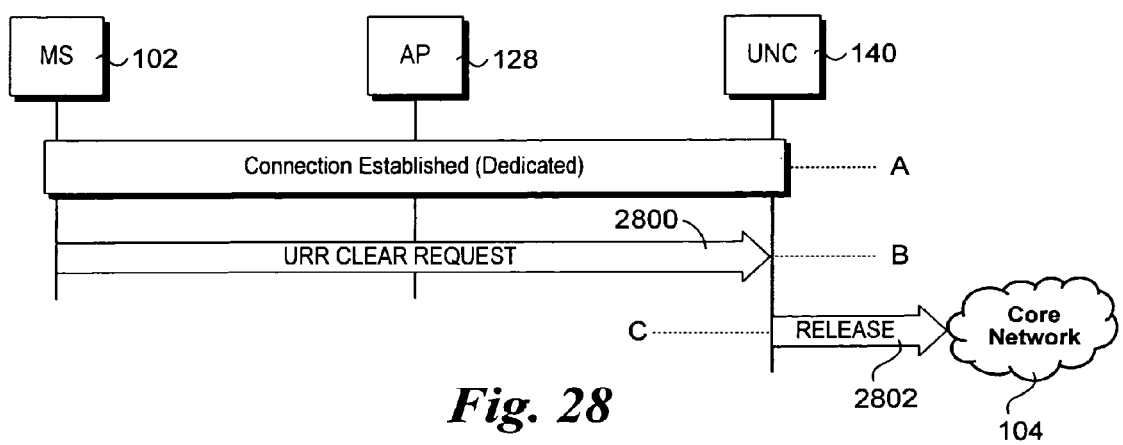

*Fig. 28*

URR RR CLEAR REQUEST

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR RR CLEAR REQUEST Message Type | Message type | M | V | 1 | 0011 1111 |
| UCI | UCI | M | V | 1 | 0, 1 or 9 |

*Fig. 29A*            2800A

URR CLEAR REQUEST

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR RR CLEAR REQUEST Message Type | Message type | M | V | 1 | |
| RR Cause | RR Cause | M | TLV | 3 | |

*Fig. 29B*            2800B

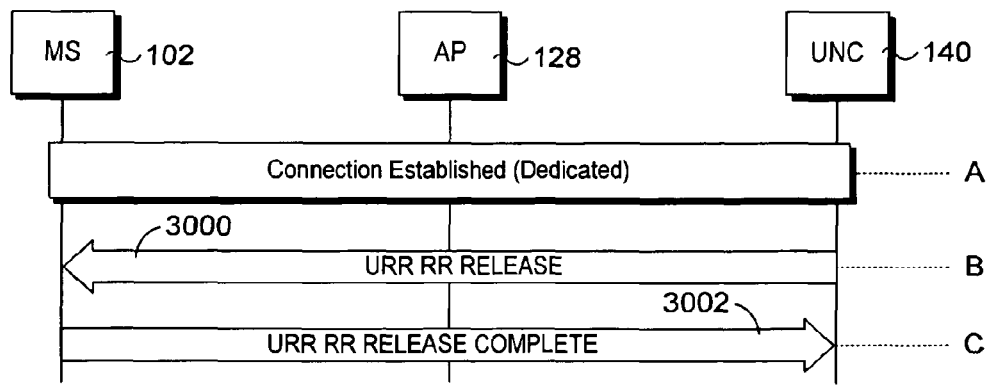

*Fig. 30*

URR RR RELEASE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR RR RELEASE Message Type | Message type | M | V | 1 | 0000 1101 |
| UCI | UCI | M | V | 1 | 0, 1 or 9 |
| UMA RR Cause | UMA RR Cause | M | V | 1 | |
| GPRS Resumption | GPRS Resumption | O | TV | 1 | 10.5.2.14c/GSM04.08 |

*Fig. 31A*   3000A

URR RELEASE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR RR RELEASE Message Identity | Message type | M | V | 1 | |
| UMA RR Cause | UMA RR Cause | M | V | 1 | |
| GPRS Resumption | GPRS Resumption | O | TV | 1 | |

*Fig. 31B*   3000B

URR RR RELEASE COMPLETE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR RR RELEASE COMPLETE Message Type | Message type | M | V | 1 | 0000 1111 |
| UCI | UCI | M | V | 1 | 0, 1 or 9 |

*Fig. 32A*  3002A

URR RELEASE COMPLETE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR RELEASE COMPLETE Message Identity | Message type | M | V | 1 | |

*Fig. 32B*  3002B

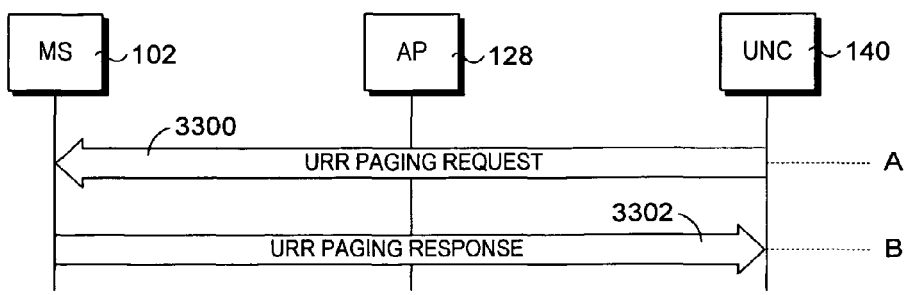

*Fig. 33*

URR PAGING REQUEST

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR PAGING REQUEST Message Type | Message type | M | V | 1 | 0010 0001 |
| UCI | UCI | M | V | 1 | 0, 1 or 9 |
| Spare Half Octet | Spare Half Octet | M | V | ½ | 10.5.1.8/GSM04.08 |
| Channel Needed | Channel Needed | M | V | ½ | 10.5.2.8/GSM04.08 |
| Mobile Identity | Mobile Identity | M | LV | 2-9 | 10.5.1.4/GSM04.08 |

*Fig. 34A*    3300A

URR PAGING REQUEST

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR PAGING REQUEST Message Identity | Message type | M | V | 1 | |
| Channel Needed | Channel Needed | M | TLV | 3 | |
| Mobile Identity | Mobile Identity | M | TLV | 7-10 | |

*Fig. 34B*    3300B

URR PAGING RESPONSE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR PAGING RESPONSE Message Type | Message type | M | V | 1 | 0010 0111 |
| UCI | UCI | M | V | 1 | 0, 1 or 9 |
| Ciphering Key Sequence Number | Ciphering Key Sequence Number | M | V | ½ | 10.5.1.2/GSM04.08 |
| Spare Half Octet | Spare Half Octet | M | V | ½ | 10.5.1.8/GSM04.08 |
| Mobile Station Classmark | Mobile Station Classmark 2 | M | LV | 4 | 10.5.1.6/GSM04.08 |
| Mobile Identity | Mobile Identity | M | LV | 2-9 | 10.5.1.4/GSM04.08 |

*Fig. 35A*  3302A

URR PAGING RESPONSE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR PAGING RESPONSE Message Identity | Message type | M | V | 1 | |
| Ciphering Key Sequence Number | Ciphering Key Sequence Number | M | V | 3 | |
| Mobile Station Classmark 2 | Mobile Station Classmark 2 | M | TLV | 5 | |
| Mobile Identity | Mobile Identity | M | TLV | 7-10 | |
| Establishment Cause | Establishment Cause | M | TLV | 3 | |

*Fig. 35B*  3302B

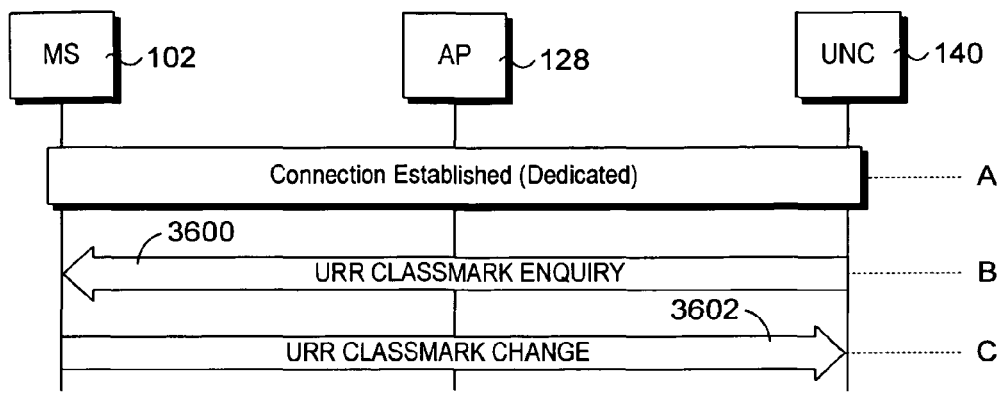

Fig. 36

URR CLASSMARK ENQUIRY

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR CLASSMARK ENQUIRY Message Type | Message type | M | V | 1 | 0001 0011 |
| UCI | UCI | M | V | 1 | 0, 1 or 9 |

Fig. 37A  3600A

URR CLASSMARK ENQUIRY

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR CLASSMARK ENQUIRY Message Identity | Message type | M | V | 1 | |
| Classmark Enquiry Mask | Classmark Enquiry Mask | O | TLV | 3 | |

Fig. 37B  3600B

URR CLASSMARK CHANGE

| Information Element | Type/Reference | Presence | Format | Length | Value |
|---|---|---|---|---|---|
| UMA RR Protocol Discriminator | Protocol Discriminator | M | V | ½ | 0110 |
| Skip Indicator | Skip Indicator | M | V | ½ | 0000 |
| URR CLASSMARK CHANGE Message Type | Message type | M | V | 1 | 0001 0110 |
| UCI | UCI | M | V | 1 | 0, 1 or 9 |
| Mobile Station Classmark | Mobile Station Classmark 2 | M | LV | 4 | 10.5.1.6/GSM04.08 |
| Additional Mobile Station Classmark Information | Mobile Station Classmark 3 | C | TLV | 3-14 | 10.5.1.7/GSM04.08 |

*Fig. 38A*      3602A

URR CLASSMARK CHANGE

| Information Element | Type/Reference | Presence | Format | Length | Value |
|---|---|---|---|---|---|
| Length Indicator | Length Indicator | M | V | 2 | |
| UMA RR Protocol Discriminator | Protocol Discriminator | M | V | ½ | 0001 |
| Skip Indicator | Skip Indicator | M | V | ½ | 0000 |
| URR CLASSMARK CHANGE Message Identity | Message type | M | V | 1 | |
| Mobile Station Classmark 2 | Mobile Station Classmark 2 | M | TLV | 5 | |
| Additional Mobile Station Classmark Information | Mobile Station Classmark 3 | C | TLV | 3-14 | |

*Fig. 38B*      3602B

HANDOVER MESSAGING IN AN UNLICENSED MOBILE ACCESS TELECOMMUNICATIONS SYSTEM

CROSS-REFERENCE TO RELATED APPLICATIONS

Claim of Benefit to Prior Applications

This application is a continuation of U.S. Non-provisional application Ser. No. 11/129,424, now issued as U.S. Pat. No. 7,565,145, entitled "Handover Messaging in an Unlicensed Mobile Access Telecommunications System," filed May 12, 2005, which is incorporated herein by reference. U.S. Non-provisional application Ser. No. 11/129,424 claims the priority of provisional patent application Ser. No. 60/571,421, filed May 14, 2004, and entitled "Up Interface Stage 3 Description." U.S. Non-provisional application Ser. No. 11/129,424 application is a Continuation in Part of U.S. Non-provisional application Ser. No. 11/013,883, now issued as U.S. Pat. No. 7,640,008, entitled "Apparatus and Method for Extending the Coverage Area of A Licensed Wireless Communication System Using an Unlicensed Wireless Communication System," filed Dec. 15, 2004. U.S. Non-provisional application Ser. No. 11/129,424 is a Continuation in Part of U.S. Non-provisional application Ser. No. 11/097,866, now issued as U.S. Pat. No. 7,873,015, entitled "Method and System for Registering an Unlicensed Mobile Access Subscriber with a Network Controller," filed Mar. 31, 2005. U.S. Non-provisional application Ser. No. 11/097,866 claims the priority to provisional patent application Ser. No. 60/564,696, filed Apr. 22, 2004 and entitled "UMA Network Controller (UNC) Selection and UMA Location Services Support Mechanisms." U.S. Non-provisional application Ser. No. 11/097,866 is a Continuation in Part of U.S. Non-provisional application Ser. No. 10/688,470, now issued as U.S. Pat. No. 7,127,250, entitled "Apparatus and Method for Extending the Coverage Area of a Licensed Wireless Communication System Using an Unlicensed Wireless Communication System," filed Oct. 17, 2003. U.S. Non-provisional application Ser. No. 11/097,866 is a Continuation in Part of U.S. Non-provisional application Ser. No. 11/013,883. U.S. Non-provisional application Ser. No. 11/013,883 claims priority to Provisional Patent Application Ser. No. 60/530,141, filed Dec. 16, 2003 and entitled "Unlicensed Mobile Access (UMA) Architecture." U.S. Non-provisional application Ser. No. 11/013,883 claims priority to Provisional Patent Application Ser. No. 60/552,455, filed Mar. 12, 2004, and entitled "Unlicensed Mobile Access Mobility Management and Emergency Services." U.S. Non-provisional application Ser. No. 11/013,883 is a Continuation in Part of U.S. Non-provisional application Ser. No. 10/688,470. U.S. Non-provisional application Ser. No. 10/688,470 claims priority to Provisional Patent Application Ser. No. 60/419,785, filed Oct. 18, 2002 and entitled "Method for Extending the Coverage Area of a Licensed Wireless Communication System using an Unlicensed Wireless Communication System."

This application is also related to commonly owned U.S. applications: Ser. No. 10/115,833 now issued as U.S. Pat. No. 6,922,559, entitled, "Unlicensed Wireless Communications Base Station to Facilitate Unlicensed and Licensed Wireless Communications with a Subscriber Device, and Method of Operation," filed Apr. 2, 2002; and application Ser. No. 10/251,901, now issued as U.S. Pat. No. 7,308,263, entitled "Apparatus for Supporting the Handover of a Telecommunication Session between a Licensed Wireless System and an Unlicensed Wireless System," filed Sep. 20, 2002, the contents of each of which are hereby incorporated by reference. In addition, this application contains common subject matter disclosed in U.S. patent application Ser. No. 11/129,134, filed May 12, 2005, now issued as U.S. Pat. No. 7,953,423; U.S. patent application Ser. No. 11/129,131 filed May 12, 2005, now issued as U.S. Pat. No. 7,349,698; and U.S. patent application Ser. No. 11/128,615 filed May 12, 2005, now issued as U.S. Pat. No. 7,471,655.

FIELD OF THE INVENTION

The field of invention relates generally to telecommunications. More particularly, this invention relates to messaging employed in an unlicensed mobile access (UMA) telecommunication system that includes both licensed and unlicensed radio infrastructure.

BACKGROUND INFORMATION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks have seen rapid growth. For example, such unlicensed wireless systems may support wireless communication based on the IEEE 802.11a, b or g standards (WiFi), or the Bluetooth™ standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth™ standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system, and for directing them to an appropriate network controller. In order to support more rapid implementation by various vendors, a standardized set of messages for performing various functions, such as registration, channel activation, handover, and the like are needed.

SUMMARY OF THE INVENTION

In accordance with aspects of the present invention methods and messages for performing handovers between an unlicensed mobile access network (UMAN) comprising a first radio access network and a second radio access network are disclosed. To facilitate the handover, URR (UMA radio resource) handover messages are exchanged between a mobile station (MS) and a UMA network controller (UNC) operating in the UMAN. By employing a wireless link using an unlicensed radio frequency, such as an 802.11-based link or a Bluetooth™ link, the MS may access the UMAN via a wireless access point (AP) that is communicatively-coupled to the UNC via an IP network. The URR handover messages are sent between the MS and the UNC using an Up interface comprising a set of layered protocols over an underlying IP transport. The handover methods include both handover from a UMAN to the second radio access network, and handover from the second radio access network to the UMAN.

In another aspect of the present invention, URR handover messages with specific formats are disclosed. The messages include a URR HANDOVER REQUIRED message, a URR HANDOVER ACCESS message, a URR HANDOVER COMMAND message, a URR HANDOVER COMPLETE message, and a URR HANDOVER FAILURE message. Each of the URR handover messages includes a basic set of information elements (IEs) including a protocol discriminator, a skip indicator, and a message type via which the message may be identified. Further IEs relevant to each particular URR handover message are also disclosed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1B illustrates protocol layers of a mobile set in accordance with one embodiment;

FIG. 1C illustrates a method of protocol conversion in accordance with one embodiment;

FIG. 3B shows Bluetooth lower layers employed by a mobile station and access point to facilitate physical layer communications;

FIG. 3C shows Bluetooth lower layers employed by a mobile station and access point to facilitate physical layer communications;

FIG. 6A illustrates a URR Register message exchange corresponding to a successful registration;

FIG. 6B illustrates a URR Register message exchange corresponding to a rejected registration;

FIGS. 7A and 7B are tables illustrating respective embodiments of a URR REGISTER REQUEST message format;

FIG. 8A is a table illustrating one embodiment of a URR REGISTER ACK message format;

FIG. 8B is a table illustrating one embodiment of a UMA GSM System Information information element;

FIG. 8C is a table illustrating one embodiment of a URR REGISTER ACCEPT message format;

FIG. 9A is a table illustrating one embodiment of a URR REGISTER REJECT/REDIRECT message format;

FIG. 9B is a tables illustrating one embodiment of a URR REGISTER REJECT message format;

FIG. 9C is a table illustrating one embodiment of a URR REGISTER REDIRECT message format;

FIGS. 11A and 11B are tables illustrating respective embodiments of a URR REGISTER UPDATE UPLINK message format;

FIGS. 12A and 12B are tables illustrating respective embodiments of a URR REGISTER UPDATE DOWNLINK message format;

FIGS. 13A and 13B are tables illustrating respective embodiments of a URR DEREGISTER message format;

FIG. 14 is a table illustrating one embodiment of a lookup table containing 8-bit values corresponding to causes for various URR actions;

FIG. 15 illustrates a channel activation message sequence;

FIGS. 16A and 16B are tables illustrating respective embodiments of a URR ACTIVATE CHANNEL message format;

FIGS. 17A and 17B are tables illustrating respective embodiments of a URR ACTIVATE CHANNEL ACK message format;

FIGS. 18A and 18B are tables illustrating respective embodiments of a URR ACTIVATE CHANNEL FAILURE message format;

FIGS. 19A and 19B are tables illustrating respective embodiments of a URR ACTIVATE CHANNEL COMPLETE message format;

FIG. 20 illustrates a handover message sequence initiated by a mobile station;

FIGS. 21A and 21B are tables illustrating respective embodiments of a URR HANDOVER ACCESS message format;

FIGS. 22A and 22B are tables illustrating respective embodiments of a URR HANDOVER COMPLETE message format;

FIG. 24 is a table illustrating one embodiment of a URR UPLINK QUALITY INDICATION message format;

FIGS. 25A and 25B are tables illustrating respective embodiments of a URR HANDOVER REQUIRED message format;

FIGS. 26A and 26B are table portions illustrating one embodiment of a URR HANDOVER COMMAND message format;

FIG. 26C is a table illustrating another embodiment of a URR HANDOVER COMMAND message format;

FIGS. 27A and 27B are tables illustrating respective embodiments of a URR HANDOVER FAILURE message format;

FIG. 28 illustrates a URR CLEAR REQUEST message sent from a mobile station to a UNC;

FIGS. 29A and 29B are tables illustrating respective embodiments of a URR CLEAR REQUEST message format;

FIG. 30 illustrates a URR release message sequence initiated by a UNC;

FIGS. 31A and 31B are tables illustrating respective embodiments of a URR RR RELEASE message format;

FIGS. 32A and 32B are tables illustrating respective embodiments of a URR RR RELEASE COMPLETE message format;

FIG. 33 illustrates a URR paging message sequence initiated by a UNC;

FIGS. 34A and 34B are tables illustrating respective embodiments of a URR PAGING REQUEST message format;

FIGS. 35A and 35B are tables illustrating respective embodiments of a URR PAGING RESPONSE message format;

FIG. 36 illustrates a URR classmark message sequence initiated by a UNC;

FIGS. 37A and 37B are tables illustrating respective embodiments of a URR CLASSMARK ENQUIRY message format;

FIGS. 38A and 38B are tables illustrating respective embodiments of a URR CLASSMARK CHANGE message format;

DETAILED DESCRIPTION

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present description the unlicensed wireless system may be a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Application of the present invention to this type of device enables the wireless service provider to offer so-called landline replacement service to users, even for user locations not sufficiently covered by the licensed wireless system. The present description is in the context of the UMA (Unlicensed Mobile Access) standardized architecture as promulgated by the UMA consortium. However, the invention is not so limited.

Throughout the following description, acronyms commonly used in the telecommunications industry for wireless services are utilized along with acronyms specific to the present invention. A table of acronyms specific to this application is included in Appendix I.

Figure 1A:
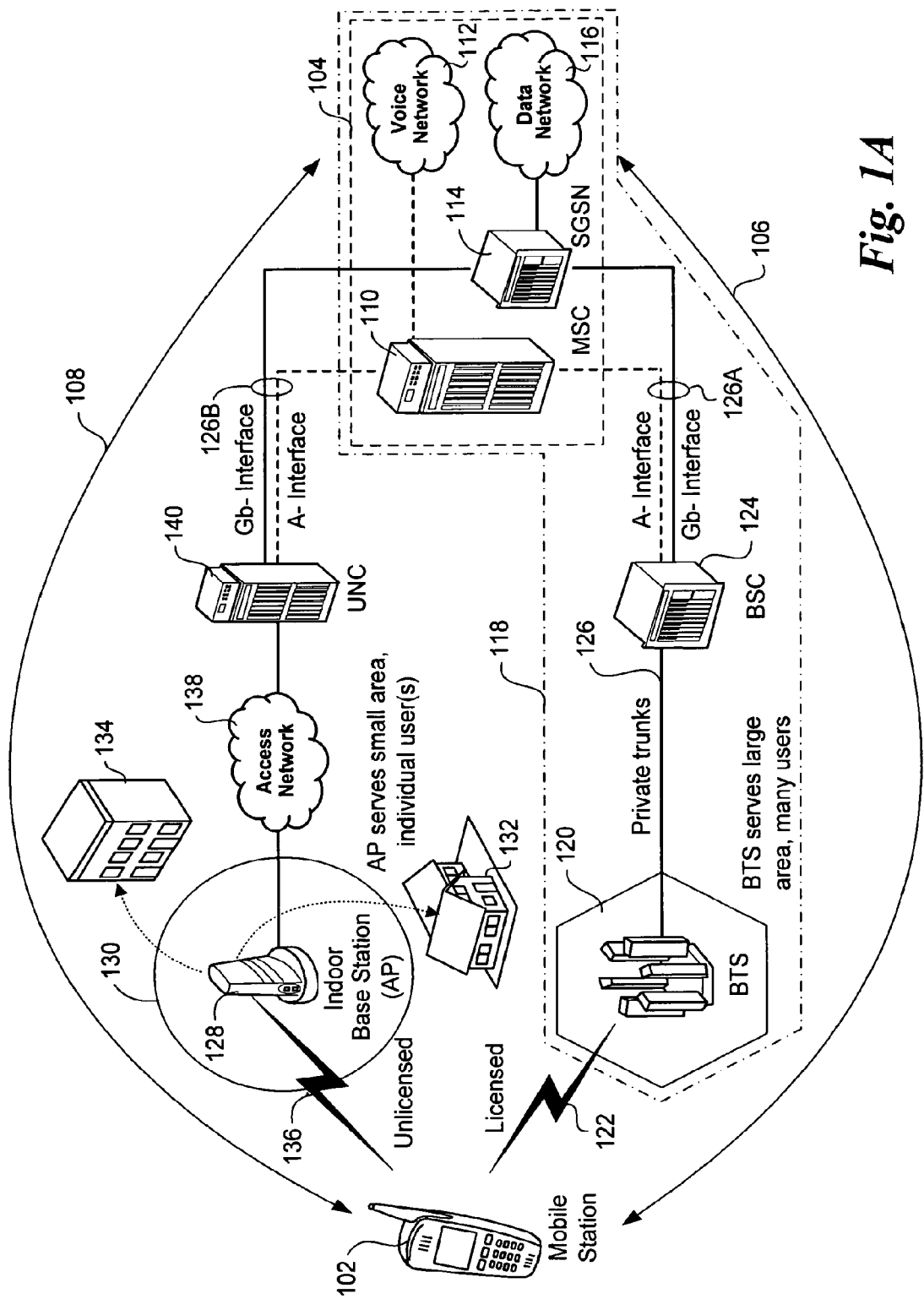
FIG. 1A provides an overview of the indoor access network (IAN) mobile service solution in accordance with one embodiment of the present invention.

FIG. 1A illustrates an Unlicensed Mobile Access (UMA) architecture 100 in accordance with one embodiment of the present invention. UMA architecture 100 enables a user of a mobile station 102 to access a voice and telecommunications network 104 via either a licensed wireless communications session 106, or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116. MSC 110 also provides an internal visitor location register (VLR) function.

In further detail, the licensed wireless communication session is facilitated by infrastructure provided by a licensed wireless network 118 that includes telecommunications network 104. In the illustrated embodiment, licensed wireless network 118 depicts components common to a GSM-(Global System for Mobile Communication) based cellular network that includes multiple base transceiver stations (BTS) 120 (of which only one is shown for simplicity) that facilitate wireless communication services for various mobile stations 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively-coupled to its BSC 124 via a private trunk 126. In general, a large licensed wireless network, such as that provided by a regional or nationwide mobile services provider, will include multiple BSCs 124.

Each BSC 124 communicates with telecommunications network 104 through a standard base station controller interface 126. For example, a BSC 124 may communicate with MSC 110 via the GSM A-interface for circuit switched voice services and with SGSN 114 via the GSM Gb interface for packet data services (GPRS). Conventional licensed voice and data networks 104 include protocols to permit seamless handoffs from one recognized BSC 124 to another BSC (not shown).

An unlicensed communication session 108 is facilitated via an (wireless) access point (AP) 128 comprising an indoor base station 130. Typically, AP 128 will be located in a fixed structure, such as a home 132 or an office building 134. The service area of indoor base station 130 includes an indoor portion of a building, although it will be understood that the service area of an indoor base station may include an outdoor portion of a building or campus. As indicated by the arrow representing unlicensed communication session 108, the mobile station 102 may be connected to the telecommunications network 114 via a second data path that includes an unlicensed wireless channel 136, access point 128, an access network 138, and an unlicensed mobile access network controller (UNC) 140. The UNC 140 communicates with telecommunications network 104 using a base station controller interface 126B that is similar to base station controller interface 126A, and includes a GSM A interface and Gb interface. AP 128 may include software entities stored in memory and executing on one or more microprocessors (not shown in FIG. 1A) adapted to perform protocol conversion.

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As examples, the unlicensed wireless service may be a Bluetooth™ compatible wireless service, or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP). Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, the contents of which are hereby incorporated by reference.

Mobile station 102 may include a microprocessor and memory (not shown) that stores computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR sublayer is concerned with the management of an RR-session, which is the time that a mobile station is in a dedicated mode, as well as the configuration of radio channel, power controller, discontinuous transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

The mobile station may also include an unlicensed wireless service physical layer 152 (i.e., a physical layer for unlicensed wireless service such as Bluetooth, WiFi, or other unlicensed wireless channel (e.g., WiMAX)). The mobile station also includes an unlicensed wireless service level 2 link layer 154, and an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed AP 128 and to support switching between licensed RR sublayer 146 and unlicensed wireless service RR sublayer 156.

The unlicensed radio resource sublayer 156 and unlicensed link layer 154 may include protocols specific to the unlicensed wireless service utilized in addition to protocols selected to facilitate seamless handoff between licensed and unlicensed wireless systems. Consequently, the unlicensed radio resource sublayer 156 and unlicensed link layer 154 need to be converted into a format compatible with a conventional base station controller interface protocol 126 recognized by a MSC, SGSN, or other voice or data network.

Referring to FIG. 1C, in one embodiment of the present invention, the mobile station 102, AP 128 and UNC 140 provide an interface conversion function to convert the level 1, level 2, and level 3 layers of the unlicensed service into a conventional base station subnetwork (BSS) interface 126B (e.g., an A-interface or a Gb-interface). As a result of the protocol conversion, a communication session may be established that is transparent to the voice network/data network 104, i.e., the voice/data network 104 uses its standard interface and protocols for the communication session as it would with a conventional communication session handled by a conventional base transceiver station. For example, in some embodiments the mobile station 102 and UNC 140 are configured to initiate and forward location update and service requests. As a result, protocols for a seamless handoff of services that is transparent to voice/data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 126 for a voice/data network 104. In one embodiment, the licensed wireless service is a GSM/GPRS radio access network, although it will be understood that embodiments of the present invention include other licensed wireless services. For this embodiment, the UNC 140 interconnects to the GSM core network via the same base station controller interfaces 126 used by a standard GSM BSS network element. For example, in a GSM application, these interfaces are the GSM A-interface for circuit switched voice services and the GSM Gb interface for packet data services (GPRS). In a UMTS (Universal Mobile Telecommunications System) application of the invention, the UNC 140 interconnects to the UMTS network using a UMTS Iu-cs interface for circuit switched voice services and the UMTS Iu-ps interface for packet data services. In a CDMA application of the invention, the UNC 140 interconnects with the CDMA network using the CDMA A1 and A2 interfaces for circuit switched voice services and the CDMA A10 and A11 interfaces for packet data services.

In a GSM/GPRS embodiment, UNC 140 appears to the GSM/GPRS core network as a GSM BSS network element and is managed and operated as such. In this architecture the principle elements of transaction control (e.g., call processing) are provided by higher network elements; namely the MSC 110 visitor location register (VLR) and the SGSN 114. Authorized mobile stations are allowed access to the GSM/GPRS core network either directly through the GSM radio access network if they are outside of the service area of an AP 128 or via the UMA network system if they are within the service area of an AP.

Since a communication session hosted by the UMA architecture 100 is transparent to a voice network 112 or data network 116, the unlicensed wireless service may support all user services that are typically offered by a wireless service provider. In the GSM case, this typically includes the following basic services: Telephony; Emergency call (e.g., E911 calling in North America); Short message, mobile-terminated point-to-point (MT/PP); Short message, mobile-originated point-to-point (MO/PP); GPRS bearer services; and Handover (outdoor-to-indoor, indoor-to-outdoor, voice, data, SMS, SS). Additionally, GSM may also support, various supplementary services that are well-known in the art.

Figure 2A:
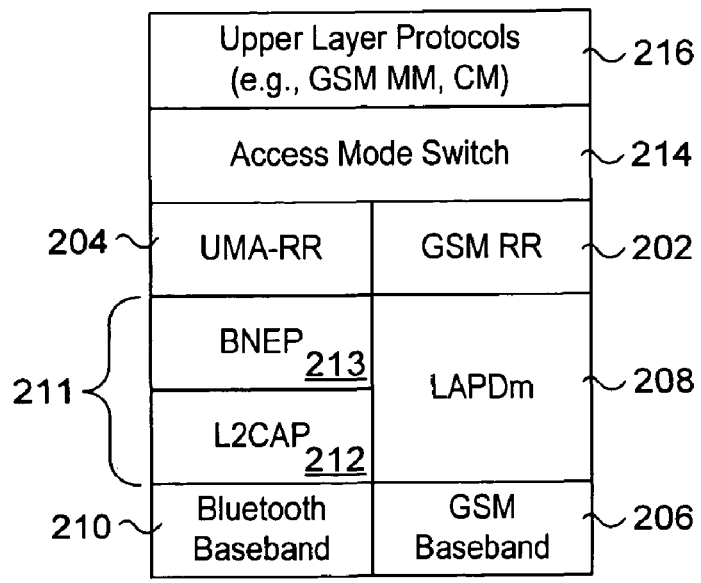
FIG. 2A illustrates an overview of a level 1, level 2, and level 3 GSM-related protocol architecture for one embodiment of a mobile station that provides unlicensed radio links via Bluetooth signaling.

FIG. 2A provides an overview of a level 1, level 2, and level 3 GSM-related protocol architecture for one embodiment of mobile station 102 that provides unlicensed radio links via Bluetooth signaling. As illustrated, there are two logical radio resource (RR) management entities: the GSM RR entity 202 and the UMA-RR entity 204. The protocol architecture includes a GSM baseband level 1 layer 206, GSM level 2 link layer (LAPDm) 208, Bluetooth baseband level 1 layer 210, Bluetooth level 2 layers 211 including a layer 2 connection access procedure (L2CAP) layer 212 and a BNEP layer 213, an access mode switch 214, and upper layer protocols 216. When the mobile station is operating in an UMA mode, the UMA-RR entity 204 is the current "serving" RR entity providing service to the mobility management (MM) sublayer via the designated service access point (RR-SAP). The GSM RR entity is detached from the MM sublayer in this mode. The UMA-RR entity 204 provides a new set of functions, and is responsible for several tasks. First the UMA-RR entity is responsible for discovery of UMA coverage and UMA registration. Second, the UMA-RR entity is responsible for emulation of the GSM RR layer to provide the expected services to the MM layer; i.e., create, maintain and tear down RR connections. All existing GSM 04.07 primitives defined for the RR-SAP apply. The plug-in of UMA-RR entity 204 is made transparent to the upper layer protocols in this way. Third, a UMA-RR entity 204 module is responsible for coordination with the GSM RR entity to manage access mode switching and handover, as described in further detail in application Ser. No. 10/688,470 referenced above.

Figure 2B:
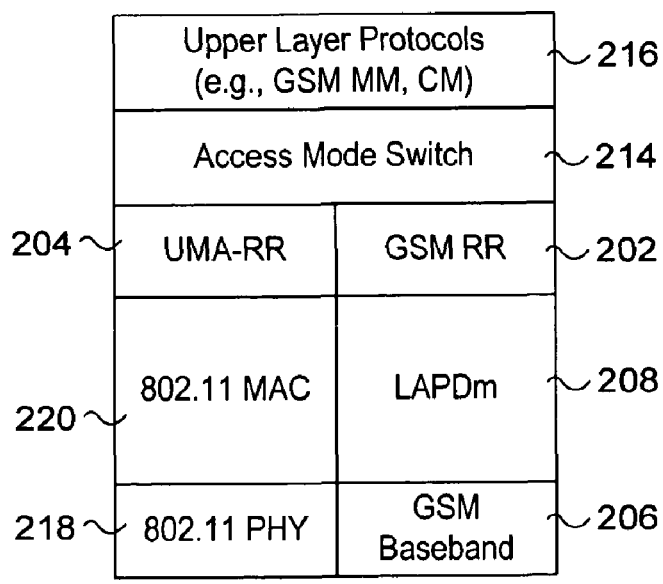
FIG. 2B illustrates an overview of a level 1, level 2, and level 3 GSM-related protocol architecture for one embodiment of a mobile station that provides unlicensed radio links via IEEE 802.11 signaling.

FIG. 2B provides an overview of a level 1, level 2, and level 3 GSM-related protocol architecture for one embodiment of mobile station 102 that provides unlicensed radio links via IEEE 802.11 signaling. All of the entities and layers are the same as described above for FIG. 2A, except that the Bluetooth layers have been replaced with an 802.11 PHY layer 218 and an 802.11 MAC layer 220.

Figure 3A:
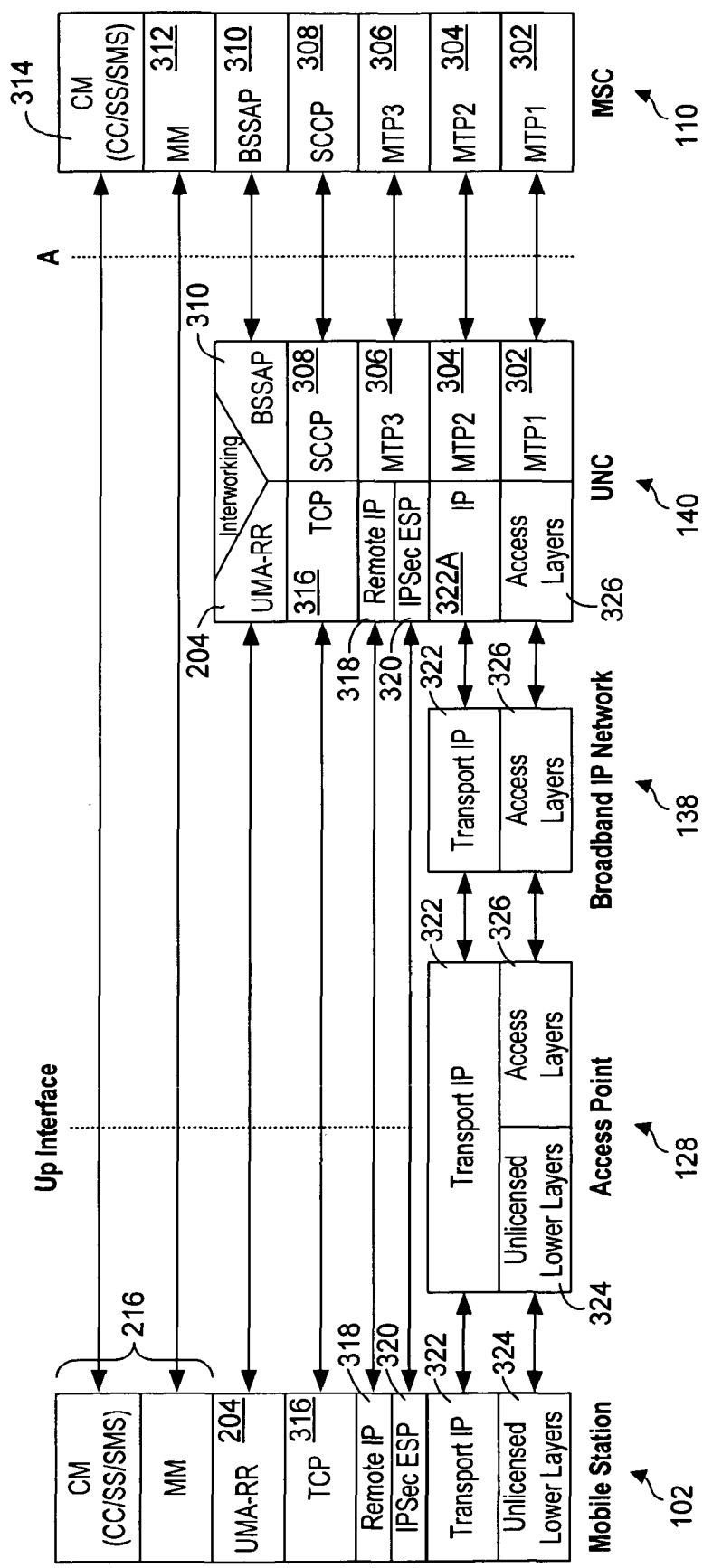
FIG. 3A illustrates the Up interface protocol architecture in support of CS Domain signaling, as well as UMA-specific signaling, according to one embodiment.

FIG. 3A illustrates the Up interface protocol architecture in support of circuit switched (CS) Domain signaling, as well as UMA-specific signaling, according to one embodiment. The MSC sublayers are conventional, well known features known in the art in regards to the message transfer part (MTP) interfaces MTP1 302, MTP2 304, and MTP3 306, signaling connection control part (SCCP) 308, base station system application part (BSSAP) 310, mobility management interface 312, and connection management interface 314.

The UMA-RR protocol supports the UMA "layer 3" signaling functions via UMA-RR layers 204 provided by each of the mobile station 102 and UNC 140. The UNC 140, acting like a BSC, terminates UMA-RR protocol messages and is responsible for the interworking between these messages and the analogous A-interface messages.

The layers below the UMA-RR layer 204 in each of mobile station 104 and UNC 140 include a TCP layer 316, a remote IP layer 318, and an IPSec (IP security) layer 320. As an option, a standard Secure Socket Layer (SSL) protocol running over TCP/IP (not shown) may be deployed in place of IPSec layer 320.

Lower-level IP connectivity between mobile station 102 and UNC 140 is supported by appropriate layers hosted by an intervening access point 128 and broadband IP network 138 (i.e., the access network 138 shown in FIG. 1A). The components for supporting the IP transport layer (i.e., the conventional network layer 3 under the seven-layer OSI model) include a transport IP layers 322 for each of the mobile station 104, AP 128, and IP network 138, and an IP layer 322A at UNC 140.

At the lowest layers (i.e., the physical and data link layers), mobile station 104 and AP 128 are depicted as providing unlicensed lower layers 324, while each of AP 128, IP network 138, and UNC 140 provide appropriate access layers 326. Typically, access layers 326 will include conventional Ethernet PHY and MAC layers (IEEE 802.3), although this is not limiting.

As shown in FIGS. 3A and 3B, the unlicensed layers lower layers 324 will depend on whether the unlicensed radio link uses Bluetooth signaling or IEEE 802.11 signaling. The Bluetooth lower layers depicted in FIG. 3B correspond to the mobile station architecture of FIG. 2A, and include a Bluetooth baseband layer 210, an L2CAP layer 212, and a BNEP layer 213. Meanwhile, the 801.11 lower layers shown in FIG. 3C correspond to the mobile station architecture of FIG. 2B, and include a 802.11 PHY layer 218 and in 802.11 MAC layer 220.

Figure 3D:
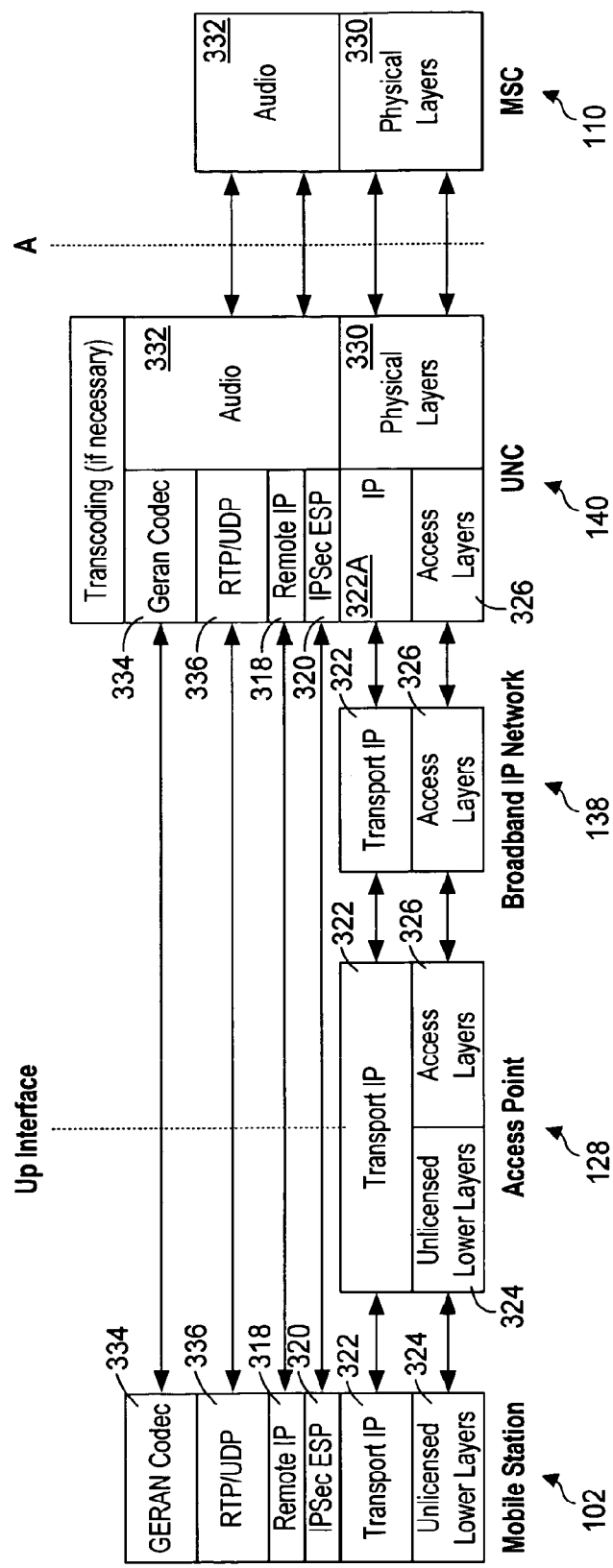
FIG. 3D illustrates the Up CS domain voice bearer protocol architecture in support of GSM voice transmission, according to one embodiment.

FIG. 3D illustrates the Up CS domain voice bearer protocol architecture in support of GSM voice transmission, according to one embodiment. In addition to the like named and referenced components common to the architectures of FIGS. 3D and 3C, facilities are provided for supporting GSM voice transmission. For the MSC 110, these components include conventional components for supporting GSM voice transmissions, and are depicted as physical layers 330 and audio 332, with similar components being deployed in UNC 140. Each of mobile station 102 and UNC 140 now include a GERAN (GSM Edge Radio Access Network) codec 334 and an RTP/UDP layer 336.

Under the architecture of FIG. 3D, audio flows over the Up interface according to the RTP framing format defined in RFC 3267 and RFC 3551. When operating in UMA mode, support for AMR FR as specified in TS 26.103 is supported. Other codecs may also be supported, such as G.711.

Figure 3E:
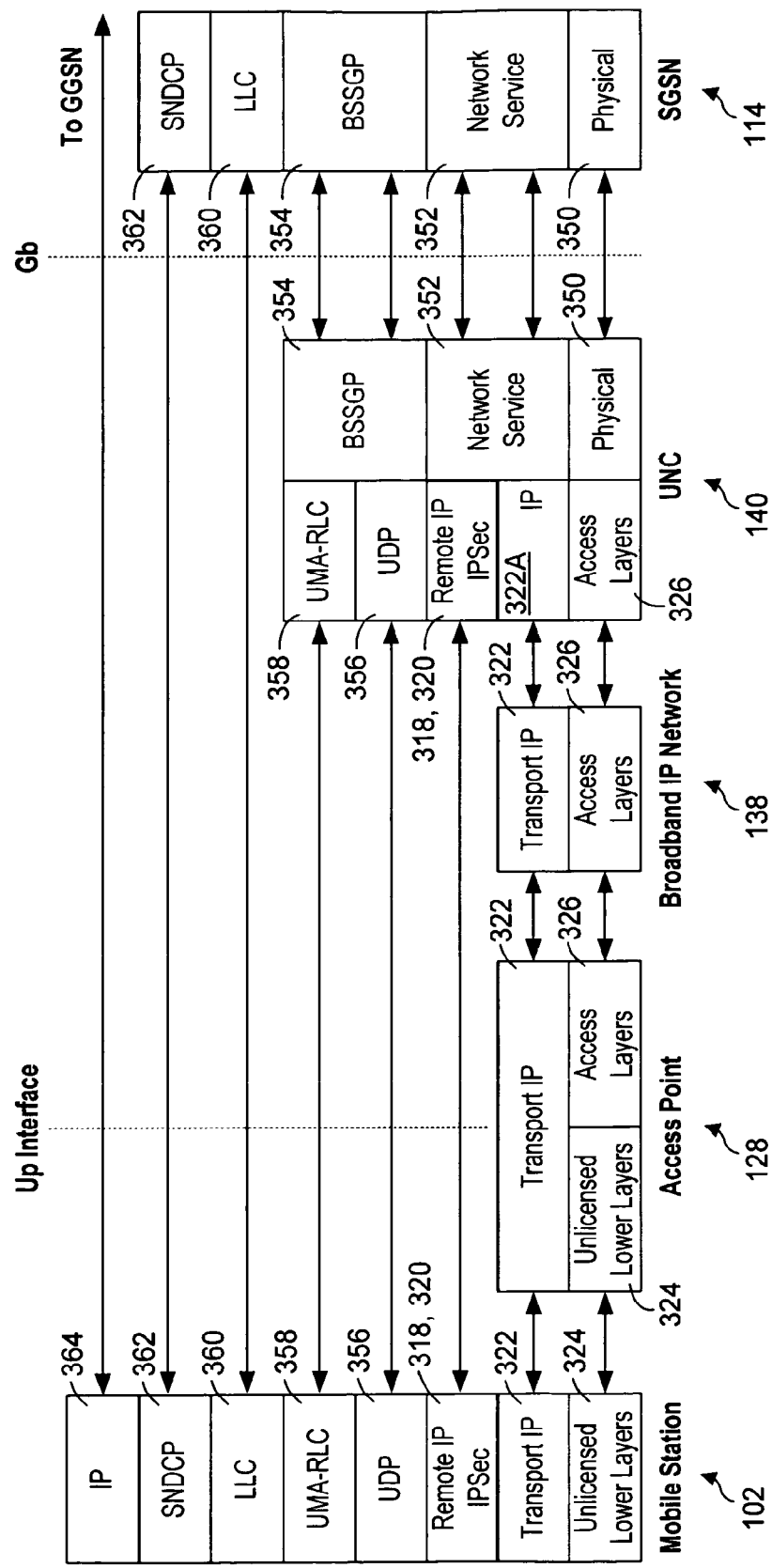
FIG. 3E illustrates the Up GPRS user plane protocol architecture, according to one embodiment.

FIG. 3E illustrates the Up GPRS user plane protocol architecture, according to one embodiment. The Up GPRS user plane protocol architecture effectively enables the tunneling of GPRS signaling and data packets through the UNC 140 utilizing the unlicensed spectrum, thus supporting a tunneling function for packet-switched traffic between the mobile station 102 and SGSN 118.

As illustrated in FIG. 3E, each of the UNC 140 and SGSN 114 employ conventional facilities for supporting GPRS signaling and data packets, including a physical layer 350, a network service layer 352, and a BSSGP layer 354. Each of mobile station 102 and UNC 140 include a UDP layer 356 and a UMA-RLC layer 358. Each of mobile station 102 and SGSN include an LLC layer 360 and an SNDCP layer 362. Mobile station 102 also includes an IP layer 364.

Under the architecture of FIG. 3E, GPRS LLC PDUs carrying data, and higher layer protocols, are carried transparently between the mobile station 102 and SGSN 114. This allows the mobile station to derive all GPRS services in the same manner as if it were in a GERAN BSS. All existing GPRS applications and MMI in mobile station 102 are unchanged. LLC PDUs are carried over UMA-RLC layer 358 from mobile station 102 to UNC 140, which relays the PDUs over to SGSN 114 using BSSGP messaging. The UMA-RLC layer 358 runs directly over the UDP layer 356 to leverage the IP bearer service.

Figure 3F:
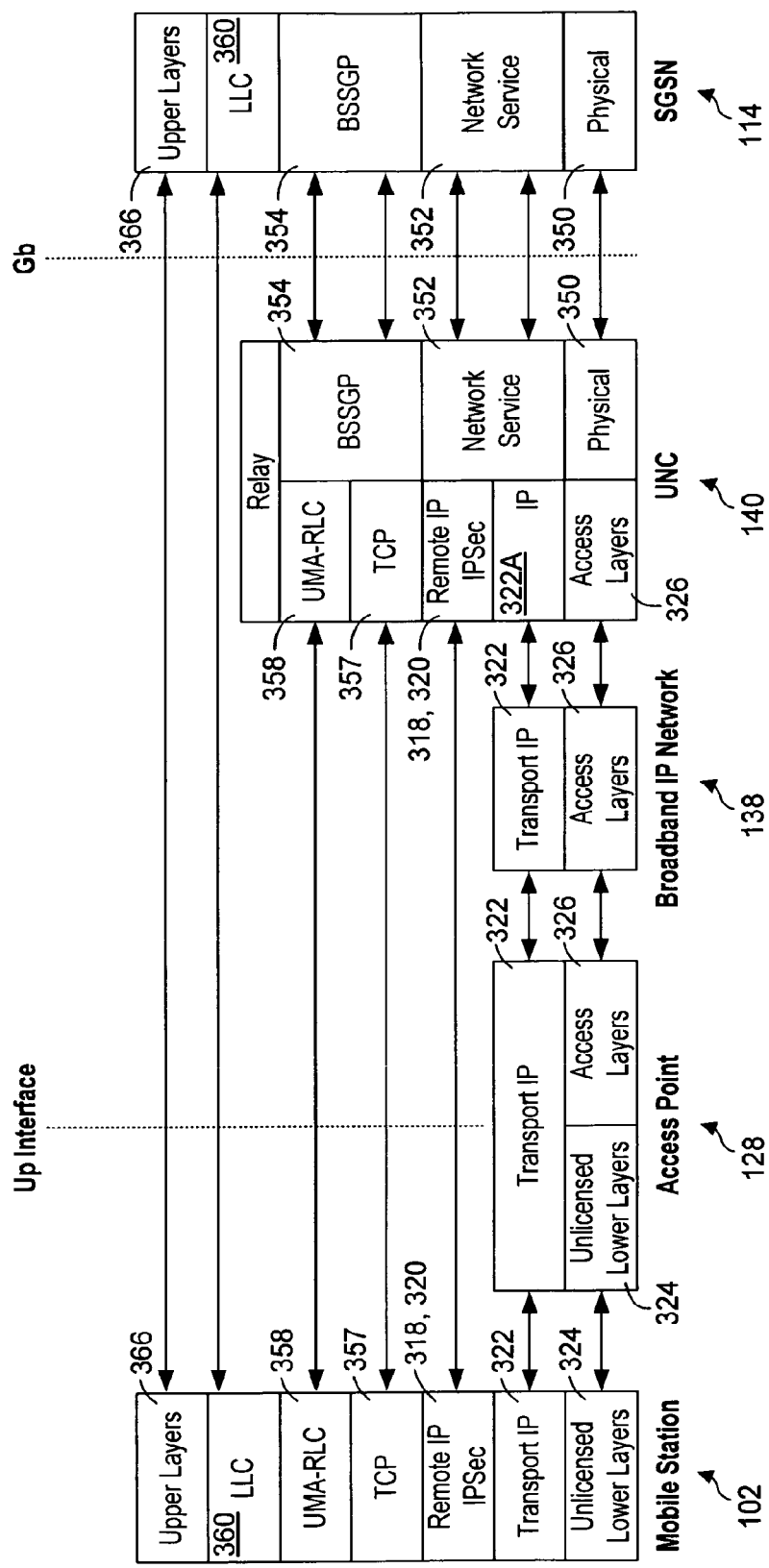
FIG. 3F illustrates the Up protocol architecture in support of GPRS Signaling, according to one embodiment.

FIG. 3F illustrates the Up protocol architecture in support of GPRS Signaling, according to one embodiment. Under this architecture, the GPRS LLC PDUs for signaling on higher layer protocols (including upper layers 366) are carried transparently between MS 102 and SGSN 114. This allows the MS to obtain all GPRS services in the same ways as if it were connected to a GERAN BSS. The GPRS-RLC protocol is replaced with an equivalent (from the upper layer perspective) UMA-RLC protocol. Reliability is ensured by TCP layer 357. As in a GERAN BSS, the UNC, acting like a BSC, terminates the UMA-RLC protocol and inter-works it to the Gb-interface using BSSGP.

As noted above, the mobile station may be, for example, a wireless phone, smart phone, personal digital assistant, or mobile computer. The mobile station may also be, for example, a fixed wireless device providing a set of terminal adapter functions for connecting Integrated Services Digital Network (ISDN) or Plain Old Telephone Service (POTS) terminals to the wireless system.

Other terminal adapter types than those listed above may be employed with embodiments of the present invention. For example: (1) a terminal adapter that supports cordless telephones rather than POTS phones; (2) a terminal adapter that supports standard Session Initiation Protocol (SIP) telephones; and (3) a terminal adapter that also integrates a corded handset and user interface, such as one would find on a desk phone. In each case, the invention described herein describes how these terminal adapter functions can be connected to the wireless system via the unlicensed network.

The use of other standard Bluetooth capabilities together with embodiments of the present invention is possible. For example, there is a Bluetooth standard capability called "SIM Access Profile" that allows one Bluetooth device (e.g., an embedded cell phone subsystem in a car) to access the SIM that is in another Bluetooth device (e.g., the user's normal cell phone), allowing the first device to take on the "personality" associated with the SIM (i.e., that of the user's normal cell phone). The embodiments described above could make use of this standard capability to give the terminal adapter-attached devices (e.g., a POTS phone) the personality of the user's cell phone.

Mobility Management

The UNC 140 provides functions equivalent to that of a GSM BSC, and as such controls one or more (virtual) UMA cells. In one embodiment, there may be a single UMA cell per UNC and, in an alternative embodiment, there may be one UMA cell per access point connected to a UNC. The latter embodiment may be less desirable due to the large number of APs expected to be used, so the UMA architecture permits flexible groupings of APs into UMA cells. Each UMA cell may be identified by a cell global identifier (CGI), with an unused absolute radio frequency channel number (ARFCN) assigned to each UMA cell. Each UMA cell may be mapped to a physical boundary by associating it with specific GSM location areas served by the MSC. GSM cells within the location areas mapped to a UMA cell are configured with ARFCN-to-CGI mappings for that UMA cell. Further, this ARFCN may be advertised in the BA list by the GSM cells to permit handovers. Note that UMA cells may use the same location area identifiers (LAI) as existing GSM cells, or a new LAI may be used for UMA cells. The latter is useful in reducing paging in GSM cells when a mobile station is known to be registered via an INC. The above discussion applies equally to GPRS routing areas and routing area identifiers (RAIs).

UMA CPE Addressing

Customer premise equipment (CPE) may include the mobile station and the access point (AP) through which the mobile station may access the UNC for UMA service. UMA CPE addressing parameters may include the parameters described below.

The UMA CPE addressing includes the international mobile subscriber identity (IMSI) associated with the SIM in the mobile equipment as a parameter. The IMSI is provided by the UMA mobile station to the UNC when it requests UMA service via the Up interface to the UNC. Unlike the GSM BSC, the UNC manages a context for each mobile station that is operating in UMA mode. Therefore, the UNC maintains a record for each served mobile station. For example, IMSI may be used by the UNC to find the appropriate mobile station record when the UNC receives a BSS-MAP paging message.

The UMA CPE addressing includes the address associated with the unlicensed interface in the mobile equipment (e.g., 802.11 MAC address) as a parameter. This identifier may be provided by the UMA mobile station to the UNC when it requests UMA service via the Up interface. The UNC may use this address as an alternative to the IMSI to limit the transfer of the IMSI over the Up interface and to assist in the routing of messages.

The UMA CPE addressing also includes the temporary logical link identifier (TLLI) assigned to the mobile station by the serving GPRS support node (SGSN) as a parameter. This identifier may be provided via standard Gb-interface procedures. The UNC may track this address for each served mobile station to support GSM Gb-interface procedures (e.g., so that downlink GPRS packets may be routed to the correct mobile station).

The UMA CPE addressing also includes the access point ID (AP-ID) as a parameter. The AP-ID may be the MAC address of the unlicensed mode access point through which the mobile station is accessing UMA service. This identifier may be provided by the UMA mobile station to the UNC when it requests UMA service via the Up interface. The AP-ID may be used by the UNC to support location services (e.g., enhanced 911 service) to the user based on the AP from which the service is being accessed. The AP-ID may also be used by the service provider to restrict UMA service access only to authorized APs.

Other CPE addressing parameters that may be used depend on the security requirements of the Up interface (e.g., the need to manage UMA mobile station IP addresses for message routing via tunneled IPSec connections, or the need to manage local credentials assigned to the mobile station by the UNC).

UMA Cell Identification

In order to facilitate the mobility management functions in GSM/GPRS, the coverage area may be split into logical registration areas called location areas (for GSM) and routing areas (for GPRS). Mobile stations may be required to register with the network each time the serving location area (or routing area) changes. One or more location areas identifiers (LAIs) may be associated with each visited location register (VLR) in a carrier's network. Likewise, one or more routing area identifiers (RAIs) may be controlled by a single SGSN.

In one embodiment, a GSM cell is identified within the location or routing area by adding a cell identity (CI) to the location or routing area identification. The cell global identification (CGI) is the concatenation of the location area identification and the cell identity. In one embodiment, the cell identity is unique within a location area.

An Example UMA Approach to Cell Identification

One example of a UMA cell identification approach is described below. In this embodiment, a single UNC provides service for one or more UMA location areas and one or more UMA routing areas, and each UMA location area (or routing area) is distinct from, or the same as, the location area (or routing area) of the overlapping GSM cell. A UMA cell is identified within the UMA location or routing area by adding a cell identity (CI) to the location or routing area identification. The UMA cell global identification (UMA-CGI) is the concatenation of the location area identification and the cell identity. In one embodiment, a UMA cell may be a predefined partition of the overall UMA coverage area identified by a UMA-CGI value. Note that cell identification, like UMA information, may be transparent to the AP, such that the AP is not aware of its associated UMA-CGI value. The UMA components (e.g., mobile station and UNC) may support the ability to partition the overall UMA coverage area.

A partitioning method may include implementing a one-to-one or a many-to-one correspondence between GSM cell identity and UMA cell identity. Given the identification of a preferred GSM cell in a particular area, it may be possible to determine the corresponding UMA cell identity based, for example, on UNC provisioning. An example of a one-to-one relationship is mapping a GSM cell to a UMA cell. An example of a many-to-one relationship is mapping a GSM location area (and associated GSM cells) to a UMA cell.

When a UMA mobile station connects to the UNC for UMA service, it sends the CGI value and (optionally) a path loss criterion parameter (C1) of the current GSM camping cell, as well as the neighbor cells, to the UNC. The UNC maps the GSM camping cell's CGI value to a corresponding UMA cell's CGI value based on mapping logic provisioned in the UNC. This may be a one-to-one mapping (e.g., if there is one UMA cell per GSM cell) or a many-to-one mapping (e.g., if there is one UMA cell per GSM location area). If no GSM coverage is available in the UMA service area, the UNC may assign the mobile station to a default "no GSM coverage" UMA cell. A single UNC may serve one MSC. This does not preclude UNC embodiments that combine multiple UNC "instances," as defined above, in a single device (for example, a UNC that servers multiple MSCs). Each UNC may also be assigned a unique "UMA-Handover-CGI" value used for GSM-to-UMA handover purposes. For example, this may be the value provisioned in the GSM RAN BSC's ARFCN-to-CGI tables and in the MSCs (e.g., to point to the UNC).

UMA Operating Configurations

In one embodiment, at least three UMA operating configurations may be identified. In a common core configuration, the UMA LAI and an umbrella GSM RAN LAI (e.g., that serves the subscriber's neighborhood) may be different, and the network may be engineered such that the same core network entities (e.g., MSC and SGSN) serve both the UMA cells and the umbrella GSM cells. One advantage of this configuration is that subscriber movement between the UMA coverage area and the GSM coverage area does not result in inter-system (e.g., MAP) signaling (e.g., location updates and handovers are intra-MSC).

In a separate core configuration, the UMA LAI and umbrella GSM RAN LAI are different, and the network may be engineered such that different core network entities serve the UMA cells and the umbrella GSM cells. One advantage of this configuration is that engineering of the UMA and GSM networks can be more independent than in the Common Core Configuration.

In a common LAI configuration, the UMA LAI and GSM RAN LAI are the same (e.g., different cells within the same LAI). Advantages of this configuration are that subscriber movement (while idle) between the UMA coverage area and the GSM coverage area may not result in any location update signaling, and that the mobile station can easily switch to GSM mode if UMA mode resources are temporarily unavailable (e.g., to respond to paging). Further details of this and the foregoing separate core configuration are discussed in application Ser. No. 10/688,470.

UMA Registration and Deregistration

In one embodiment, as described above, a UMA registration process does not employ signaling to the PLMN infrastructure and is contained within the UMA system (i.e., between the mobile station and UNC). The UMA registration process may serve at least two purposes. It may inform the UNC that a mobile station is connected through a particular AP and is available at a particular IP address. The UNC may keep track of this information, for example, for mobile-terminated calling. The registration process may also provide the mobile station with the operating parameters associated with the UMA service on the AP. This may be analogous to the use of the GSM broadcast control channel (BCCH) to transmit system parameters to mobile stations in GSM cells. GSM system information message content that is applicable in UMA mode may be delivered to the mobile station during the UMA registration process.

Similarly, a UMA deregistration process may allow the mobile station to explicitly inform the UNC that it is leaving UMA mode, allowing the UNC to free resources that it may have assigned to the mobile station. The UNC may also support implicit UMA deregistration, wherein a secure channel to the mobile station is abruptly terminated.

UMA Redirection

In one embodiment, as described above, when a UMA mobile station connects to the UNC for UMA service, it may send a CGI value and a path loss criterion parameter (C1) of the current GSM camping cell, as well as the neighbor cells, to the UNC. Using this information, as well as internal database information, the UNC may be able to determine if it is the correct serving UNC for the mobile station, and if it is not the correct serving UNC, to redirect the mobile station to the correct UNC. The correct serving UNC may be the UNC whose UMA service area overlaps the mobile station's umbrella GSM coverage. In one embodiment, the correct serving UNC might be attached to the same MSC as the GSM BSC to which the umbrella GSM cell belongs. In an alternative embodiment, the correct serving UNC might be attached to a different MSC that may hand-over to the MSC that provides umbrella GSM coverage to the mobile station, allowing the UNC to handover calls to and from GSM. It may also enable certain location-based services (e.g., E911 Phase 1) that can be tied to the location of the GSM cell. An internal database used by the UNC may map GSM location areas to serving UNCs and conserve the amount of data that needs to be managed. This database may only need to change when a new UNC or a new GSM location area is added.

If no GSM coverage is available when a mobile station connects to the UNC for UMA service, then, under some instances, the UNC may not reliably determine the location of the mobile station for the purposes of assigning the mobile station to the correct serving UNC (e.g., to enable handover and location-based services). The UNC may permit the operator to determine the service policy in this case (e.g., the operator may provide service to the user with certain limitations, possibly with a user interface indication on the mobile station). Additional details on UMA registration and redirection procedures are provided below.

UMA Mobile Station Idle Mode Behavior

Figure 4:
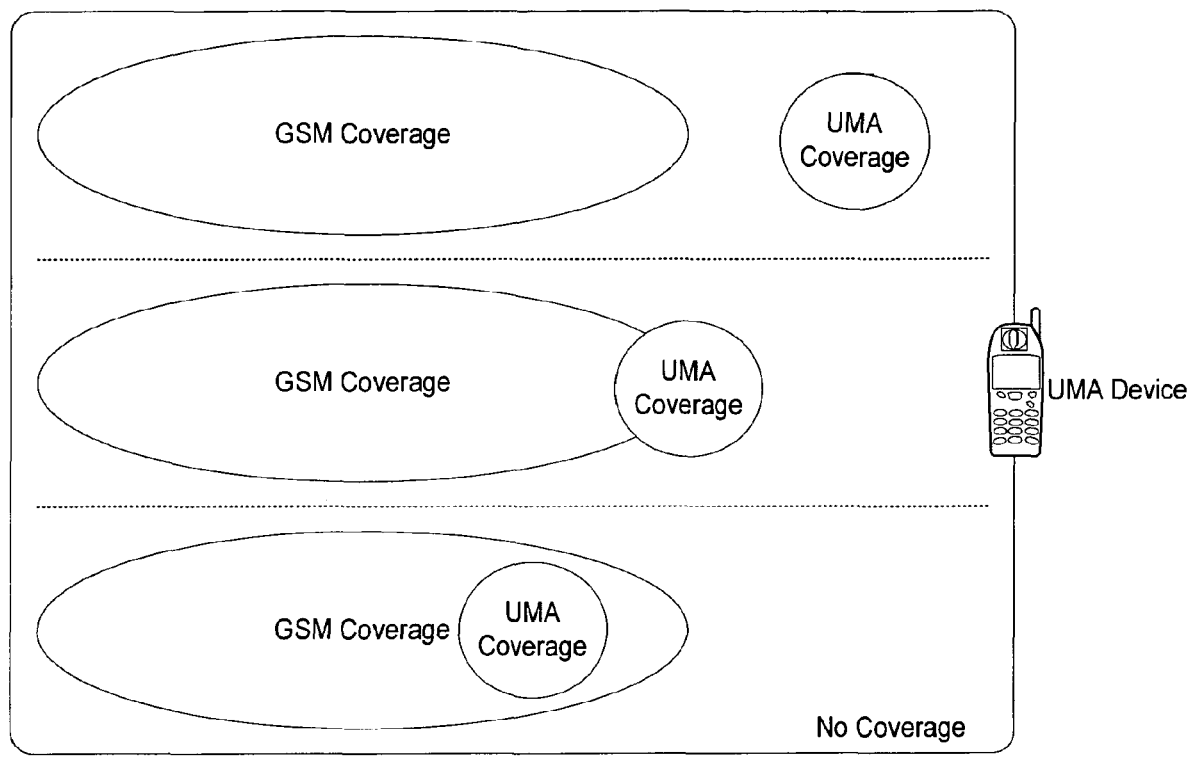
FIG. 4 illustrates several possible GSM and UMA coverage scenarios in accordance with one embodiment.

As described above, a UMA device may encounter different radio environments as illustrated in FIG. 4. In a first environment, the GSM and UMA coverage areas are completely separate and non-overlapping. In a second environment, the GSM and UMA coverage is partially overlapping. In a third environment, which may be the most common, the UMA coverage is encapsulated within the GSM coverage. A UMA device may power on in any of these environments and further may transition in a number of attached states.

At power on, and when the mobile station is idle and there is no coverage of any type, the mobile station may scan for both GSM and UMA radio coverage. If GSM coverage is detected, then the normal GSM mobility management procedure may be initiated. This condition may apply when no UMA coverage has been detected by the mobile station when GSM coverage is detected, or prior to the completion of the UMA registration process. If UMA coverage is detected, then the UMA mobile station establishes an unlicensed wireless link (e.g., WLAN link) to the AP and monitors signal quality. When the received signal level at the mobile station passes a predefined threshold, the mobile station performs the UMA registration procedure. Based upon the information returned, the mobile station may determine if a full network registration is required, and if so, what type (e.g., GSM or combined GSM/GPRS). This procedure may apply when no GSM coverage exists or when UMA coverage is detected prior to detecting GSM coverage.

When the mobile station is idle in GSM coverage, and there is no UMA coverage, the mobile station may periodically scan for UMA coverage. If UMA coverage is detected, the mobile station may initiate the UMA registration procedure described above.

When the mobile station is idle in UMA coverage and there is no GSM coverage, the mobile station may continue to perform normal GSM PLMN search procedures. If GSM coverage is detected, the mobile station may send the GSM cell information to the UNC for possible UMA redirection purposes as described above. Alternatively, the mobile station may disable normal GSM PLMN search procedures to conserve power.

When the mobile station is idle in UMA coverage, and there is GSM coverage, the mobile station may continue to perform normal GSM cell reselection procedures and may store the identification of the selected GSM cell to speed the transition to GSM mode, if required. Alternatively, the mobile station may disable normal GSM cell reselection procedures to conserve power.

At power off in UMA coverage, a detach indication may be sent by the mobile station to the PLMN via the UMAN (e.g., if required by the PLMN network or normally sent by the mobile station at power off). This indication may be encoded per the current GSM mode of operation (e.g., GSM or GPRS).

The UMA environment may be an IEEE 802.11 environment. In this case, the mobile station periodically performs an active scan for available 802.11 APs. When an AP is discovered, it may be matched against a stored profile of user preferences and security credentials, in which case the mobile station may automatically associate with the AP. The mobile station may enter low-power sleep mode, waking up periodically to measure signal quality for determining when to trigger UMA registration.

The UMA environment may be a Bluetooth environment. In this case, the mobile station previously paired with the Bluetooth AP through which it will access UMA service. Periodically, the mobile station may enter a page scan receive mode, and respond to an AP transmit page to establish a link-level connection. Once a link-level control channel is established, and if the mobile station is not otherwise active, it may enter a low-power Bluetooth state (e.g., park mode) to conserve power. Periodically, the AP may poll the mobile station to allow it to re-enter active-power mode. This periodic traffic may also be used by the mobile station to measure signal quality to determine when to perform the UMA registration procedure.

UMA Mobile Station Dedicated Mode Behavior

A UMA device engaged in a voice call, a data transaction or a simultaneous voice/data transaction may encounter a transition from GSM coverage to UMA coverage or a transition from UMA coverage to GSM coverage. In one embodiment, when the coverage transitions from GSM to UMA coverage, calls may be handed over transparently between the GSM RAN and the UMAN. In the case of voice, the handover may be accomplished by a handover function. In the case of data, session management controls may provide a common end-user experience to that provided in GPRS. Normal registration actions may occur upon a return to the idle state, if appropriate. When the coverage transitions from UMA to GSM coverage, calls may be handed over transparently between the UMAN and the GSM RAN. In the case of voice, the handover may be accomplished by a handover function. In the case of data, session management controls may provide a common end-user experience to that provided in GPRS.

Summary of Key Mobility Management Concepts

Figure 5:
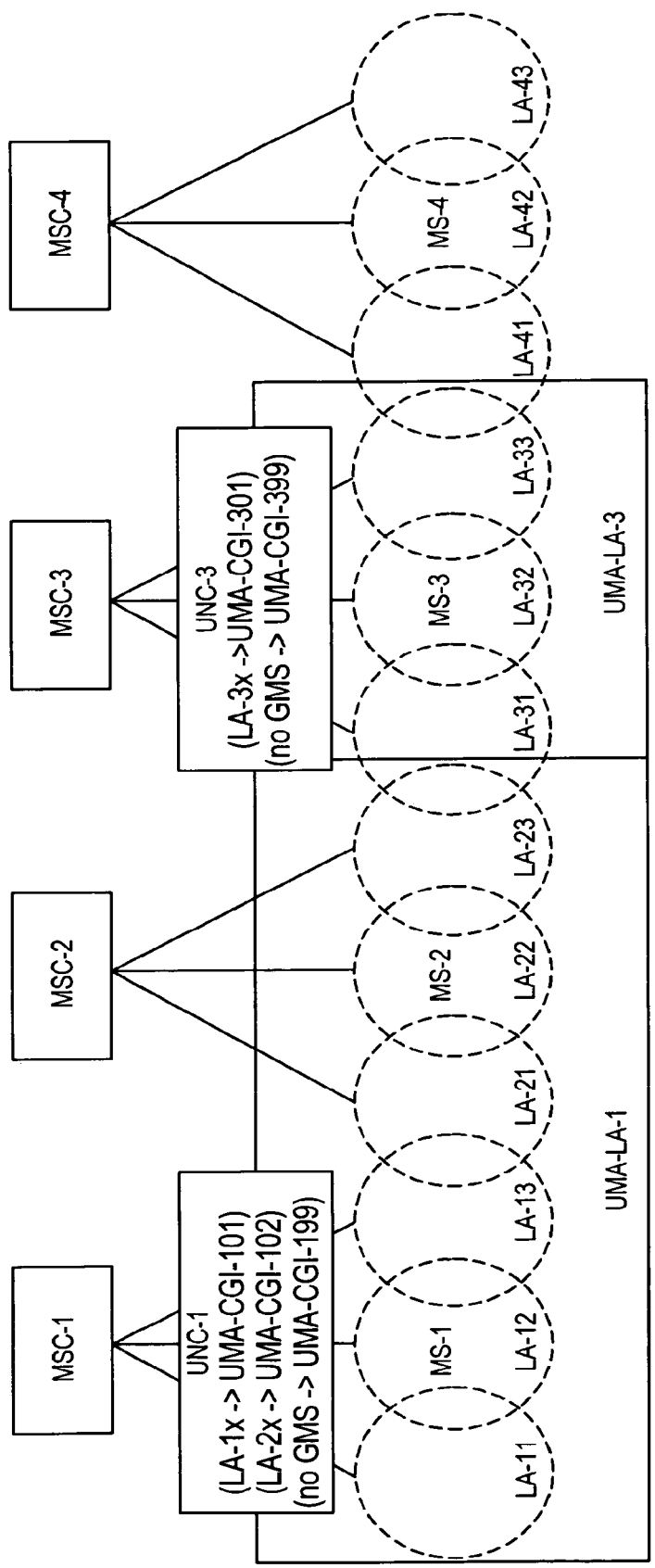
FIG. 5 illustrates exemplary mobility management functions in one embodiment.

FIG. 5 illustrates mobility management functions in one example embodiment. In FIG. 5, unlicensed network controller UNC-1 is the serving UNC for the UMA cells associated with GSM location areas LA-11 to LA-23. UNC-1 maps GSM location areas LA-1x to UMA cell UMA CGI-101 and GSM location areas LA-2x to UMA CGI-102. Unlicensed network controller UNC-3 is the serving UNC for the UMA cells associated with GSM location areas LA-31 to LA-33. UNC-3 maps GSM location areas LA-3x to UMA cell UMA CGI-301. Mobile station MS-1 will be in UMA cell UMA-CGI-101 (since GSM LA-1x is mapped to UMA-CGI-101). Mobile station MS-2 will be in UMA cell UMA-CGI-102 (since GSM LA-2x mapped to UMA-CGI-102). Mobile station MS-3 will be in UMA cell UMA-CGI-301 (since GSM LA-3x mapped to UMA-CGI-301). If mobile station MS-4 connects to UNC-1, it will be in UMA cell UMA-CGI-199 (no GSM coverage). If MS-4 connects to UNC-3, it will be in UMA cell UMA-CGI-399 (no GSM coverage). Mobile stations MS-1 and MS-2 may connect to UNC-1 without redirection. If mobile station MS-3 attempts to connect to UNC-1, it may be redirected to UNC-3.

UMA Radio Resource (URR) Messaging and Message Formats

In accordance with aspects of the present invention, details of UMA Radio Resource (URR) messaging and corresponding message formats to support and manage mobility of mobile stations are now disclosed. The particular format of each message is exemplary, and the formats are merely illustrative of information elements that should and/or may be included in a particular implementation, with some of the information elements being optional.

The UMA-RR messages are conveyed over the Up interface using the TCP connection. The UMA-RR message format follows the standard GSM layer 3 message structure defined in GSM04.07. Each message consists of the following elements:

1. UMA-RR protocol discriminator—to ease the interworking with the GSM RR protocol, in one embodiment the UMA-RR protocol reuses the same protocol discriminator as the GSM RR, which is the binary sequence of 0110 for bits 3 to 0 of the first octet of every UMA-RR message. It is noted that this is merely exemplary, as other sequences may be used, depending on the particular implementation.

2. Skip Indicator—In one embodiment, Bits 5 to 8 of the first octet of every UMA-RR message contains the skip indicator. An UMA-RR message received with skip indicator other than 0000 shall be ignored. The UMA-RR entity shall always encode the skip indicator as 0000.

3. Message Type—the message type IE (information element) and its use are defined in GSM04.07. The UMA-RR message types for one embodiment are listed in Table 1 below.

4. UMA-RR Connection Indicator (UCI)—In one embodiment, the UCI is used to explicitly indicate the first message on the UMA-RR connection, versus subsequent messages on the connection. This allows the MS and the UNC to synchronize their respective UMA-RR connection states. A UCI is not present in another embodiment.
  i. The MS normally sets UCI to the value '1' to indicate that the message is the first on the new UMA-RR connection.
  ii. However, if the UMA connection is for an emergency call, the MS sets UCI to the value '9'. This allows the UNC to give priority to emergency call-related UMA-RR connection requests.
  iii. For all other messages associated with the UMA-RR connection, the MS sets UCI to the value '0'.
  iv. For example, if the MM sublayer in the MS requests a new UMA-RR connection and then sends a CM-SERVICE-REQUEST message, the UMA-RR entity in the MS sets UCI=1. If the MM sublayer reuses an existing UMA-RR connection to send the CM-SERVICE-REQUEST message, the UMA-RR entity in the MS sets UCI=0. The UCI is used to indicate the implicit allocation of resources for a UMA-RR session.

5. Other information elements, as required.
  i. The Presence column indicates whether an information element is mandatory ("M"), optional ("O") or conditionally present ("C").
  ii. The Format column indicates how the IE is formatted: "TLV" for tag-length-value format, "LV" for length-value and "V" for value only. The tag for the IE is also referred to as the Information Element Identifier (IEI). Mandatory information elements use "V" or "LV" format, depending on whether they are fixed or variable length. Optional and conditional information elements always use "TLV" format.

5. Length Indicator. In one embodiment, a separate Length Indicator IE is used to specify the length of a given message. In another embodiment, the underlying transport layer is used to provide a length indication for each message. Accordingly, a separate Length Indicator IE is not included in this message format. Both types of formats are illustrated by the URR messages disclosed herein.

TABLE 1

| MESSAGE NAME | MESSAGE TYPE |
|---|---|
| URR REGISTER REQUEST | 0011 0011 (0x33) |
| URR REGISTER ACK | 0011 0110 (0x36) |
| URR REGISTER REJECT | 0011 0111 (0x37) |
| URR ACTIVATE CHANNEL | 0010 1110 (0x2E) |
| URR ACTIVATE CHANNEL ACK | 0010 1001 (0x29) |
| URR ACTIVATE CHANNEL FAILURE | 0010 1111 (0x2F) |
| URR ACTIVATE CHANNEL COMPLETE | 0010 1010 (0x2A) |
| URR HANDOVER REQUIRED | 0001 0001 (0x11) |
| URR HANDOVER COMMAND | 0010 1011 (0x2B) |
| URR HANDOVER COMPLETE | 0010 1100 (0x2C) |
| URR HANDOVER FAILURE | 0010 1000 (0x28) |
| URR HANDOVER ACCESS | 0010 1101 (0x2D) |
| URR RR RELEASE | 0000 1101 (0x0D) |

TABLE 1-continued

| MESSAGE NAME | MESSAGE TYPE |
| --- | --- |
| URR RR RELEASE COMPLETE | 0000 1111 (0x0F) |
| URR PAGING REQUEST | 0010 0001 (0x21) |
| URR PAGING RESPONSE | 0010 0111 (0x27) |
| URR CLASSMARK CHANGE | 0001 0110 (0x16) |
| URR CLASSMARK ENQUIRY | 0001 0011 (0x13) |
| URR RR CLEAR REQUEST | 0011 1111 (0x3F) |
| URR DEREGISTER | 0011 1011 (0x3B) |
| URR UPLINK QUALITY INDICATION | 0010 0110 (0x26) |
| URR REGISTER UPDATE UPLINK | 0011 1100 (0x3C) |
| URR REGISTER UPDATE DOWNLINK | 0011 1101 (0x3D) |

Registration Messages and Messages Formats

Figure 6C:
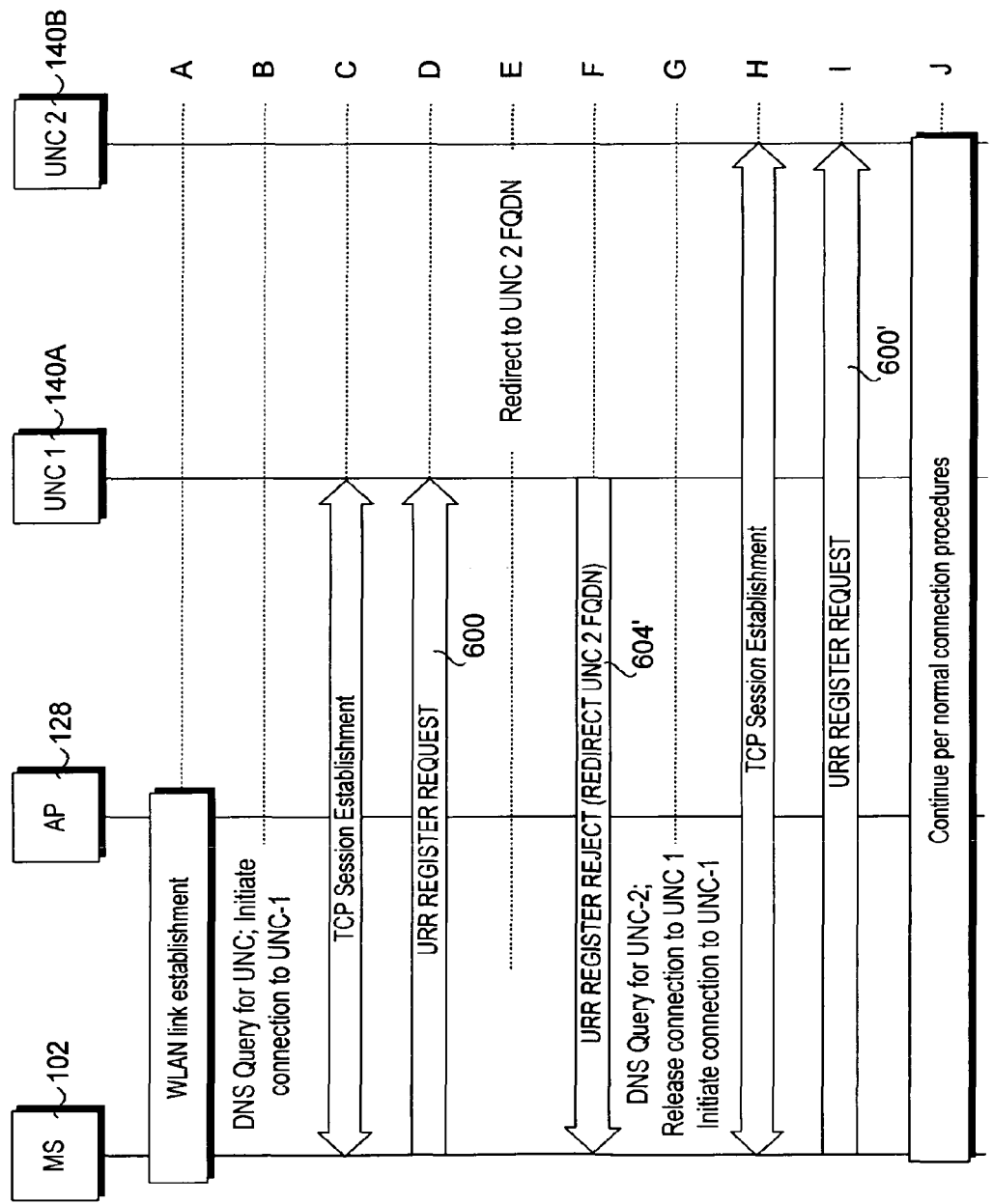
FIG. 6C illustrates a URR Register message exchange under which an MS is redirected from a first UNC to a second UNC.

FIGS. 6A-C show examples of sequences of messages that are passed between an MS and a UNC (via an AP connected therebetween) under various registration scenarios. Messages and associated signals passing between the different elements are shown as horizontal arrows with arrowheads connecting the elements of the communication systems that are involved. When the arrow passes across an element and no arrowhead is shown, then this element functions as a pass through. The particular elements of the system architecture of FIG. 1 that are involved in FIGS. 6A-C are, from left to right, a mobile station (e.g., MS 102), an access point (e.g., WLAN AP 128), a first UNC (e.g., UNC-1 (UNC 140A)) and a second UNC (e.g., UNC-2 (UNC 140B)).

Prior to the registration process, various operations are performed to establish a connection between MS 102 and AP 128, and then to establish a connection between MS 102 and UNC 140. At step A of FIG. 6A, the MS 102 comes into the coverage range of AP 128 and establishes a wireless link with the AP. For example, this wireless link may be a WLAN connection using unlicensed frequencies under the IEEE 802.11 or Bluetooth protocols. At step B, the MS looks for a UNC to establish a connection with. This may be done by performing a DNS (Domain Name System) query for a UNC. This initiates a connection to the first UNC's IP address. The MS may select the first UNC because it is the last UNC IP address that it used or it may be a default UNC or it may be a home UNC that the MS is assigned to for initial registrations, or it may be selected from a cache of connected UNCs indexed by the AP and CGI. At step C, the UNC and the MS establish a secure TCP connection. Note that IPSec security procedures between the MS and UNC are not shown in FIGS. 6A-C.

At step D, the MS sends a request for registration embodied as a UMA URR-REGISTER REQUEST message 600 to the UNC. Respective embodiments of URR REGISTER REQUEST message formats 600A and 600B are shown in FIGS. 7A and 7B. For illustrative purposes, each message format illustrated herein includes an Information Element column, a Type/Reference column, a Presence column, a Format column, a Length Column, and a Value column. The message formats may also employ Information Element Identifiers (IEIs), which are not shown herein for simplicity and clarity. It is noted that the actual messages will include a value that identifies the message type or identity, along with appropriate IE values in accordance with each particular message format. Also, as with each of the messages discussed herein, URR REGISTER REQUEST message 600 includes a UMA RR protocol Discriminator IE, a Skip Indicator IE, and a Message Type IE (URR REGISTER REQUEST in this instance). As used herein, these three IEs are referred to as "basic" IEs to indicate they are included in each message format. Additionally, one set of message formats includes a UCI IE, while another set of message formats includes a Length Indicator IE for each message.

In addition to the basic IEs, URR REGISTER REQUEST message format 600A includes a mobile identity IE, a GSM RR State IE, a GPRS Class Capability IE, a Cell Identifier List IE, a C1 List IE, an AP Identifier IE, and an AP Location IE. The mobile identity IE is mandatory and uses IMSI or IMEI if IMSI is not available. The GSM RR State IE is included to indicate the current GSM RR entity state. The GPRS Class Capability IE is included to indicate the GPRS Class capability of the MS. The Cell Identifier List IE is included if valid GSM cell information is available to the UMA RR entity. Within this IE, the Cell Identification Discriminator field shall be 0000 indicating the Cell Global Identification (CGI) format is used to identify the cells. The C1 List IE is present only if the "cell identifier list" IE is present. It contains the path loss criterion parameter C1 of each cell in the "Cell Identifier List" IE. The AP Identifier IE contains the MAC address of the unlicensed interface of the AP through which the MS is registering with the UNC. If the AP location is available, the MS can send corresponding information identifying the location of the AP via the AP Location IE, such as street address, latitude and longitude, etc.

URR REGISTER REQUEST message format 600B provides similar information in another format. In addition to the basic IEs, this message format includes the following IEs. The UMA Release Indicator IE is used to identify the UMA Release supported. The UMA Classmark IE is used to provide the network with information concerning aspects of both the licensed and unlicensed radio interfaces, as well as the support for RTP redundancy of the MS equipment. The AP Radio Identity IE and the MS Radio Identity IE are used for transmission of a Bluetooth Device Address (BD_ADDR) or WLAN MAC address for the AP and MS, respectively. The GSM RR State IE is used to indicate the state of the GSM RR entity when the MS is registering for UMA service. The Coverage Indication IE is used to indicate the presence of GSM coverage at the current MS location.

A Cell Identity IE shall be included if the MS is in an area with GSM coverage. The Cell Identity value is retrieved from the GSM system information. The most recent Location Area Identification shall be included in the Location Area Identification IE if available in the MS. Similarly, the Routing Area Code (RAC) IE shall be included with a corresponding RAC value if available in the MS. The Geographical Location IE is a variable length IE providing an estimate of a geographic location of a target MS. The AP Location IE is used to indicate the location of the MS (or AP serving the MS) to the network.

A Register Reject Cause IE shall be included if the MS reattempts a URR Register Request after failing to connect to a serving UNC, along with a Redirection Counter IE. The conditional Last UNC SGW IP Address IE shall be include if the conditional IE Serving UNC SGW FQDN IE is not included. One of these IEs shall be included if a Register Reject Cause IE is included. Similarly, one of the conditional Last UNC IP Address IE or IE Serving UNC FQDN IE shall be included if a Register Reject Cause IE is included.

The AP Service Name IE shall be included if the MS connect via an AP over an unlicensed radio link. The value for this IE will be either the SSID or the PAN Service Name of the unlicensed AP being used. The MS shall include a Registration Indicators IE when attempting to register to a Default UNC. A UMA PLMN List IE shall be included only when attempting to register with the Default UNC and if no more PLMNs can be selected from the UMA PLMN List received from the Default UNC.

In addition to the foregoing registration content, the URR REGISTER REQUEST message may further include a reason for the connection and information about transmitting base stations that are within range (not shown). In a GSM system, this information is labeled Cell-Info and includes CGI and (optionally) C1 values. In one embodiment, only a single CGI is reported by the MS, representing the GSM cell that the MS has selected using its normal GSM cell selection procedures. This single cell has been selected by the MS to be the "best" GSM cell. Typically, to develop such values, the MS will scan certain designated frequencies to find broadcast channel (BCH) transmissions. The BCH will identify the transmitting base station and contain information about random access and traffic channels that are used by the particular base station. The MS can record the base station identities and measure the quality of the BCH signal as it is received. In GSM systems, the RXLEV (Received Signal Level) is typically measured but other quality measures may be used instead of, or in addition to the RXLEV, including signal to noise ratios, bit error rates, RSSI (Received Signal Strength Indicator) and signal propagation delays.

The UNC evaluates the received information about location and selects the appropriate UNC for the MS. This selection may be maintained for as long as the MS remains connected to the same AP. As mentioned above, there are a variety of different ways to select the appropriate UNC. In one embodiment the UNC maps the identification of the AP to a location, to a corresponding MSC and then to a corresponding UNC. In yet another embodiment, the UNC has no location information about base stations or the AP but it has a prior registration from the AP that included location information and selects a UNC on that basis.

In the simplest case, the registration request will be honored by the UNC to which it was submitted by having that UNC return a URR REGISTRATION ACK(nowledgement) message 602, an exemplary format 602A of which is shown in FIG. 8A. Optionally, the message is referred to as a URR REGISTRATION ACCEPT message. One embodiment of a URR REGISTRATION ACCEPT message 602C is shown in FIG. 8C.

The information elements of URR REGISTRATION ACK message format 602A includes the basic IEs (e.g., Protocol Discriminator, Skip Indicator, Message Type, and UCI), as well as a UMA System Information IE, a GPRS Uplink IP address, a GPRS Uplink UPD port, an Up Parameter Configuration IE, and a Status IE. Details of the formatting of one embodiment of the UMA System Information IE are shown in FIG. 8B. Details of the various fields shown in the UMA System Information IE of FIG. 8C are shown below.

GLIR—GSM Location Information Request
  0 GSM location information not requested
  1 GSM location information requested
ATT—Attach/detach allowed
  0 IMSI attach/detach not allowed in UMA cell
  1 MSs in the UMA cell shall apply IMSI attach and detach procedure
TI804—Timer value
  000 0 second, i.e., immediate access mode switching upon receipt of UMA-LINK-DETACH message or link loss
  001 5 seconds
  010 10 seconds
  011 15 seconds
  100 20 seconds
  101 25 seconds
  110 30 seconds
  111 35 seconds
UMA-CELL-RESELECT-HYSTERESIS
  000 0 dB RxLev hysteresis
  001 2 dB RxLev hysteresis
  010 4 dB RxLev hysteresis
  011 6 dB RxLev hysteresis
  100 8 dB RxLev hysteresis
  101 10 dB RxLev hysteresis
  110 12 dB RxLev hysteresis
  111 14 dB RxLev hysteresis
T3212—Periodic Location Update timer
  The T3212 timout value field is coded as the binary representation of the timeout value for periodic updating in decihours.
  Range: 1 to 255
  The value 0 is used for infinite timeout value, i.e. periodic updating shall not be used within the UMA cell
EC—Emergency Call Allowed
  0 Emergency call allowed in the UMA cell to all MSs
  1 Emergency call not allowed in the UMA cell except for the MSs that belong to one of the classes between 11 to 15
AC CN—Access Control Class N
  For a MS with AC C=N access is not barred if the AC CN bit is coded with a '0'; N=0, 1, . . . , 9, . . . , 15
TI 811—UMA Channel Activation timer
  The TI 811 value field is coded as the binary representation of the timeout value in 100 ms resolution.
  Range: 1-255 (100 ms to 25.5 sec)
TI 900—GSM to URR HANDOVER supervision timer
  The TI 900 value field is coded as the binary representation of the timeout value in 100 ms resolution.
  Range: 11-255 (1.1 sec to 25.5 sec)
UMA-BAND
  0000 P-GSM 900
  0001 E-GSM 900
  0010 R-GSM 900
  0011 DCS 1800
  0100 PCS 1900
  0101 GSM 450
  0110 GSM 480
  0111 GSM 850
  All other values are reserved
ECSM—Early Classmark Sending Mode, control the "early classmark sending" behavior
  0 Hold the URR CLASSMARK CHANGE message until the first downlink message is received
  1 Send the URR CLASSMARK CHANGE message as early as possible after UMA RR connection is established
GPRS Ind—GPRS Service Availability
  0 GPRS service not available in the UMA cell
  1 GPRS service supported in the UMA cell
UMA-GPRS-CELL-RESELECT-HYSTERESIS
  000 0 dB RxLev hysteresis
  001 2 dB RxLev hysteresis
  010 4 dB RxLev hysteresis
  011 6 dB RxLev hysteresis
  100 8 dB RxLev hysteresis
  101 10 dB RxLev hysteresis
  110 12 dB RxLev hysteresis
  111 14 dB RxLev hysteresis
NMO—Network Mode of Operation. This field is meaningful only if "GPRS Ind" flag is set to 1
  00 Network Mode of Operation I
  01 Network Mode of Operation II
  10 Network Mode of Operation III
  11 Reserved UMA-RAC—Routing Area Code of the UMA cell, see GSM03.03. This field is meaningful only if "GPRS Ind" flag is set to 1

The Up Parameter Configuration IE enables a UNC to configure Up interface parameters such as timers, retry counters, etc. The Status IE provides an indication from the UNC on whether location services are available (based on knowledge of AP's geographical location). This can be used to trigger an icon or other display on the MS. In one embodiment the possible values are:

0 Location Services are Available

1 Location Services are Not Available

In general, URR REGISTER ACCEPT message format 602C includes similar information provided in a different format. In addition to the basic IEs, the message format includes the following IEs. The Cell Identity IE and the Location Area Identification IE contain information similar to that discussed above for the URR REGISTER REQUEST message format 600B. The UNC Control Channel Description IE is used to provide various information about the UMA service. The TU3910, TU3906, TU3920, TU4001, and TU4003 Timer IEs are used for various timer purposes, further details of which are discussed in the UMA Protocols Stage 3 specification. The UMA Band IE includes a coded value identifying the applicable band for GSM service. The UNC Cell Description IE is used to provide a minimum description of a UMA cell. The Location Status IE is used to indicate whether the UNC is able to identify the location for the specific MS. The UMA Service Zone IE is included if the network is configured with UMA Service Zone information and contain information about the HPLMN.

If the network decides to reject the registration from the MS, the UNC will return an URR REGISTER REJECT message 604 to the MS, as depicted in the message sequence shown in FIG. 6B. A URR REGISTER REJECT/REDIRECT Message format 604A that is employed in one embodiment of URR REGISTER REJECT message 604 is shown in FIG. 9A. In addition to the basic IEs, message format 604A includes a UMA RR Cause IE, and optional Redirected UNC Address IE and Redirected SGW (Security Gateway) Address IEs. The RR Cause IE contains a value that is used to specify a reason for the rejection, such as Network Congestion, AP not allowed, Location not allowed, IMSI not allowed, etc.

A URR REGISTER REJECT message format 604B shown in FIG. 9B may also be employed under an embodiment that uses separate URR REGISTER REJECT and URR REGISTER REDIRECT messages. The additional IEs in this message format include a Register Reject Cause IE that contains a lookup value from which a reason for the rejection can be identified via a corresponding lookup table (not shown). The TU3907 Timer IE is used to specify the minimum period of time an MS should wait before attempting Registration at the current UNC. The Location Black List Indicator IE shall be included if the Register Reject Cause 'Location not allowed' is returned to the MS, and is used to indicate which part of the Location Area Identification is to be added to the Location Black List. The Location Area Identification IE is used to provide an unambiguous identification of location areas within the area covered by the GSM system.

The optional Redirected UNC Address IE and Redirected SGW Address IEs in message format 604A may be employed for redirection purposes. For example, a registration message sequence that involves UNC redirection is shown in FIG. 6C. Redirection may be applicable under various circumstances. For example, the location of a given AP might be moved, such that it is more advantageous to access the network via another AP. Similarly, an MS may contain information instructing it to access a default UNC based on a "normal" location of a subscriber—if the subscriber location is different, the default UNC may not be appropriate.

Referring to FIG. 6C, at step E a determination to redirect the session to UNC 2 is made by the serving UNC (e.g., UNC 1) and/or the network in view of applicable criteria as described above. At step F, UNC 1 acknowledges the registration request and sends a URR REGISTER REJECT message 604' that contains an address for the selected UNC (UNC 2) and/or the address for the security gateway associated with the UNC to MS 102. The address(es) may be in the form of a FQDN (Fully Qualified Domain Name) or in another form, such as an IP address. In another embodiment, a separate URR REGISTER REDIRECT message is used, as shown by a URR REGISTER REDIRECT message format 604C in FIG. 9C. In addition to the basic IEs, this message format will include one of a Serving UNC SGW IP Address IE or Serving UNC SGW FQDN IE, one of a Serving UNC IP Address IE or Serving UNC FQDN IE, a Serving UNC Table Indicator IE, an optional Serving UNC Port Number IE, and a conditional UMA PLMN List IE.

At step G, the MS performs a DNS query for the selected UNC. It may also release the TCP connection to the first UNC (UNC 1) and initiate a connection to the second UNC's IP address or SGW address. Accordingly, at step H, a TCP connection is established between the MS and the new UNC (UNC 2) to which the MS was redirected. At step H, the connection is established between the MS and the second UNC. The IPSec tunnel with the original UNC may be reused or a new one may be established (not shown).

At step I, the MS may send a second registration request message to the second UNC, as depicted by a URR REGISTER REQUEST message 600'. In a URR-REGISTER-REQUEST type of message, a reason field may carry a value for redirection instead of a normal connection. The information in the registration request may cause the new UNC to apply information that it has to further redirect the MS. Because it is closer to the location of the AP, it may have more or better information on the AP, nearby base stations or network resource allocations and may then further redirect the MS. The reason field may be used to inform the MS about the number of redirections. It may be used to limit the total number of redirections that a MS may experience at a single AP to one or two or any other number.

At step J, the connection with the UNC continues along its normal course. This may include registration acknowledgments, call setup and teardown, and any of a variety of different supported voice or data services, including security measures.

Registration Update

Under various use scenarios, a need to perform a registration update may result. Generally, a registration update procedure may be initiated by an MS (more common) or the network (less common). For example, after an MS has successfully registered to an UNC, the MS may employ a registration update procedure to inform the UNC if the AP (via which the MS is accessing the network) or the overlapping GSM coverage has changed.

Figure 10A:
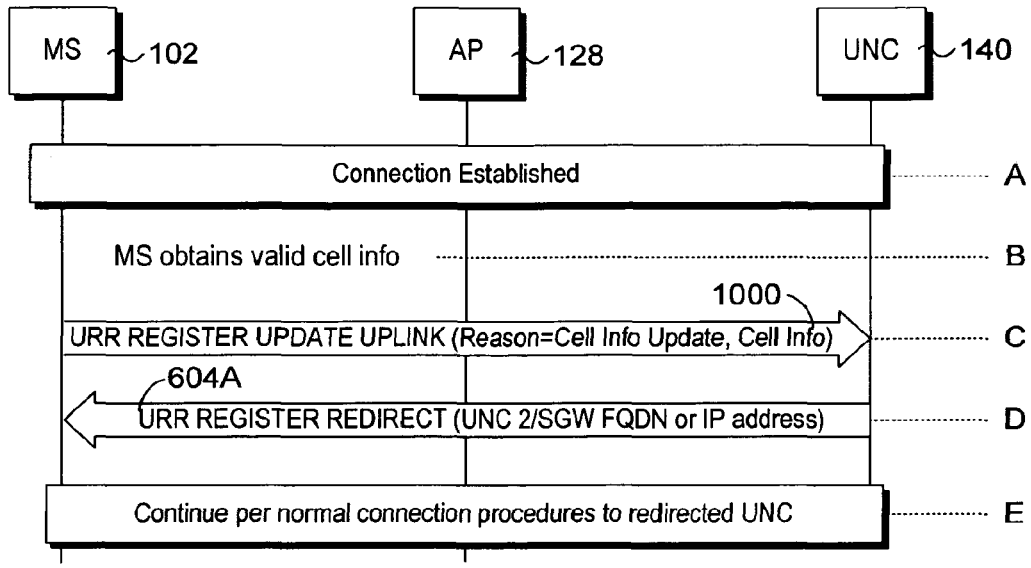
FIG. 10A illustrates a URR message sequence including a URR REGISTER UPDATE UPLINK message and a URR REGISTER REDIRECT message.

An example of messaging employed to facilitate an MS-initiated registration update is shown in FIG. 10A. At step A, MS 102 has established a connection with UNC 140 in the normal manner described above. At step B, the MS obtains valid cell information. For example, the MS receives information for a local GSM cell. At step C, the MS sends a URR REGISTER UPDATE UPLINK message 1000 to the UNC.

The URR REGISTER UPDATE UPLINK message is sent by an MS to a UNC to update registration parameters.

FIG. 1A shows one embodiment of URR REGISTER UPDATE UPLINK message format 1000A. In addition to the basic IE's, this message includes a Reason IE, a Cell Identifier List IE, a C1 List IE, an AP identifier IE, and an AP Location IE. The Reason IE is a mandatory IE that specifies whether the reason for the update is due to a cell update or an AP update. A Cell Identifier List IE will be included if GSM cell information (available to the UMA RR entity) has changed since the last registration or update. Within this IE, the Cell Identification Discriminator field shall be 0000 indicating the Cell Global Identification (CGI) format is used to identify the cells. The C1 List IE is present only if the Cell Identifier List IE is present. It contains the path loss criterion parameter C1 of each cell in the Cell Identifier List IE. The AP Identifier IE will be included if the AP through which the MS is communicating with the UNC has changed since the last registration or update. The AP Identifier is the MAC address of the unlicensed interface of the AP through which the MS is communicating with UNC.

A message format 1000B illustrative of another embodiment of a URR REGISTER UPDATE UPLINK message is shown in FIG. 11B. This message format includes an AP Radio Identity IE, a Coverage Indication IE, a Cell Identity IE, a Location Area Information IE, a Routing Area Code IE, a Geographical Location IE, and an AP Location IE, each of which are employed for a similar manner discussed above.

When receiving a URR REGISTER UPDATE UPLINK message, the network may either accept or reject the registration update, or redirect the MS to another UNC. In one embodiment, if there are not any actions to be taken by the UNC (e.g., a change in the access elements for the MS), the UNC simply accepts the registration update parameters with no reply message. In this case, the URR REGISTER UPDATE UPLINK message is merely informative. If the network rejects the registration update, the network sends a URR DEREGISTER message to the MS. Details of a URR DEREGISTER message are discussed below. Additionally, depending on the registration update information that is sent in the message, the UNC may redirect the MS to another MS using a URR REGISTER REDIRECT message, as depicted by a URR REGISTER REDIRECT message 604' at step D in FIG. 10A. In response, normal connection procedures would be established with the new UNC to which the MS was redirected, as shown in a step E.

Figure 10B:
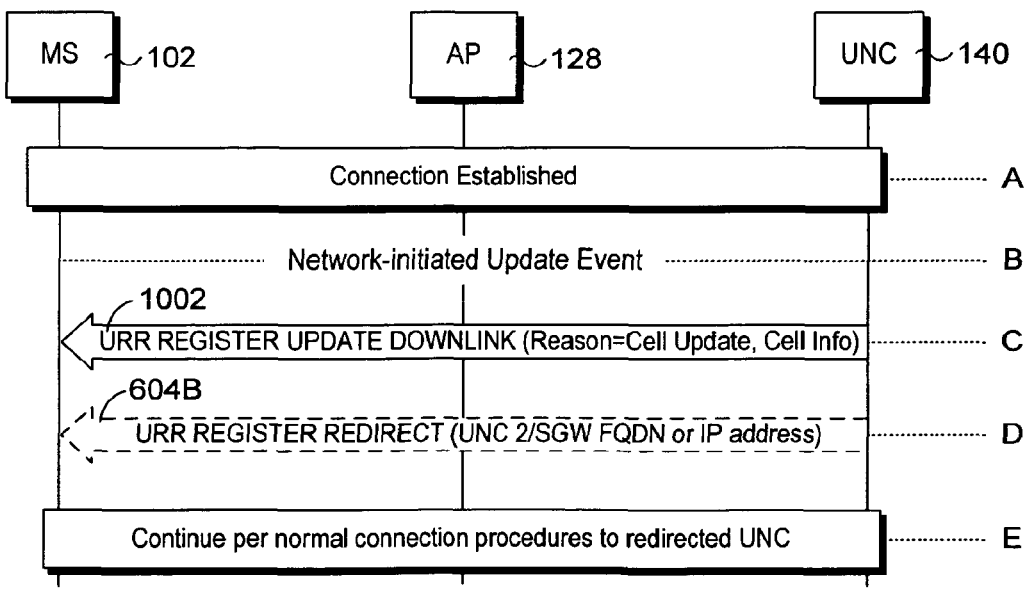
FIG. 10B illustrates a URR message sequence including a URR REGISTER UPDATE DOWNLINK message, a URR DEREGISTER message, and a URR REGISTER REDIRECT message.

FIG. 10B shows various message transfers that may be performed in connection with a network-initiated registration update. As before, at step A MS 102 has established a connection with UNC 140 in the normal manner. At step B, a network-initiated update event occurs. At step C, the UNC sends a URR REGISTER UPDATE DOWNLINK message 1002, respective embodiments of which are detailed in message formats 1002A and 1002B of FIGS. 12A and 12B. The URR REGISTER UPDATE DOWNLINK message format 1002A includes a Redirected UNC Address IE, a Redirected SGW Address IE, and a Status IE. The Status IE provides an indication from the UNC on whether location services are available (based on knowledge of the AP's geographical location). This can be used to trigger an icon or other display on the MS. In one embodiment, possible values are:

0 Location Services are Available
1 Location Services are Not Available

Many IEs of URR REGISTER UPDATE DOWNLINK message format 1002B are analogous to like-named IEs in URR REGISTER ACCEPT message format 602C. These include a Cell Identity IE, a Location Area Identification IE, a UNC Control Channel Description IE, TU3910, TU3906, TU3920, TU4001, and TU4003 Timer IEs, UNC Cell Description IE, and a Location Status IE Under some conditions, it may be advantageous to have an MS be redirected to re-register with a different UNC in view of the updated registration information. If the network decides to redirect the MS to another UNC, it will send a URR REGISTER REDIRECT message to the MS, as depicted by a URR Register Redirect message 604B at step D. At step E, normal connection procedures are performed to establish a connection with the UNC to which the MS is redirected.

Deregistration

In general, deregistration may be initiated by an MS (e.g., when deregistering an existing connection) or the network via an appropriate UNC. For instance, the MS should attempt to perform a deregister procedure before leaving an AP, which is facilitated by sending a URR DEREGISTER message from the MS to the UNC. Similarly, the UNC may initiate deregistration of the MS at any time by sending a URR DEREGISTER message to the MS.

Exemplary URR DEREGISTER message formats 1300A and 1300B are shown in FIGS. 13A and 13B. URR DEREGISTER message format 1300A includes a URR cause IE in addition to the basic IEs. A lookup table containing an exemplary set of values for the URR cause IE are shown in FIG. 14. Based on the URR cause value, a lookup into the URR cause lookup table may be performed to identify the reason for the deregistration. Meanwhile, URR DEREGISTER message format 1300B includes a Register Reject Cause IE that is employed for a similar function. URR DEREGISTER message format 1300B also includes a Location Black List Indicator IE and a Location Area Identification IE.

Channel Activation

Channel activation is used to establish a voice or circuit switched data bearer channel. FIG. 15 shows an exemplary message sequence performed in connection with channel activation. At step A, MS 102 has established a connection with UNC 140 in the normal manner. At step B, the UNC sends an URR ACTIVATE CHANNEL message 1500 to the MS. In response to receiving a URR ACTIVATE CHANNEL message, the MS attempts to establish a corresponding UMA voice bearer channel. If successful, the MS returns a URR ACTIVATE CHANNEL ACK(nowledge) message 1502, as shown at step C. If the UMA voice bearer channel cannot be established, the MS returns a URR ACTIVATE CHANNEL FAILURE message 1504, as shown at step C'. Upon successful activation, a URR ACTIVATE CHANNEL COMPLETE message 1506 is sent by the UNC to the MS to indicate that the established voice channel between the MS and the UNC is now ready for use, as shown at step D.

FIG. 16A shows details of one embodiment of a URR ACTIVATE CHANNEL message format 1500A. In addition to the basic IEs, this message format includes a Channel Mode IE, a UNC SDP IE, and a CIPHER Mode Setting IE. In one embodiment, the Channel Mode IE specifies the following channel modes:

0000 0001 speech full rate or half rate version 1
0010 0001 speech full rate or half rate version 2
0100 0001 speech full rate or half rate version 3 (AMR version 1)

The UNC SDP (Session Description Protocol) IE is used for specifying information used to implement the uplink (from MS to UNC) portion of the voice bearer channel. For example, this information may include the network address (IP address), the transport address (port), the transport protocol (e.g., RTP over UDP), the sample size (e.g., 20 ms) and the payload type (among other things). In one embodiment the format of this IE's values are defined in RFCs 2327, 3551 and 3267. The use of a single IE to contain this information is merely exemplary, as such information may also be provided via separate IEs. The optional CIPHER Mode Setting IE appears when the ciphering mode is changed after the MS has switched to the assigned channel. If this information element is omitted, the mode of ciphering is not changed after the channel assignment procedure.

FIG. 16B shows another embodiment of a URR ACTIVATE CHANNEL message format 1500B. This message format includes a Channel Mode IE, a Sample Size IE, an IP Address IE, an RTP UDP Port IE, a Payload Type IE, a Multi-rate Configuration IE, an RTP Redundancy IE, and a RTCP UDP Port IE. The RTP UDP Port IE identifies the Real Time Protocol UDP port. The RTCP UDP Port IE identifies the Real Time Control Protocol UDP port. The Payload Type IE is included when the speech codec signaled uses a dynamically assigned Payload Type.

FIG. 17A shows one embodiment of a URR ACTIVATE CHANNEL ACK message format 1502A. In addition to the basic IEs, this message format includes an MS SDP IE, an optional Cell Identifier List IE, and a conditional C1 list IE. The MS SDP IE is used for specifying information used to implement the downlink (from UNC to MS) portion of the voice bearer channel. This IE is substantially analogous to the UNC SDP IE discussed above, except that the port and address information now pertains to the MS rather than the UNC. The Cell Identifier List IE will be included if valid GSM cell information is available to the UMA RR entity. Within this IE, the Cell Identification Discriminator field is set to 0000 to indicate the Cell Global Identification (CGI) format is used to identify the cells. The C1 List IE is present only if the Cell Identifier List IE is present. It contains the path loss criterion parameter C1 of each cell in the Cell Identifier List IE.

FIG. 17B shows another embodiment of a URR ACTIVATE CHANNEL ACK message format 1502B. In addition to the basic IEs, this message format includes an RTP UDP Port IE, a Sample Size IE, a Payload Type IE, and an RTCP UDP Port IE.

FIG. 18A shows one embodiment of a URR ACTIVATE CHANNEL FAILURE message format 1504A. The additional IEs include a UMA RR Cause IE, an optional Cell Identifier List IE, and a conditional C1 List IE. The UMA RR Cause IE contains a coded cause of the failure. Meanwhile, the Cell Identifier List IE and a conditional C1 list IE are the same as above. The URR ACTIVATE CHANNEL FAILURE message format 1504B of FIG. 18B also employs a UMA RR Cause IE.

FIGS. 19A and 19B show respective embodiments of URR ACTIVATE CHANNEL COMPLETE message formats 1506A and 1506B. As depicted, each of these message formats only contains their basic IEs, wherein the URR ACTIVATE CHANNEL COMPLETE message is identified by the Message Type values.

Handovers

There are two primary types of handovers supported by the network: Handover to UMAN, and handover from UMAN. During a handover to UMAN, network access to an MS is handed over from licensed-based radio access network (e.g., GERAN) to UMAN network infrastructure. During a handover from UMAN, the MS access is handed over from the UMAN network infrastructure to the licensed-based radio access network.

Handover to UMAN

An exemplary message sequence corresponding to a handover to UMAN is shown in FIG. 20. Step A represents an existing connection that has previously been established, such as by using the technique shown in FIG. 6A. At step B, a URR HANDOVER ACCESS message 2000 is sent from MS 102 to UNC 140 in response to a corresponding handover order made by the licensed network. If non-signaling mode is indicated in the Channel Mode IE, the UNC initiates Traffic channel assignment, as depicted at step C. If the traffic channel assignment is successful, the MS will return a URR HANDOVER COMPLETE message 2002 to the UNC, as depicted at step D.

Respective embodiments of URR HANDOVER ACCESS message formats 2000A and 200B are shown in FIGS. 21A and 21B. In addition to the basic IEs, message format 2000A includes a HANDOVER COMMAND message IE, while message format 2000B includes an analogous Handover to UMAN Command IE. Each of these IEs contains a complete HANDOVER COMMAND layer 3 message (as described below) to provide handover reference used by the UMA Controller for access identification.

FIGS. 22A and 22B shows respective embodiment of URR HANDOVER COMPLETE message formats 2002A and 2002B. Each of these message formats includes their basic IEs, and is identified by the value of the message type.

Handover from UMAN

Figure 23A:
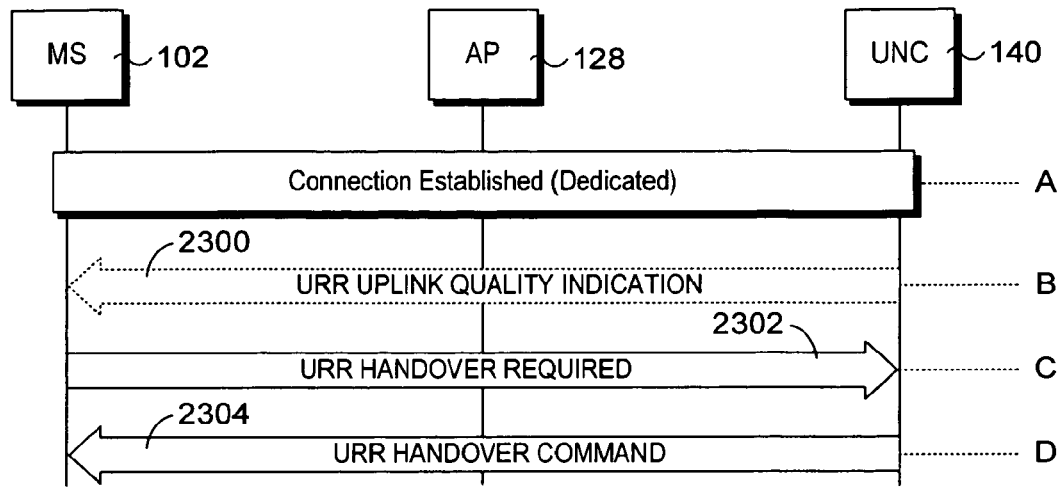
FIG. 23A illustrates a handover message sequence initiated in response to a URR UPLINK QUALITY INDICATION message sent from a UNC.
Figure 23B:
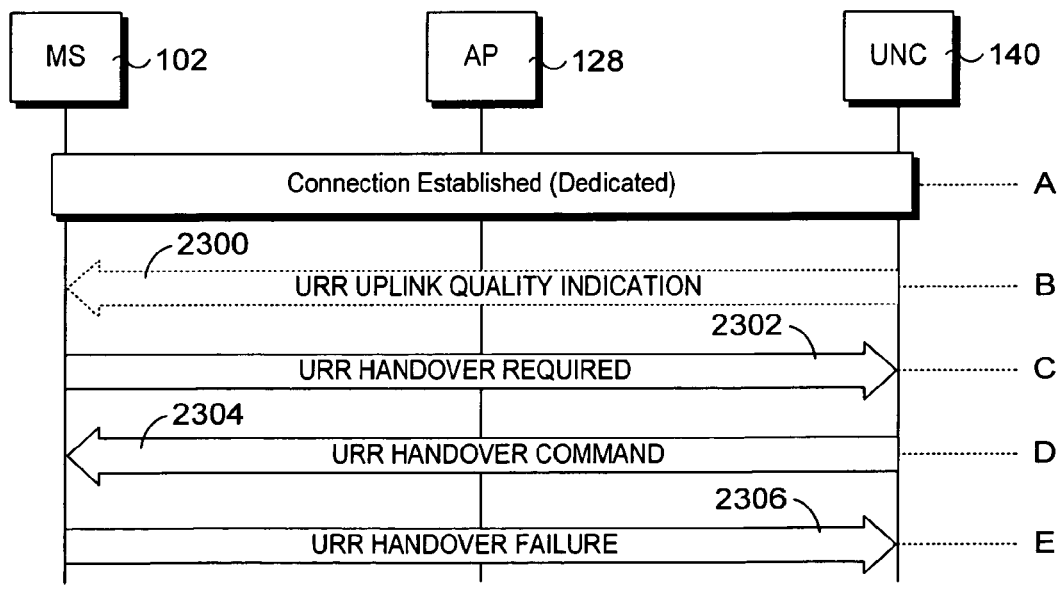
FIG. 23B illustrates a handover message sequence initiated in response to a URR UPLINK QUALITY INDICATION message sent from a UNC, in accordance with a handover failure.

A handover from the UMAN is performed to transfer a connection between an MS and the UMAN to another radio access network (e.g., GERAN). Message sequences corresponding to successful and unsuccessful handovers from UMAN are respectively shown in FIGS. 23A and 23B. The handover from UMAN procedure begins with a connection established and the MS in a dedicated state, as shown at step A. In response to a URR UPLINK QUALITY INDICATION message 2300 received from the UNC at step B, or if the MS determines a handover is appropriate, the MS sends a URR HANDOVER REQUIRED message 2302 to the UNC at step C. The UNC then sends a URR HANDOVER COMMAND 2304 back to the MS at step D. If the handover from UMAN is unsuccessful, the MS returns a URR HANDOVER FAILURE message 2306, as shown at step E in FIG. 23B.

Details of one embodiment of a URR UPLINK QUALITY INDICATION message are shown in FIG. 24. The message may include various information indicative of uplink quality of the bearer channel. The particular format of this information is dependent on the particular implementation.

FIG. 25A shows details of one embodiment of a URR HANDOVER REQUIRED message format 2302A. In addition to the standard IEs, this message includes a Channel Mode IE, and Cell Identifier List, and a C1 List. These latter two IEs are the same as discussed above. In one embodiment, the Channel Mode IE defines the channel mode as specified by GSM04.08.

FIG. 25B shows details of another embodiment of a URR HANDOVER REQUIRED message format 2302B. This message format includes a GERAN Cell Identifier List IE, a GERAN Received Signal Level List IE, a UTRAN Cell Identifier List IE, and a UTRAN Received Signal Level List IE. The GERAN Cell Identifier List IE contains information identifying applicable GERAN cells. The GERAN Received Signal Level List IE includes information indicating the received signal level for each GERAN cell. Similarly, the UTRAN Cell Identifier List IE and a UTRAN Received Signal Level List IE respectively contain information identifying applicable UTRAN cells and their received signal levels.

FIGS. 26A and 26B show details of one embodiment of a URR HANDOVER COMMAND message message format 2304A. This message format is compiled based on the HANDOVER COMMAND message format defined in GSM04.08/Release 98, with all optional IEs not applicable to the UMA to GSM handover removed. This message format includes a number of IEs in addition to the basic IEs; selected IEs are detailed below.

The Synchronization Indication IE is used to identify what type of synchronization is applicable. If this information element does not appear, the assumed value is "non-synchronized". Four types of handover defined in section 3.4.4.2 of GSM04.08: Non-synchronized, Synchronized, Pre-synchronized, and Pseudo-synchronized. The UMA to GSM handover can be either a non-synchronized or pre-synchronized handover. Synchronized handover and pseudo-synchronized handover require the MS to calculate the timing advance based on known one way delay with the old BTS and the Observed Time Difference between the old and new BTS (more description in annex A of GSM05.10). For a UMA to GSM handover, such variables are unknown. The ROT field of this IE shall be set to 0 so that the MS does not need to report its Observed Time Difference in the HANDOVER COMPLETE message.

Mode of the First Channel IE: If this information element is not present, the channel mode of the previously allocated channel shall be assumed.

Frequency Channel Sequence, Frequency List, Frequency short list and Mobile Allocation, after time IEs: If at least one of the channel descriptions for after time indicates frequency hopping, one of the following information elements will be present:

Frequency Channel Sequence, after time;
Frequency list, after time;
Frequency Short List, after time;
Mobile Allocation, after time.

If neither of the Channel Description IEs indicate frequency hopping, if they are not required for the decoding of Channel Description IEs for before time, and if any of the four information elements are present, they will be considered as IEs unnecessary in the message.

The Frequency Channel Sequence IE shall not be used unless all the ARFCNs that it indicates are in the P-GSM band. The starting time IE is included when the network wants the MS to change the frequency parameters of the channels more or less at the moment a change of channel occurs. In this case a number of information elements may be included to give the frequency parameters to be used before the starting time. The starting time IE refers to the new cell time. If the starting time IE is present and none of the information elements referring to before the starting time are present, the MS waits and accesses the channels at the indicated time. If the starting time IE is present and at least one of the information elements referring to before the starting time is present, the MS does not wait for the indicated time and accesses the channel using the frequency parameters for before the starting time. If the starting time IE is not present and some of the information elements referring to before the starting time are present, these information elements shall be considered as IEs unnecessary in the message.

If the description of the first channel, before time IE is not present, the channel description to apply for before the time, if needed, is given by the description of the first channel after time IE. If the description of the second channel, after time IE is present, the description of the second channel, before time IE not present, and a description of the configuration for before the time needed, the channel configuration before the starting time is nevertheless of two traffic channels, and the channel description to apply to the second channel before the starting time is given by the description of the second channel, after time IE.

If the starting time IE is present and at least one of the channel descriptions for before the starting time indicates frequency hopping, one and only one of the following information elements may be present and applies before the starting time to all assigned channels:

Mobile Allocation, before time IE;
Frequency Short list, before time IE;
Frequency list, before time IE;
Frequency channel sequence, before time IE.

If the starting time IE is present and at least one of the channel descriptions for before the starting time indicates frequency hopping, and none of the above mentioned IE is present, a frequency list for after the starting time must be present, and this list applies also for the channels before the starting time.

Reference cell frequency list: If any of the mobile allocation information elements are present, then the cell channel description IE must be present. It is used to decode the mobile allocation IEs in the message. In addition, if no information elements pertaining to before the starting time is present in the message, the frequency list defined by the cell channel description IE is used to decode the mobile allocation IEs in later messages received in the new cell until reception of a new reference cell frequency list or the new cell is left.

The Timing Advance IE element will be present if the "synchronization indication" element indicates a pre-synchronized handover. If not included for a pre-synchronized handover, then the default value as defined in GSM05.10 shall be used. For other types of handover it shall be considered as an unnecessary information element.

The CIPHER Mode Setting IE: If this information element is omitted, the mode of ciphering is not changed after the MS has switched to the assigned channel. The Multi Rate Configuration IE appears if the Mode of the First Channel IE indicates a multi-rate speech codec, and if the assigned configuration is new, i.e. it is different from the MultiRateconfiguration used in the serving cell. If the Mode of the First Channel IE indicates a multi-rate speech codec, and this IE is not included, then the MS shall assume that the MultiRate-configuration has not changed.

FIG. 26C shows an embodiment of a URR HANDOVER COMMAND message format 2304B. In addition to the basic IEs, this message format includes a Handover From UMAN Command IE. IF the target radio access technology is GERAN, the value part of the Handover From UMAN Command IE is coded as the HANDOVER COMMAND message specified in 3GPP TS 44.018, Rel-4: "Mobile radio interface layer 3 specification, Radio Resource Control (RRC) protocol."

FIG. 27A shows details of one embodiment of a URR HANDOVER FAILURE message format 2406A. In addition to the basic IEs, this message includes a UMA RR Cause IE, with an applicable value as defined in the value table of FIG. 14. The URR HANDOVER FAILURE message format 2604B shown in FIG. 27B employs an RR Cause IE for a similar purpose.

Release of URR

Release of the URR connection and signaling may be initiated by the MS or the UNC. FIG. 28 shows a URR release that is initiated by an MS. At step A, a connection between MS 102 and UNC 140 is established, with the MS operating in the dedicated state. To release the URR, the MS sends a URR CLEAR REQUEST message 2800 to the UNC at step B. Details of one embodiment of the URR CLEAR REQUEST message are shown in FIG. 29. This message format includes the basic IEs, with the message identified by the message type value. In response to the URR CLEAR REQUEST message, the UNC sends a release request 2802 to the core network to release resources used for the URR connection, as shown at step C. In response, the core network will initiate the release of the appropriate resources for the URR connection. The release typically results in the sequence shown in FIG. 30.

FIG. 29A shows an embodiment of a URR RR CLEAR REQUEST message format 2800A, while FIG. 29B shows an embodiment of a URR CLEAR REQUEST message format 2800B. URR RR CLEAR REQUEST message format 2800A just includes its basic IEs and is identified by its message type value. The URR CLEAR REQUEST message format 2800B further includes an RR Cause IE.

FIG. 30 shows a message sequence corresponding to an URR release that is either initiated by the UNC or results when the UNC receives the URR CLEAR REQUEST message. As before, at step A a connection between MS 102 and UNC 140 is established, with the MS operating in the dedicated state. At step B, the UNC sends a URR RR RELEASE message 3000 (alternatively called a URR RELEASE message) to the MS. (In further detail, the UNC will typically receive the URR CLEAR REQUEST, sends a Clear Request message to the MSC, then the MSC releases the session, resulting in the UNC sending the URR RELEASE message.) In response, the MS returns a URR RR RELEASE COMPLETE message 3002 (alternatively called a URR RELEASE COMPLETE message) to the UNC at step C. In addition the MS releases all URR resources and any traffic channel resources and then enters a URR-IDLE state.

FIGS. 31A and 31B show details of respective embodiments of URR (RR) RELEASE message formats 3000A and 3000B. In addition to the basic IEs, each of these message formats includes a UMA RR Cause IE and an optional GPRS Resumption IE. The UMA RR Cause IE is used to define the reason for the release, via a corresponding value defined in the table of FIG. 14. The GPRS (General Packet Radio Service) Resumption IE is used to indicate whether the UNC has successfully resumed a GPRS session that the MS suspended when it started the URR session.

FIGS. 32A and 32B show details of respective embodiments of URR (RR) RELEASE COMPLETE message formats 3002A and 3002B. Each of these message formats includes its basic IEs, with the message identified by the message type value.

Paging Messages

The UNC initiates paging when it receives a PAGING REQUEST message over the A-interface or a Paging CS message over the Gb-interface. The MS to be paged is identified by the identity received in the request. An exemplary exchange of paging messages is shown in FIG. 33. The sequence starts with UNC 140 sending a URR PAGING REQUEST message 3300 to MS 102 at step A. At step B, the MS returns a URR PAGING RESPONSE message 3302. This message is sent from the MS to the UNC as the first message over the newly established UMA RR session in response to the URR PAGING REQUEST message.

FIGS. 34A and 34B show details of respective embodiments of URR PAGING REQUEST message formats 3300A and 3300B. In addition to their basic IEs, each of these message formats includes a Channel Needed IE (used to indicate whether the page is for signaling session establishment or call establishment), and a Mobile Identity IE (used to identify the MS).

FIGS. 35A and 35B show details of respective embodiments of URR PAGING RESPONSE message formats 3302A and 3302B. In addition to their basic IEs, each of these message formats includes a Ciphering Key Sequence Number IE, a Channel Needed IE, and a Mobile Identity IE. The purpose of the Ciphering Key Sequence Number information element is to make it possible for the network to identify the ciphering key $K_c$ which is stored in the mobile station without invoking an authentication procedure. $K_c$ gets generated and stored when the MS is authenticated (challenged with a random number) by the network. While $K_c$ is not used to encrypt the call when in UMA mode, it may be necessary if the call gets handed over to GSM. If the network does not authenticate every call (e.g., every 3 or 4 calls), the Ciphering Key Sequence Number IE provides a way to select a stored $K_c$ value. URR PAGING RESPONSE message format 3302B further includes an Establishment Cause IE, which is used by the MS to indicate the type of the transaction being initiated to the network via a coded value which may be identified by a corresponding lookup table.

Classmark Messages

Classmark messages are used to enable a UNC to gain information about an MS's capabilities. The classmark interrogation procedure may be initiated when the MS has established a dedicated connection (i.e., the MS is in URR-DEDICATED mode), as shown at step A in FIG. 36. As shown at step B, the UNC initiates the classmark interrogation procedure by sending a URR CLASSMARK ENQUIRY message 3600 to the MS. In response, the MS returns a URR CLASSMARK CHANGE message 3602 at step C.

FIG. 37A shows details of one embodiment of a URR CLASSMARK ENQUIRY message format 3600A. The illustrated message format includes the basic IEs, with the message being identified by the message type value. In addition to the basic IEs, the URR CLASSMARK ENQUIRY message format 3600A of FIG. 37B includes a Classmark Enquiry Mask IE. This IE defines the information to be returned to the network. The bit mask defines the specific information to be returned, such as UTRAN specification information and/or requests the sending of the URR CLASSMARK CHANGE message.

FIGS. 38A and 38B show details of respective embodiments of URR CLASSMARK CHANGE message formats 3602A and 3602B. In addition to their basic IEs, each of these message formats includes a Mobile State Classmark IE, and an Additional Mobile Station Classmark Information IE. Under message format 3602A, the Mobile State Classmark IE includes the Classmark 2 information corresponding to the frequency band currently being used by the GSM RR entity, as defined by GSM04.08. In one embodiment, an Additional Mobile Station Classmark Information IE will be included if the CM3 bit in the Mobile Station Classmark IE is set to 1. This IE provides additional MS capabilities for Classmark 3 as defined by GSM04.08. The Mobile State Classmark IE and Additional Mobile Station Classmark Information IE of message format 3602B are encoded per the 3GPP TS 24.008, Rel-4 specification: "Mobile radio interface layer 3 specification."

UNC Architecture

Figure 39:
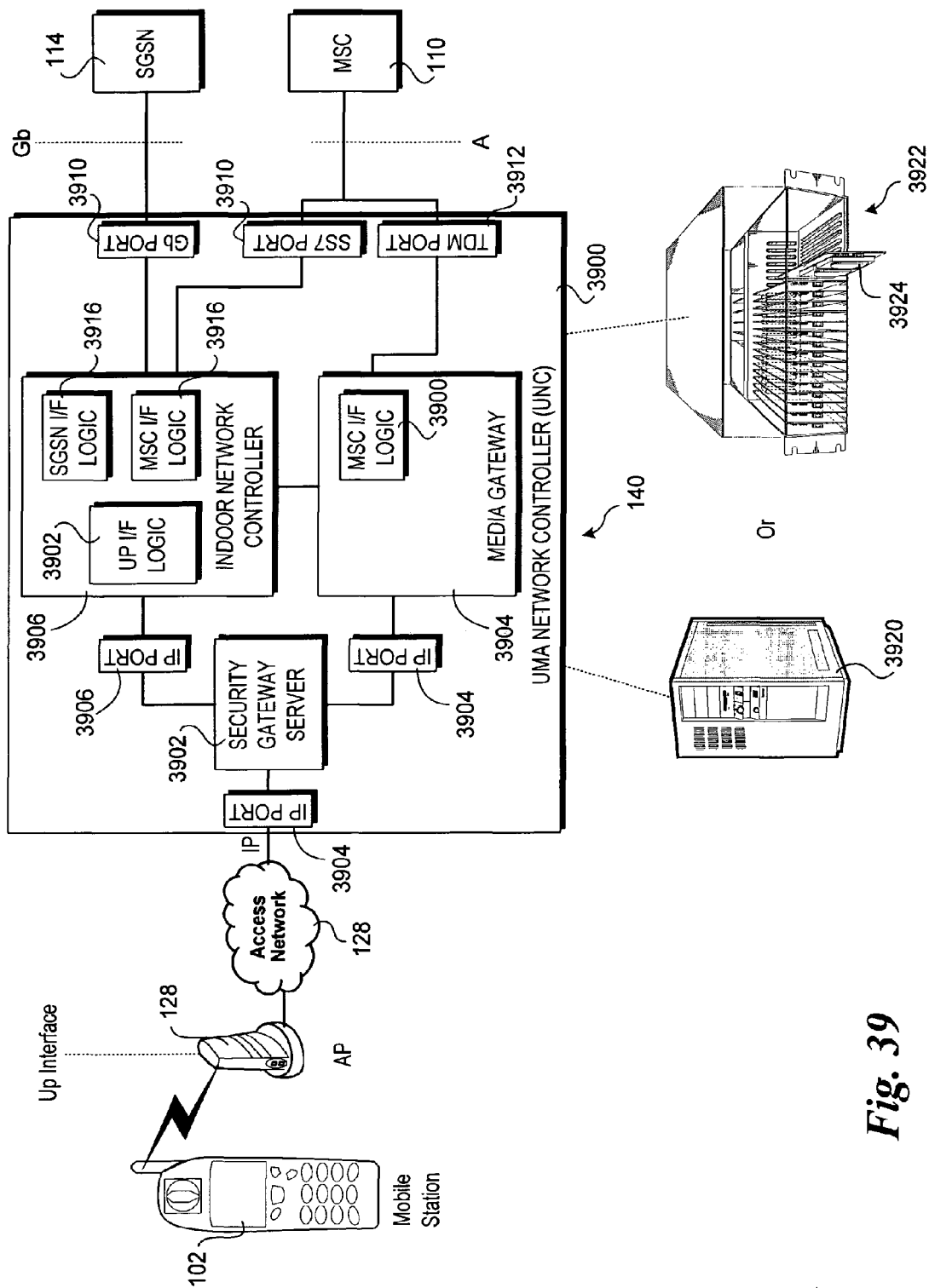
FIG. 39 is a schematic block diagram illustrating one embodiment of a high-level architecture of a UNC.

A block diagram illustrating a high level architecture corresponding to one embodiment of a UNC is shown in FIG. 39. At the heart of the UNC architecture is an indoor network controller (INC). In general, the INC performs operations synonymous to those described above for the UNC. However, as shown in the illustrated UNC architecture, an integrated security gateway server is included, as well as a media gateway which is controlled by the INC. Accordingly, each of these elements is shown as a separate element that is employed to facilitate various aspects of the UNC operations described herein.

In general, the UNC may provide one or more communication ports to support communications between mobile stations and the UNC (e.g., via and AP and broadband IP network as shown in FIG. 1). For example, in the illustrated embodiment of FIG. 39, security gateway server is coupled to IP network via an IP port. In addition, IP ports are used to connect INC and media gateway to the security gateway server.

The security gateway server performs security and authentication services. It may be an integrated unit (as shown), or may be a separate (physical) unit connected to the UNC via an appropriate communication link. Likewise, media gateway, which serves as a media gateway for voice services provided by the core network, may comprise an integrated unit (as shown) or a separate unit connected to the INC and security gateway servers via appropriate communication links.

The INC includes resources to support (i.e., generate and process) the UP interface messages described herein. These resources are depicted as UP Interface (I/F) logic. Similarly, INC includes SGSN interface logic to support communications with SGSN via a Gb port, and MSC interface logic to support communication with MSC via an SS7 port. Meanwhile, media gateway includes MSC interface logic to support communication with MSC via a TDM port. Each of UP interface logic, SGSN interface logic, and MSC interface logic may be implemented via execution of software, built-in programmed hardware, or a combination of the two. For example, UP interface logic may be facilitated by executing one or more software modules on a processor, wherein the software modules are coded to generate and/or process URR messages.

In general, a UNC may be implemented by a single server, multiple distributed servers, and multiple clustered servers. For example, a single server may be employed for running various software applications to provide the various functions shown in the block diagram of the UNC architecture of FIG. 39. Optionally, some of the functions, such as the security gateway server functions and/or media gateway functions, may be provided by a separate server or servers. In yet another configuration, a blade server is employed. The blade server includes multiple server blades that are installed in a common rack or chassis, with each server blade functioning as a separate server, each with its own processor(s), memory, and network interfaces. In one embodiment, the functions provided by each of the security gateway server, INC, and media gateway are facilitated via execution of software applications and/or modules on respective server blades.

Mobile Station Architecture

Figure 40:
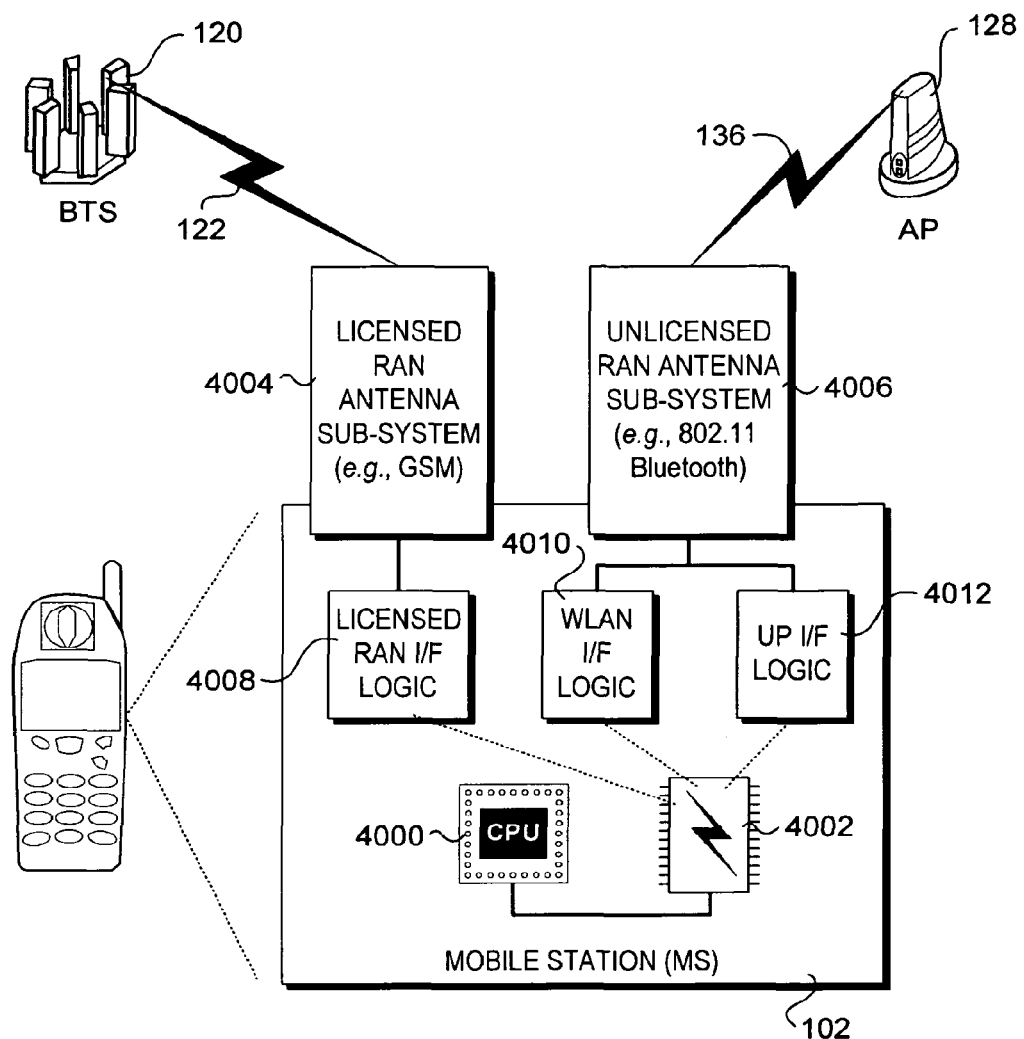
FIG. 40 is a schematic block diagram illustrating one embodiment of a high-level architecture of a mobile station.

FIG. 40 shows a block diagram illustrating a high-level architecture for one embodiment of a mobile station. The architecture includes a processor 4000 coupled to a non-volatile memory 4002, a licensed RAN antenna sub-system 4004 and an unlicensed RAN antenna sub-system 4006. Non-volatile memory 4002 is used to store software/firmware instructions for performing various functions and operations described herein. These functions and operations are depicted licensed RAN interface logic 4008, WLAN interface logic 4010, and Up interface logic 4012.

Licensed RAN antenna sub-system 4004 and licensed RAN interface logic 4008 are employed to facilitate conventional licensed RAN operations. For example, in one embodiment the licensed RAN comprises a GSM network, and thus these components facilitate normal GSM network operations typically employed by GSM-based cellular devices and the like, which are well-known in the cellular communication art. Meanwhile, the unlicensed RAN antenna system 4006 and WLAN interface logic 4010 are used to support an unlicensed wireless channel (i.e., link) 136 with an access point 128 via which UMAN services may be accessed. In general, these blocks represent conventional components and logic employed to support communications over an unlicensed WLAN link. For example, these components are illustrative of components that may be employed to implement the Bluetooth lower layers shown in FIG. 3B for a Bluetooth link, or the 802.11 lower layers shown in FIG. 3C for an 802.11 link.

Up interface logic 4012 is used to provide the MS-side Up interface functions and operations described herein. This includes generating and processing various URR messages, as well as providing the various UP interface layers depicted in FIGS. 3A and 3D-F.

As discussed above, the various message formats depicted herein are exemplary. However, each message should include a basic set of information elements including a protocol discriminator, a skip indicator, and a message identity. The inclusion of an UCI information element as a basic IE is depicted in the exemplary message formats illustrated herein; however, the UCI IE or a similar IE for indicating whether a message is a first message, other message, or emergency-related is not required and this functionality may be facilitated by other means, such as by maintaining appropriate state information on the communicating devices (i.e., mobile stations and UNCs).

Under a proposed implementation, message delineation over a streaming transport (e.g., TCP) is performed by the underlying transport itself. Accordingly, there is not a need to include an information element specifying the length of a variable-length message format. However, this is not meant to be limiting, as the use of an information element for specifying the length of a message is contemplated by the inventors as another means for delineating streamed messages.

The formats of the various information elements is also merely exemplary. For example, a given set of information may be provided via a single IE or via multiple IEs. Furthermore, the information contained in the IEs depicted herein may be arranged in other formats and/or grouped in alternate manners.

The means for facilitating various message generation and processing operations, as well as various aspects of the Up interface may include execution of software/firmware instructions on an appropriate processing element, such as, but not limited to, a processor, multiple processors, a multi-core processor, a microcontroller, etc. Thus, embodiments of this invention may be used as or to support instructions executed upon some form of processing core or otherwise implemented or realized upon or within a machine-readable medium. A machine-readable medium includes any mechanism for storing or transmitting information in a form readable by a machine (e.g., a computer). For example, a machine-readable medium can include a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.). For example, in one contemplated implementation, instructions embodied as software upgrades for facilitating UMA messaging may be downloaded to a mobile device via a wireless link, such as a UMAN or GSM link.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

APPENDIX I

Table Of Acronyms

| | |
|---|---|
| AP | Access Point |
| ARFCN | Absolute RF Channel Number |
| ATM | Asynchronous Transfer Mode |
| ATM VC | ATM Virtual Circuit |
| BA | BCCH Allocation |
| BAS | Broadband Access System |
| BB | Broadband |
| BCCH | Broadcast Common Control Channel |
| BRAS | Broadband Remote Access System |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CGI | Cell Global Identification |
| CIC | Circuit Identity Code |
| CLIP | Calling Line Presentation |
| CM | Connection Management |
| CPE | Customer Premises Equipment |
| CS | Circuit Switched |
| CVSD | Continuos Variable Slope Delta modulation |
| DSL | Digital Subscriber Line |
| DSLAM | DSL Access Multiplexer |
| DTAP | Direct Transfer Application Part |
| ETSI | European Telecommunications Standards Institute |
| FCAPS | Fault-management, Configuration, Accounting, Performance, and Security |
| FCC | US Federal Communications Commission |
| GERAN | GSM Edge Radio Access Network |
| GGSN | Gateway GPRS Support Node |
| GMM/SM | GPRS Mobility Management and Session Management |
| GMSC | Gateway MSC |
| GSM | Global System for Mobile Communication |
| GPRS | General Packet Radio Service |
| GSN | GPRS Support Node |
| GTP | GPRS Tunnelling Protocol |
| HLR | Home Location Register |
| IAN | Indoor Access Network (see also UMA Cell) |
| IAN-RR | Indoor Access Network Radio Resource Management |
| IBS | Indoor Base Station. |
| IBSAP | IBS Application Protocol |

APPENDIX I-continued

Table Of Acronyms

| | |
|---|---|
| IBSMAP | IBS Management Application Protocol |
| IEP | IAN Encapsulation Protocol |
| IETF | Internet Engineering Task Force |
| IMEI | International Mobile Station Equipment Identity |
| IMSI | International Mobile Subscriber Identity |
| INC | Indoor Network Controller |
| INC | Indoor Network Controller |
| IP | Internet Protocol |
| ISDN | Integrated Services Digital Network |
| ISP | Internet Service Provider |
| ISP IP | Internet Service Provider's IP |
| IST | IAN Secure Tunnel |
| ISUP | ISDN User Part |
| ITP | IAN Transfer Protocol |
| LA | Location Area |
| LAI | Location Area Identification |
| LLC | Logical Link Control |
| MAC | Medium Access Control |
| MAP | Mobile Application Part |
| MDN | Mobile Directory Number |
| MG | Media Gateway |
| MM | Mobility Management |
| MM | Mobility Management |
| MS | Mobile Station |
| MSC | Mobile Switching Center |
| MSC | Mobile Switching Center |
| MSISDN | Mobile Station International ISDN Number |
| MSRN | Mobile Station Roaming Number |
| MTP1 | Message Transfer Part Layer 1 |
| MTP2 | Message Transfer Part Layer 2 |
| MTP3 | Message Transfer Part Layer 3 |
| NAPT | Network Address and Port Translation |
| NAT | Network Address Translation |
| NS | Network Service |
| PCM | Pulse Code Modulation |
| PCS | Personal Communication Services |
| PCS | Personal Communications Services |
| PLMN | Public Land Mobile Network |
| POTS | Plain Old Telephone Service |
| PPP | Point-to-Point Protocol |
| PPPoE | PPP over Ethernet protocol |
| PSTN | Public Switched Telephone Network |
| P-TMSI | Packet Temporary Mobile Subscriber Identity |
| QoS | Quality of Service |
| RA | Routing Area |
| RAC | Routing Area Code |
| RAI | Routing Area Identification |
| RAI | Routing Area Identity |
| RAN | Radio Access Network |
| RF | Radio Frequency |
| RFC | Request for Comment (IETF Standard) |
| RLC | Radio Link Control |
| RR | Radio Resource Management |
| RTCP | Real Time Control Protocol |
| RTCP | Real Time Control Protocol |
| RTP | Real Time Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SGSN | Serving GPRS Support Node |
| SMC | Short Message Service Centre |
| SMS | Short Message Service |
| SM-SC | Short Message Service Centre |
| SMS-GMSC | Short Message Service Gateway MSC |
| SMS-IWMSC | Short Message Service Interworking MSC |
| SNDCP | SubNetwork Dependent Convergence Protocol |
| SS | Supplementary Service |
| SSL | Secure Sockets Layer |
| TCAP | Transaction Capabilities Application Part |
| TCP | Transmission Control Protocol |
| TCP | Transmission Control Protocol |
| TLLI | Temporary Logical Link Identity |
| TMSI | Temporary Mobile Subscriber Identity |
| TRAU | Transcoder and Rate Adaptation Unit |
| TTY | Text telephone or teletypewriter |
| UDP | User Datagram Protocol |

APPENDIX I-continued

Table Of Acronyms

| | |
|---|---|
| UMA Cell | Unlicensed Mobile Access Cell (see also IAN) |
| UMTS | Universal Mobile Telecommunication System |
| UNC | UMA Network Controller (see also INC) |
| VLR | Visited Location Register |
| VMSC | Visited MSC |
| WLAN | Wireless Local Area Network |
| WSP IP | Wireless Service Provider's IP Network |

What is claimed is:

1. A computer readable medium, wherein the computer readable medium is a physical storage medium and not propagated signals, the computer readable medium storing a computer program for directing a mobile equipment to perform a handover from a first radio access network comprising an unlicensed wireless system to a second radio access network, the computer program executable by a processor, the computer program comprising sets of instructions for:
 establishing a dedicated connection between the mobile equipment and the unlicensed wireless system via an unlicensed network controller;
 determining that a handover from the unlicensed wireless system is applicable;
 sending a HANDOVER REQUIRED message from the mobile equipment to the unlicensed network controller; and
 receiving a HANDOVER COMMAND message at the mobile equipment from the unlicensed network controller, wherein each of the HANDOVER REQUIRED message and the HANDOVER COMMAND message includes a set of basic information elements (IEs) including:
 a protocol discriminator;
 a skip indicator; and
 a message type via which the message may be identified,
 wherein the HANDOVER REQUIRED message further includes at least one IE that identifies one or more cells operating in the second radio access network to which the mobile equipment may connect to complete the handover from the unlicensed wireless system.

2. The computer readable medium of claim 1, wherein the HANDOVER COMMAND message further includes:
 at least one IE comprising information to support handover to the second radio access network.

3. The computer readable medium of claim 2, wherein the second radio access network comprises a GERAN (GSM (Global System for Mobile communications) EDGE (Enhanced Data rates for GSM Evolution) Radio Access Network).

4. The computer readable medium of claim 1 further comprising sets of instructions for:
 determining that a handover from the unlicensed wireless system is not successfully completed; and
 sending a HANDOVER FAILURE message from the mobile equipment to the unlicensed network controller, the HANDOVER FAILURE message including the set of basic IEs and further including a radio resource Cause IE having a value from which a cause for a failure can be identified.

5. The computer readable medium of claim 1, wherein the unlicensed network controller services a plurality of service regions of the unlicensed wireless system and the mobile equipment is located at a particular service region, wherein sending the HANDOVER REQUIRED message comprises sending the message from the particular service region to the unlicensed network controller.

6. A computer readable medium, wherein the computer readable medium is a physical storage medium and not propagated signals, the computer readable medium storing a computer program for directing a mobile equipment to perform a handover from a first radio access network to a second radio access network comprising an unlicensed wireless system, the computer program executable by a processor, the computer program comprising sets of instructions for:
 establishing a connection between the mobile equipment and the unlicensed wireless system via an unlicensed network controller;
 registering into the unlicensed wireless system via the unlicensed network controller;
 sending a HANDOVER ACCESS message from the mobile equipment to the unlicensed network controller;
 establishing a channel between the mobile equipment and the unlicensed network controller;
 sending a HANDOVER COMPLETE message from the mobile equipment to the unlicensed network controller, wherein each of the HANDOVER ACCESS message and the HANDOVER COMPLETE message includes a set of basic information elements (IEs) including:
 a protocol discriminator;
 a skip indicator; and
 a message type via which the message may be identified,
 wherein the HANDOVER ACCESS message further includes an IE comprising an embedded HANDOVER COMMAND layer 3 message.

7. The computer readable medium of claim 6, wherein the first radio access network comprises a GERAN (GSM (Global System for Mobile communications) EDGE (Enhanced Data rates for GSM Evolution) Radio Access Network).

8. A computer readable medium, wherein the computer readable medium is a physical storage medium and not propagated signals, the computer readable medium storing a computer program for directing an unlicensed network controller to operate in an unlicensed wireless system comprising a first radio access network, the computer program executable by at least one processor, the computer program comprising sets of instructions for:
 providing a first network interface comprising an IP (Internet Protocol) network interface;
 providing a second network interface comprising a Up interface, via which unlicensed wireless system messages are to be transmitted to and received from a mobile equipment via an access point communicatively coupled between the unlicensed network controller and the mobile equipment, the Up interface including a plurality of layers implemented over the IP network interface;
 providing a third network interface, via which the unlicensed network controller may be connected to a core network that is accessible to a second radio access network; and
 providing means for generating and processing a plurality of messages transmitted over the Up interface to perform handovers between the unlicensed wireless system and the second radio access network including:
 a HANDOVER REQUIRED message;
 a HANDOVER COMMAND message; and
 a HANDOVER COMPLETE message,
 wherein each of the HANDOVER REQUIRED message, the HANDOVER COMMAND message, and the HANDOVER COMPLETE message includes a set of basic information elements (IEs) including:
 a protocol discriminator;

a skip indicator; and a message type via which the message may be identified.

9. The computer readable medium of claim 8, wherein the HANDOVER REQUIRED message further includes at least one IE that identifies one or more cells operating in the second radio access network to which the mobile equipment may connect to complete a handover from the unlicensed wireless system.

10. The computer readable medium of claim 8, wherein the HANDOVER COMMAND message further includes at least one IE comprising information to support handover to the second radio access network.

11. The computer readable medium of claim 8 further comprising providing means for processing a HANDOVER ACCESS message received from the mobile equipment via the Up interface, the HANDOVER ACCESS message including:

a protocol discriminator IE;

a skip indicator IE;

a message type IE via which the HANDOVER ACCESS message may be identified; and an IE comprising an embedded HANDOVER COMMAND layer 3 message.

12. The computer readable medium of claim 8, wherein the second network interface comprises a Global System for Mobile communications (GSM) interface.

13. The computer readable medium of claim 8, wherein the unlicensed wireless system further comprises a plurality of service regions serviced by the unlicensed network controller.

14. A computer readable medium, wherein the computer readable medium is a physical storage medium and not propagated signals, the computer readable medium storing a computer program for directing a mobile equipment, the computer program executable by at least one processor, the computer program comprising sets of instructions for:

providing a first wireless interface, to access a first radio access network;

providing a second wireless interface, to access a second radio access network comprising an unlicensed wireless system via an access point (AP) using an unlicensed radio frequency;

providing a Up interface to communicate with the unlicensed wireless system via an unlicensed network controller communicatively coupled to the AP via an Internet Protocol (IP) network; and generating and processing a plurality of messages transmitted over the Up interface to perform handovers between the first wireless network and the unlicensed wireless system including:

a HANDOVER REQUIRED message;

a HANDOVER COMMAND message; and a HANDOVER COMPLETE message, wherein each of the HANDOVER REQUIRED message, the HANDOVER COMMAND message, and the HANDOVER COMPLETE message includes a set of basic information elements (IEs) including:

a protocol discriminator;

a skip indicator; and a message type via which the message may be identified.

15. The computer readable medium of claim 14, wherein the HANDOVER REQUIRED message further includes at least one IE that identifies one or more cells operating in the first radio access network to which the mobile equipment may connect to complete a handover from the unlicensed wireless system.

16. The computer readable medium of claim 14, wherein the HANDOVER COMMAND message further includes:

at least one information element comprising information to support handover from the first radio access network to the unlicensed wireless system.

17. The computer readable medium of claim 14, wherein the HANDOVER COMMAND message further includes:

at least one information element comprising information to support handover from the unlicensed wireless system to the first radio access network.

18. The computer readable medium of claim 14 further comprising sets of instructions for generating a HANDOVER ACCESS message including:

a protocol discriminator IE;

a skip indicator IE;

a message type IE via which the HANDOVER ACCESS message may be identified; and an IE comprising an embedded HANDOVER COMMAND layer 3 message.

19. The computer readable medium of claim 14 further comprising means for generating a HANDOVER FAILURE message including:

a protocol discriminator IE;

a skip indicator IE; and a message type IE via which the HANDOVER FAILURE message may be identified.

20. The computer readable medium of claim 14, wherein the first radio access network comprises a GERAN (GSM (Global System for Mobile communications) EDGE (Enhanced Data rates for GSM Evolution) Radio Access Network).

21. A method for performing a handover from a first radio access network comprising an unlicensed wireless system to a second radio access network, the method comprising:

establishing a dedicated connection between the unlicensed wireless system and a mobile equipment via an unlicensed network controller;

sending an UPLINK QUALITY INDICATION message from the unlicensed network controller to the mobile equipment;

receiving a HANDOVER REQUIRED message at the unlicensed network controller from the mobile equipment; and sending a HANDOVER COMMAND message from the unlicensed network controller to the mobile equipment, wherein each of the HANDOVER REQUIRED message and the HANDOVER COMMAND message includes a set of basic information elements (IEs) including:

a protocol discriminator;

a skip indicator; and a message type via which the message may be identified, wherein the HANDOVER REQUIRED message further includes at least one IE that identifies one or more cells operating in the second radio access network to which the mobile equipment may connect to complete the handover from the unlicensed wireless system.

22. The method of claim 21, wherein the HANDOVER COMMAND message further includes:

at least one information element comprising information to support handover to the second radio access network.

23. The method of claim 21, wherein the second radio access network comprises a GERAN (GSM (Global System for Mobile communications) Edge Radio Access Network).

24. The method of claim 21 further comprising:

determining a handover from the unlicensed wireless system was not successfully completed; and generating at and sending a HANDOVER FAILURE message from the mobile equipment to the unlicensed network controller, the HANDOVER FAILURE message including the set of basic IEs and further including a radio resource Cause IE having a value from which a cause for a failure can be identified.

25. A method for performing a handover from a first radio access network to a second radio access network comprising an unlicensed wireless system, the method comprising:

establishing a connection between a mobile equipment and the unlicensed wireless system via an unlicensed network controller;

receiving a HANDOVER ACCESS message at the unlicensed network controller from the mobile equipment;

establishing a channel between the unlicensed network controller and the mobile equipment;

receiving a HANDOVER COMPLETE message at the unlicensed network controller from the mobile equipment, wherein each of the HANDOVER ACCESS message and the HANDOVER COMPLETE message includes a set of basic information elements (IEs) including:

a protocol discriminator;

a skip indicator; and a message type via which the message may be identified, wherein the HANDOVER ACCESS message further includes an IE comprising an embedded HANDOVER COMMAND layer 3 message.

26. The method of claim 25, wherein the first radio access network comprises a GERAN (GSM (Global System for Mobile communications) Edge Radio Access Network).

27. The method of claim 25 further comprising:

sending a HANDOVER COMMAND message including appropriate IEs comprising information via which the mobile equipment can establish a dedicated connection with the unlicensed wireless system from the unlicensed network controller to the mobile equipment in response to registration of the mobile equipment into the unlicensed wireless system.

* * * * *